United States Patent
Hori et al.

(10) Patent No.: US 7,304,649 B2
(45) Date of Patent: Dec. 4, 2007

(54) OBJECT REGION DATA DESCRIBING METHOD AND OBJECT REGION DATA CREATING APPARATUS

(75) Inventors: Osamu Hori, Yokohama (JP); Toshimitsu Kaneko, Kawasaki (JP); Koji Yamamoto, Yokohama (JP); Takeshi Mita, Yokohama (JP); Koichi Masukura, Kawasaki (JP)

(73) Assignee: Kabushiki Kaisha Toshiba, Kawasaki-shi (JP)

(*) Notice: Subject to any disclaimer, the term of this patent is extended or adjusted under 35 U.S.C. 154(b) by 76 days.

(21) Appl. No.: 11/189,761

(22) Filed: Jul. 27, 2005

(65) Prior Publication Data
US 2005/0280657 A1 Dec. 22, 2005

Related U.S. Application Data

(63) Continuation of application No. 09/852,620, filed on May 11, 2001, now Pat. No. 7,091,988.

(30) Foreign Application Priority Data
May 11, 2000 (JP) .............................. 2000-138571

(51) Int. Cl.
*G09G 5/00* (2006.01)
(52) U.S. Cl. ..................................... 345/619
(58) Field of Classification Search ................ 345/581, 345/619, 626; 348/14.15, 25, FOR. 182; 709/223; 725/112, 113
See application file for complete search history.

(56) References Cited

U.S. PATENT DOCUMENTS

| | | | |
|---|---|---|---|
| 5,778,098 A | 7/1998 | Lee et al. | |
| 6,147,709 A * | 11/2000 | Martin et al. | 348/239 |
| 6,462,754 B1 | 10/2002 | Chakraborty et al. | |
| 6,504,569 B1 | 1/2003 | Jasinschi et al. | |
| 6,940,997 B1 | 9/2005 | Kaneko et al. | |
| 6,968,004 B1 | 11/2005 | Hori et al. | |
| 2001/0048753 A1 | 12/2001 | Lee et al. | |
| 2002/0181741 A1 | 12/2002 | Masukura et al. | |
| 2003/0063670 A1 | 4/2003 | Masukura et al. | |
| 2005/0280657 A1 | 7/2005 | Hori et al. | |

FOREIGN PATENT DOCUMENTS

EP 1 024 667 8/2000

OTHER PUBLICATIONS

U.S. Appl. No. 09/612,497, filed Jul. 7, 2000, Hori et al.
U.S. Appl. No. 09/808,988, filed Mar. 16, 2001, Masukura et al.
"Panoramic Image Mosaics", Heung-Yeung Shum and Richard Szeliski, Microsoft Research, Technical Report MSR-TR-97-23 1997, [retrieved on Jun. 4, 2003]. Retrieved from the internet:<URL:http://www.apl.jhu.edu/Notes/Beser/. ./shum97panoramic.pdf, abstract, p. 2.

* cited by examiner

*Primary Examiner*—Matthew C. Bella
*Assistant Examiner*—G. F. Cunningham
(74) *Attorney, Agent, or Firm*—Oblon, Spivak, McClelland, Maier & Neustadt, P.C.

(57) ABSTRACT

An object region data describing method of describing information about the object region in an image over a plurality of frames determines the region of a target object in an image using an approximate function that approximates the trajectory obtained by arranging, in the direction of frame advance, one representative point of an approximate figure for the object region and the difference values for determining the other representative points and describes information about the object region using a parameter for the function.

16 Claims, 51 Drawing Sheets

| FIGURE TYPE ID | 700 |
| --- | --- |
| OBJECT APPEARING TIME | 701 |
| OBJECT EXISTING TIME PERIOD | 702 |
| NUMBER OF REPRESENTATIVE POINTS M | 703 |
| REPRESENTATIVE POINT INITIAL POSITION | 1200 |
| REPRESENTATIVE POINT TRAJECTORY (1) | 704 |
| REPRESENTATIVE POINT TRAJECTORY (2) | |
| ⋮ | |
| REPRESENTATIVE POINT TRAJECTORY (M) | |

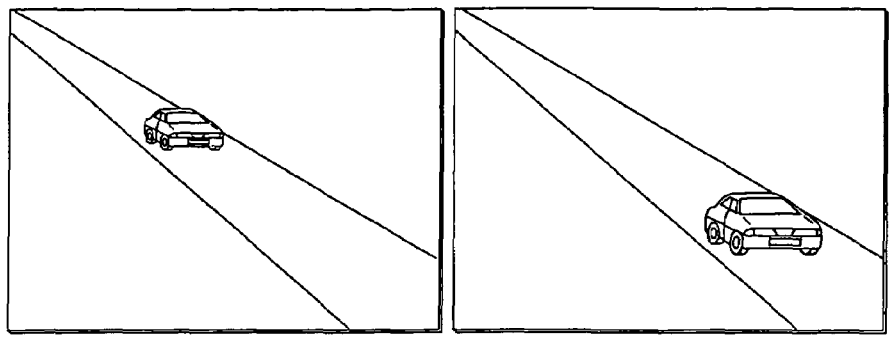
F I G. 21A  F I G. 21B
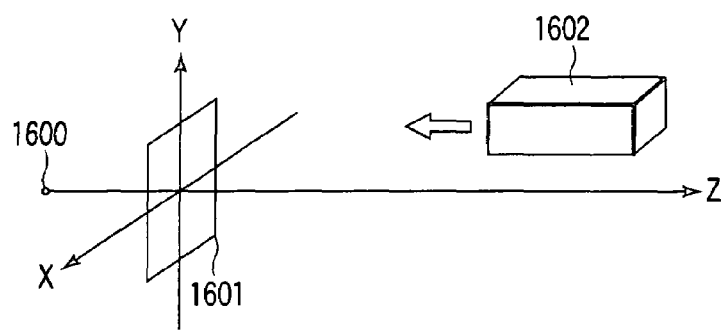
F I G. 22
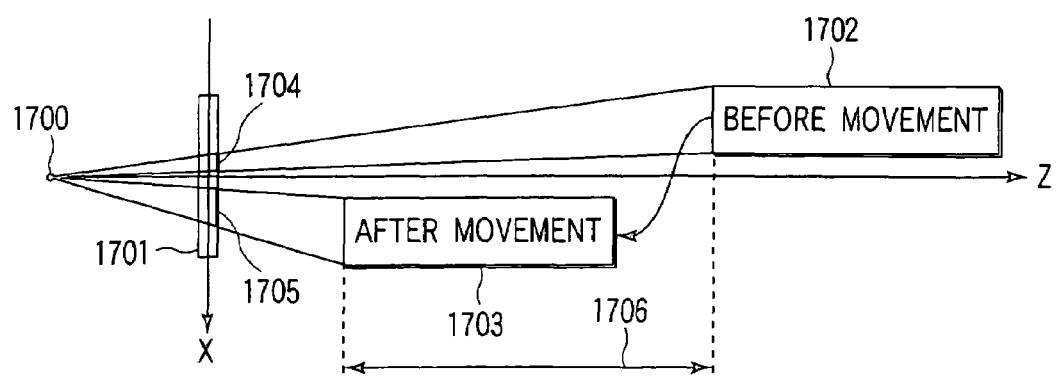
F I G. 23

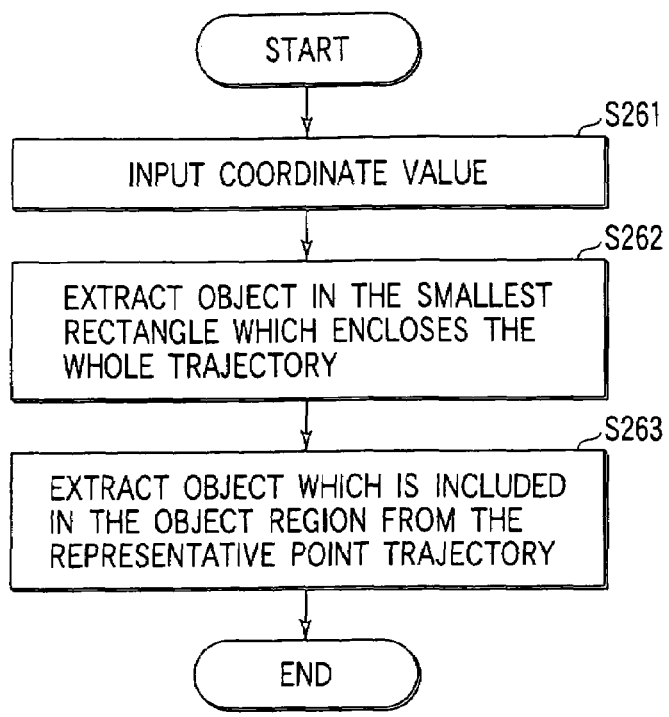
F I G. 35
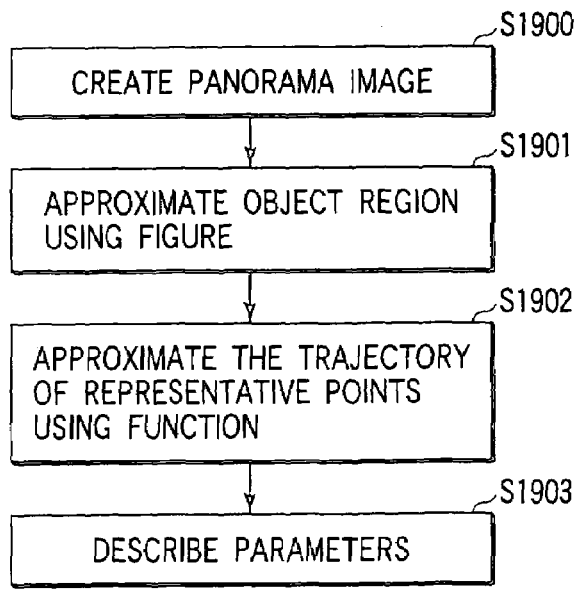
F I G. 36

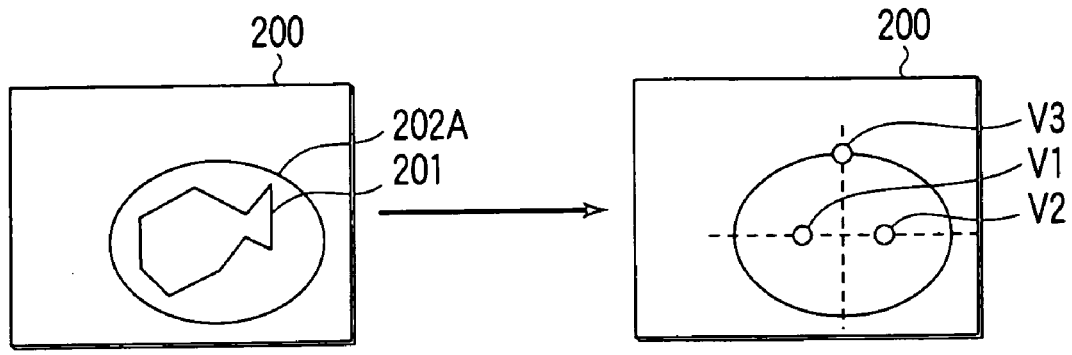
FIG. 39A  FIG. 39B
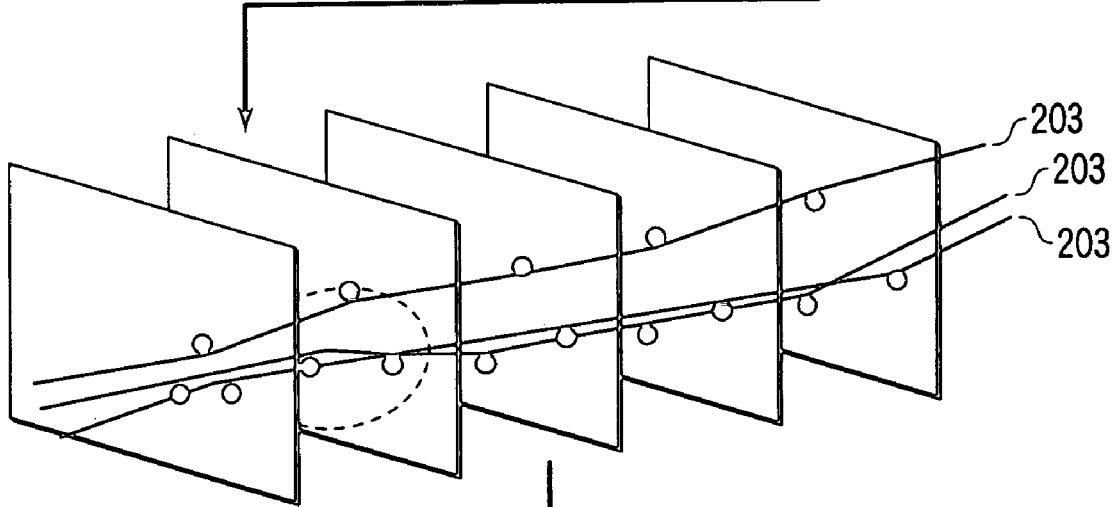
FIG. 39C
$3t^2-t+3(0 \leq t \leq 5)$ OR
$2.4t^3-12t^2+4t-28(5 \leq t \leq 16)$
FIG. 39D

FIG. 42

OBJECT REGION DATA

| | |
|---|---|
| ID NUMBER | ~400B |
| LEADING END FRAME NUMBER | ~401B |
| TRAILING END FRAME NUMBER | ~402B |
| POINTER FOR RELATED INFORMATION | ~403B |
| NUMBER OF APPROXIMATE FIGURES | ~404B |
| APPROXIMATE FIGURE DATA | ~405B |

FIG. 43

APPROXIMATE FIGURE DATA

| | |
|---|---|
| FIGURE TYPE ID | ~1300B |
| NUMBER OF REPRESENTATIVE POINTS | ~1301B |
| REPRESENTATIVE POINT X TRAJECTORY DATA (1X) | ~1302B |
| REPRESENTATIVE POINT Y TRAJECTORY DATA (1Y) | ~1303B |
| REPRESENTATIVE POINT Z TRAJECTORY DATA (1Z) | ~1304B |
| REPRESENTATIVE POINT X TRAJECTORY DATA (2X) | |
| REPRESENTATIVE POINT Y TRAJECTORY DATA (2Y) | |
| REPRESENTATIVE POINT Z TRAJECTORY DATA (2Z) | |
| ⋮ | |
| REPRESENTATIVE POINT X TRAJECTORY DATA (MX) | |
| REPRESENTATIVE POINT Y TRAJECTORY DATA (MY) | |
| REPRESENTATIVE POINT Z TRAJECTORY DATA (MZ) | |

REPRESENTATIVE POINT TRAJECTORY DATA

| |
|---|
| KNOT FRAME NUMBER ~1400B |
| ORDER OF POLYNOMINAL ~1401B |
| COEFFICIENT OF POLYNOMINAL (0TH ORDER) ~1402B |
| COEFFICIENT OF POLYNOMINAL (1ST ORDER) |
| ⋮ |
| COEFFICIENT OF POLYNOMINAL (KTH ORDER) |
| KNOT FRAME NUMBER |
| ORDER OF POLYNOMINAL |
| COEFFICIENT OF POLYNOMINAL (0TH ORDER) |
| COEFFICIENT OF POLYNOMINAL (1ST ORDER) |
| ⋮ |
| COEFFICIENT OF POLYNOMINAL (K'TH ORDER) |

1403B encompasses the first group (KNOT FRAME NUMBER through KTH ORDER coefficient).

⋮

F I G. 44

APPROXIMATE FIGURE DATA

| FIGURE TYPE ID | ~1300B |
| --- | --- |
| NUMBER OF REPRESENTATIVE POINTS | ~1301B |
| REPRESENTATIVE POINT X TRAJECTORY DATA (1X) | ~1302B |
| REPRESENTATIVE POINT Y TRAJECTORY DATA (1Y) | ~1303B |
| REPRESENTATIVE POINT X TRAJECTORY DATA (2X) | |
| REPRESENTATIVE POINT Y TRAJECTORY DATA (2Y) | |
| ⋮ | |
| REPRESENTATIVE POINT X TRAJECTORY DATA (MX) | |
| REPRESENTATIVE POINT Y TRAJECTORY DATA (MY) | |
| DEPTH INFORMATION | ~1306B |

F I G. 45

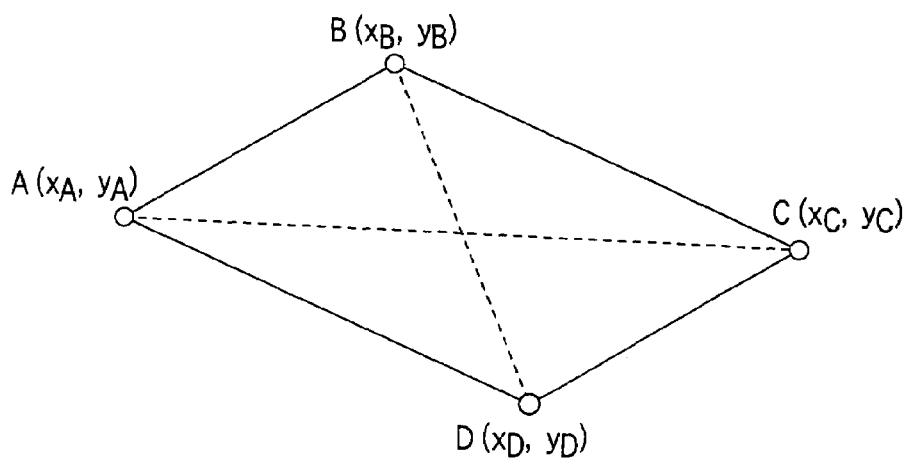

F I G. 46

OBJECT REGION DATA

| |  |
|---|---|
| ID NUMBER | ~400B |
| LEADING END FRAME NUMBER | ~401B |
| TRAILING END FRAME NUMBER | ~402B |
| POINTER FOR RELATED INFORMATION | ~403B |
| NUMBER OF APPROXIMATE FIGURES | ~404B |
| APPROXIMATE FIGURE DATA (1) | ~405B |
| APPROXIMATE FIGURE DATA (2) | ⋮ |
| ⋮ | |
| APPROXIMATE FIGURE DATA (L) | |

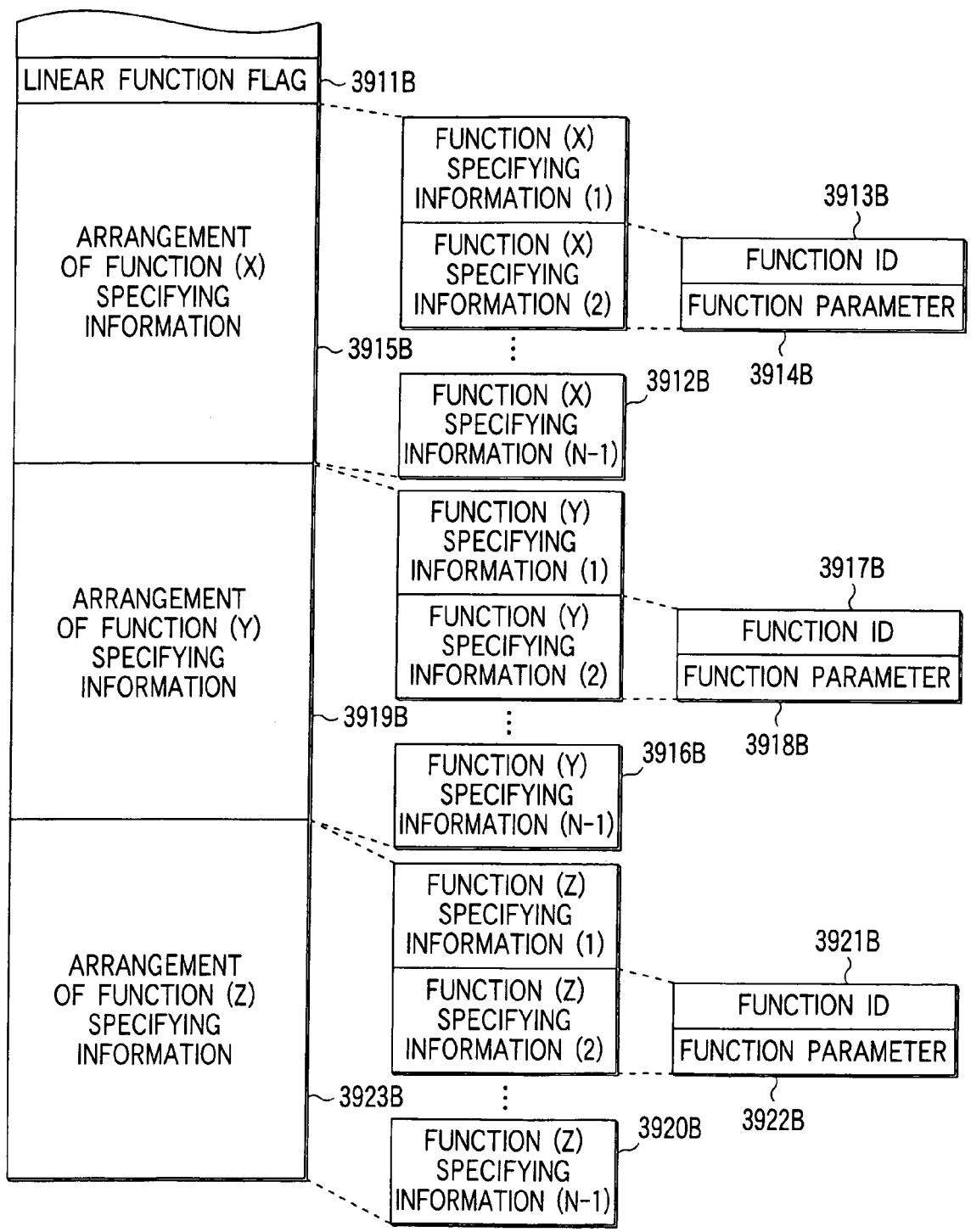
F I G. 54

| | |
|---|---|
| FIGURE TYPE ID | ~700B |
| OBJECT APPEARING TIME | ~701B |
| OBJECT EXISTING TIME PERIOD | ~702B |
| NUMBER OF REPRESENTATIVE POINTS M | ~703B |
| REPRESENTATIVE POINT TRAJECTORY (1) | ~704B |
| REPRESENTATIVE POINT TRAJECTORY (2) | |
| ⋮ | |
| REPRESENTATIVE POINT TRAJECTORY (M) | |
| DEPTH INFORMATION | ~705B |

F I G. 55

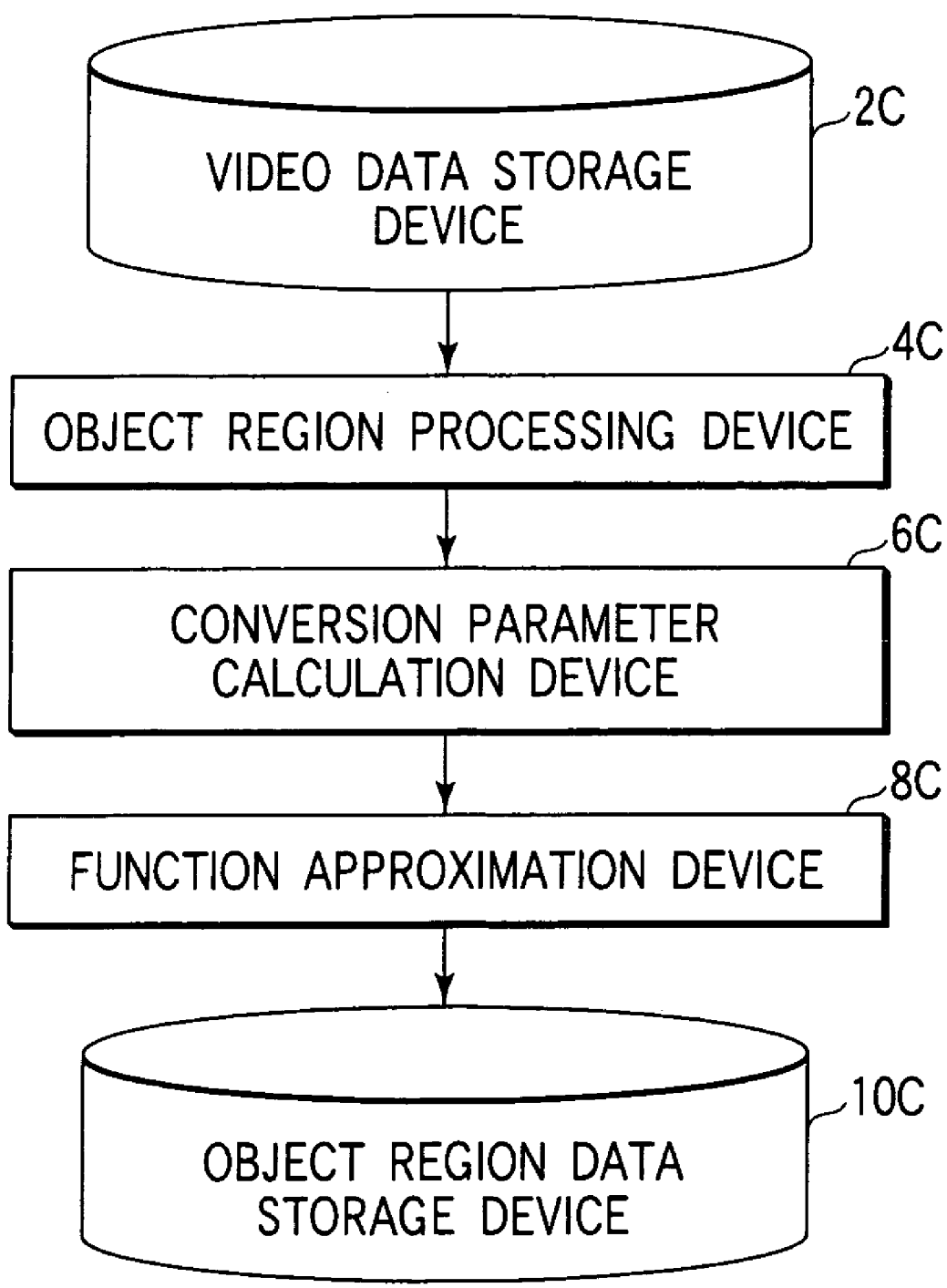
F I G. 57

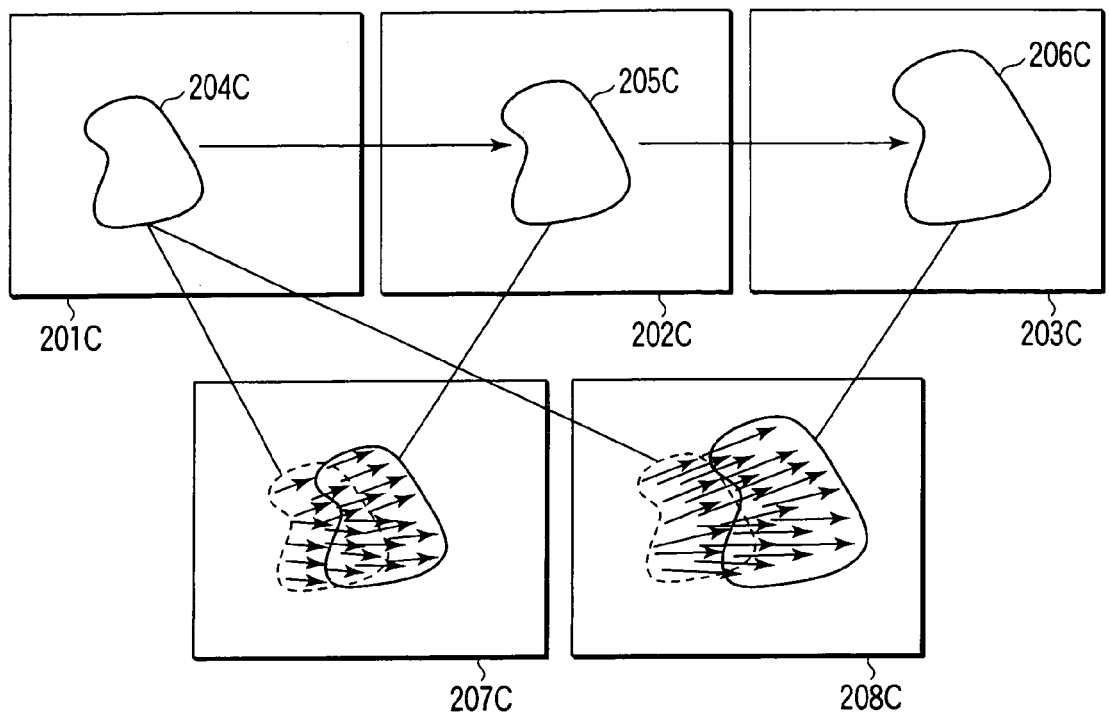
F I G. 59
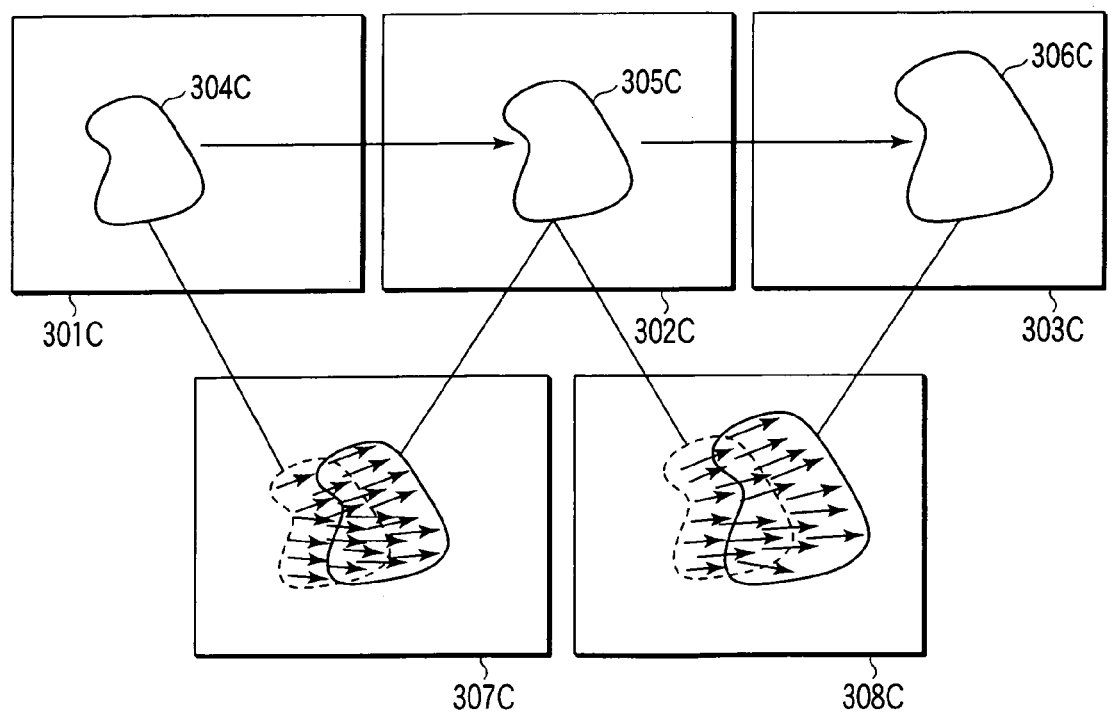
F I G. 60

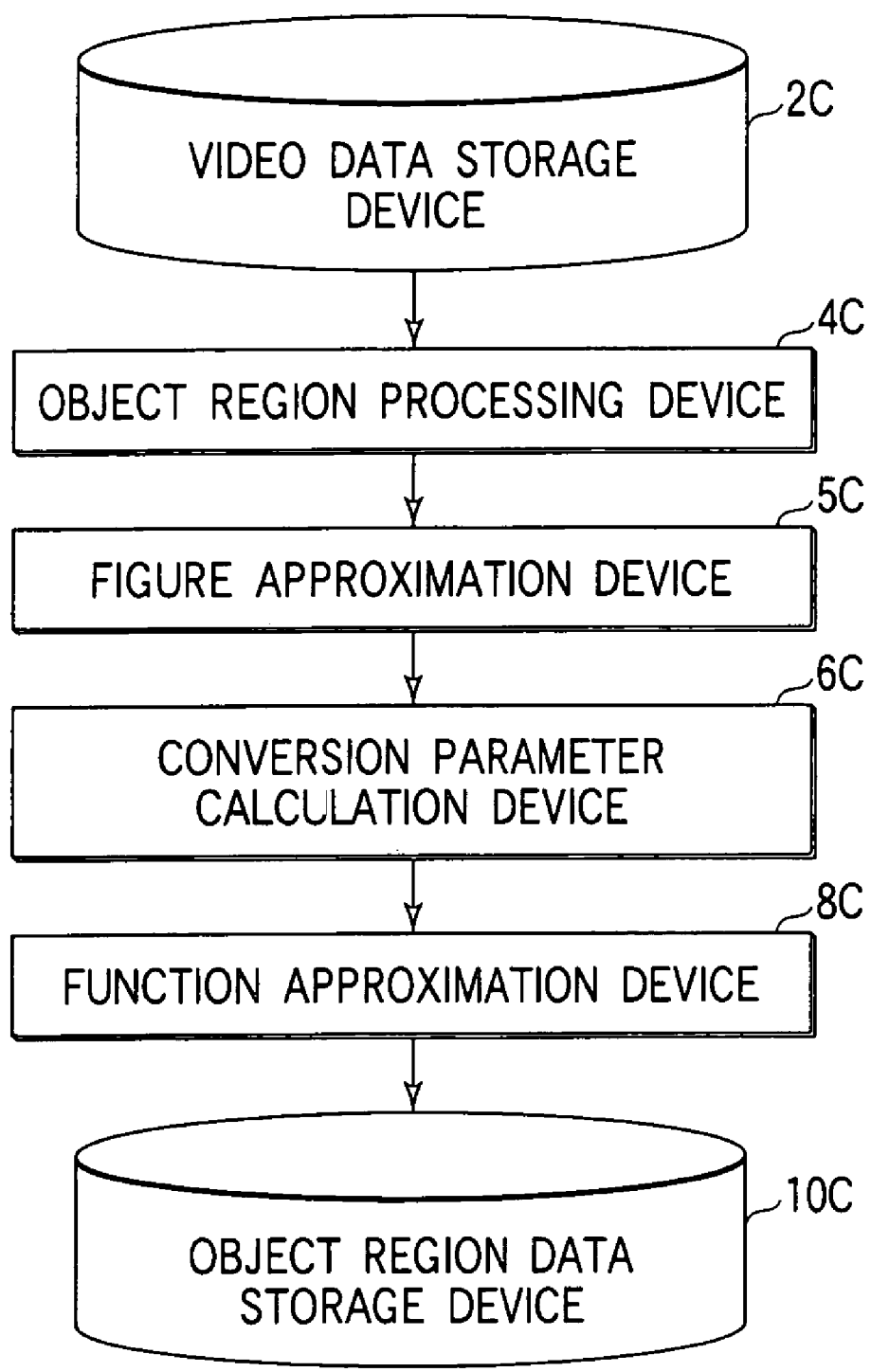
F I G. 63

| APPROXIMATE FIGURE \ MOVEMENT MODEL | ENLARGEMENT/ REDUCTION | ROTATION | PARALLEL TRANSLATION | 4-PARAMETER CONVERSION | AFFINE CONVERSION | PROJECTION CONVERSION | PARABOLIC CONVERSION |
|---|---|---|---|---|---|---|---|
| RECTANGLE, ELLIPSE (WITHOUT GRADIENT) | ○ | × | ○ | × | × | × | × |
| RECTANGLE, ELLIPSE (WITH GRADIENT) | ○ | ○ | ○ | ○ | × | × | × |
| PARALLELOGRAM | ○ | ○ | ○ | ○ | ○ | × | × |
| POLYGON (NUMBER OF VERTEXES > 11) | ○ | ○ | ○ | ○ | ○ | ○ | ○ |

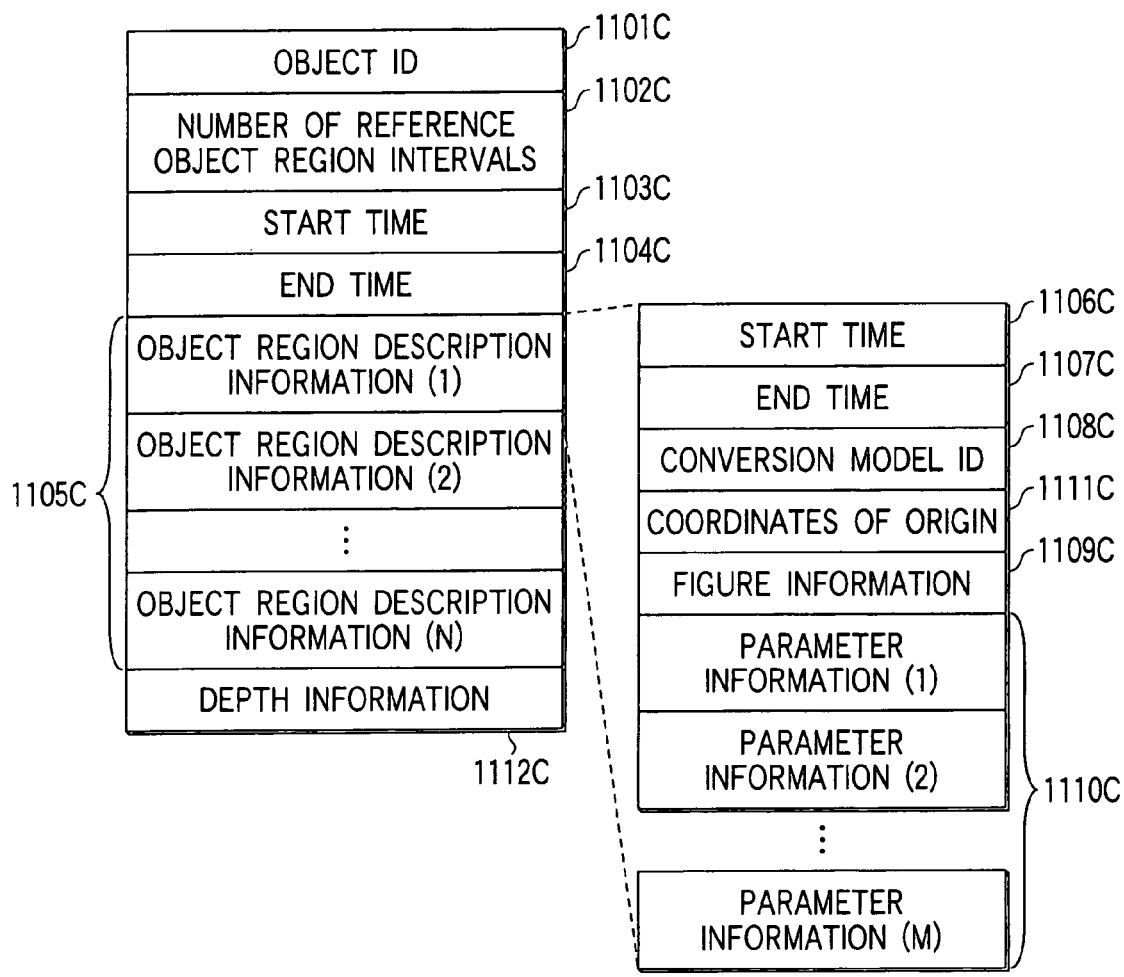
F I G. 67

OBJECT REGION DATA DESCRIBING METHOD AND OBJECT REGION DATA CREATING APPARATUS

CROSS-REFERENCE TO RELATED APPLICATIONS

This application is a continuation of U.S. application Ser. No. 09/852,620 filed May 11, 2001 now U.S. Pat. No. 7,091,988, and is based upon and claims the benefit of priority from the prior Japanese Patent Application No. 2000-13857, filed May 11, 2000, the entire contents of each of which are incorporated herein by reference.

BACKGROUND OF THE INVENTION

The present invention relates to an object region data describing method of describing information about the object region in a video and an object region data creating apparatus.

Hyper media are configured such that related information called a hyper link is given in between mediums, such as videos, sounds or texts, to permit mutual reference. When videos are mainly used, related information has been provided for each object which appears in the video. When the object is specified, related information (text information or the like) is displayed. The foregoing structure is a representative example of the hyper media. The object in the video is expressed by a frame number or a time stamp of the video, and information for identifying a region in the video which are recorded in video data or recorded as individual data.

Mask images have frequently been used as means for identifying a region in a video. The mask image is a bit map image constituted by giving different pixel values between the inside portion of an identified region and the outside portion of the same. A simplest method has an arrangement that a pixel value of "1" is given to the inside portion of the region and "0" is given to the outside portion of the same. Alternatively, α values which are employed in computer graphics are sometimes employed. Since the α value is usually able to express 256 levels of gray, a portion of the levels is used. The inside portion of the specified region is expressed as 255, while the outside portion of the same is expressed as 0. The latter image is called an α map. When the regions in the image are expressed by the mask images, determination whether or not a pixel in a frame is included in the specified region can easily be made by reading the value of the pixel of the mask image and by determining whether the value is 0 or 255. The mask image has freedom with which a region can be expressed regardless of the shape of the region and even a discontinuous region can be expressed. The mask image must have pixels, the size of which is the same as the size of the original image. Thus, there arises a problem in that the quantity of data cannot be reduced.

To reduce the quantity of data of the mask image, the mask image is frequently compressed. When the mask image is a binary mask image constituted by 0 and 1, a process of a binary image can be performed. Therefore, the compression method employed in facsimile machines or the like is frequently employed. In the case of MPEG-4 in which ISO/IEC MPEG (Moving Picture Experts Group) has been standardized, an arbitrary shape coding method is employed in which the mask image constituted by 0 and 1 and the mask image using the α value are compressed. The foregoing compression method is a method using motion compensation and capable of improving compression efficiency. On the other hand, complex compression and decoding processes are required.

To express a region in a video, the mask image or the compressed mask image has usually been employed. However, data for identifying a region is required to permit easy and quick extraction, to be reduced in quantity and to permit easy handling. Stated another way, the mask image is not suitable for identifying the object region in the video since it has a large quantity of data. The compressed mask image has a drawback in that coding/decodig is complicated and directly accessing to the pixel of a predetermined frame cannot be performed causing handling to become difficult.

Furthermore, only the positional information about the object region is represented and information about depth is not given. It is impossible to represent a state where the object disappears temporarily behind a thing. When shooting is done while the camera is following the moving object, the actual motion of the object is not represented. Thus, it is difficult to make a search, taking into account information about depth, disappearance behind another thing occlusion, and the movement of the camera. Therefore, in searching, all the things including unrelated ones must be processed.

BRIEF SUMMARY OF THE INVENTION

Accordingly, the present invention is directed to method and apparatus that substantially obviates one or more of the problems due to limitations and disadvantages of the related art.

In accordance with the purpose of the invention, as embodied and broadly described, the invention is directed to an object region data describing method and an object region data creating apparatus which enable the region of a desired object in an image to be described in a small amount of data and facilitate the creation and handling of the data.

Another object of the invention is to provide an object region data describing method and an object region data creating apparatus which enable an object in an image to be searched for efficiently and effectively.

According to embodiments of the present invention, there is provided a method of describing object region data about an object in video data over a plurality of frames, the method comprising:

approximating the object using a figure for each of the frames;

extracting a plurality of points representing the figure for each of the frames;

approximating trajectories with functions, the trajectories being obtained by arranging, in the frames advancing direction, position data about one of the plurality of points and relative position data about remaining points with reference to the one of the plurality of points; and describing the object region data using the functions.

According to embodiments of the present invention, there is provided another method of describing object region data about an object in video data over a plurality of frames, the method comprising:

approximating the object using a figure for each of the frames;

extracting a plurality of points representing the figure for each of the frames;

approximating trajectories with functions, the trajectories being obtained by arranging, in the frames advancing direction, position data about the plurality of points in a reference frame and relative position data about the plurality of points in a succeeding frame with reference to the position data about the plurality of points in the reference frame; and describing the object region data using the functions.

According to embodiments of the present invention, there is provided a further method of describing object region data about an object in video data over a plurality of frames, the method comprising:

approximating the object using a figure for each of the frames;

extracting a plurality of points representing the figure for each of the frames;

approximating trajectories with functions, the trajectories being obtained by arranging, in the frames advancing direction, data indicating positions of the plurality of points; and describing the object region data using the functions and depth information of the object.

According to embodiments of the present invention, there is provided a still another method of describing object region data about an object in video data over a plurality of frames, the method comprising:

approximating the object using a figure for each of the frames;

extracting a plurality of points representing the figure for each of the frames;

approximating trajectories with functions, the trajectories being obtained by arranging, in the frames advancing direction, data indicating positions of the plurality of points; and describing the object region data using the functions and display flag information indicating a range of frames in which the object or each of the points is visible or not.

According to embodiments of the present invention, there is provided a still further method of describing object region data about an object in video data over a plurality of frames; the method comprising:

approximating the object using a figure for each of the frames;

extracting a plurality of points representing the figure for each of the frames;

approximating trajectories with functions, the trajectories being obtained by arranging, in the frames advancing direction, data indicating positions of the plurality of points; and describing the object region data using the functions and object passing range information indicating a range where the figure approximating the object exist over the plurality of frames.

According to embodiments of the present invention, there is provided a still further method of describing object region data about an object moving in a panorama image formed by combining a plurality of frames with being overlapped, the method comprising:

approximating the object in the panorama image using a figure;

extracting a plurality of points representing the figure in a coordinate system of the panorama image;

approximating trajectories with functions, the trajectories being obtained by arranging, in the frames advancing direction, data indicating positions of the plurality of points; and describing the object region data using the functions.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 21A and 21B are illustrations to help explain the measurement of positional information in the direction of depth;

FIG. 22 is a diagram to help explain the measurement of positional information in the direction of depth;

FIG. 23 is a diagram to help explain the measurement of positional information in the direction of depth;

FIG. 35 is a flowchart for the process of selecting an object passing the specified coordinate;

FIG. 36 is a flowchart for the procedure for processing by an object region data describing method using mosaicking techniques according to a fifth embodiment;

FIGS. 39A, 39B, 39C, and 39D are diagrams showing a procedure for describing an object region in a video with object region data according to a fourth embodiment;

FIG. 42 is a diagram showing an example of the structure of object region data;

FIG. 43 is a diagram showing an example of the structure of data of an approximate figure in object region data;

FIG. 44 is a diagram showing an example of the structure of data of a trajectory of a representative point in data of an approximate figure;

FIG. 45 is a diagram showing another example of the structure of data of an approximate figure in object region data;

FIG. 46 is a diagram showing an example of representative points when the approximate figure is a parallelogram;

FIG. 54 is a diagram showing the second half of the other example of the structure of object region data;

FIG. 55 is a diagram showing a still another example of the structure of object region data;

FIG. 57 shows an object region data creating apparatus according to a seventh embodiment of the present invention;

FIG. 59 is an explanatory view for one example of a method of calculating an object region optical flow;

FIG. 60 is an explanatory view for another example of the method of calculating an object region optical flow;

FIG. 63 shows an example of the constitution of the object region data creating apparatus in the seventh embodiment;

FIG. 67 shows one example of a description format for the object region data if the reference object region is approximated by a figure;

DETAILED DESCRIPTION OF THE INVENTION

A preferred embodiment of an object region data describing method and an object region data creating apparatus according to the present invention will now be described with reference to the accompanying drawings.

First Embodiment

Figure 1:
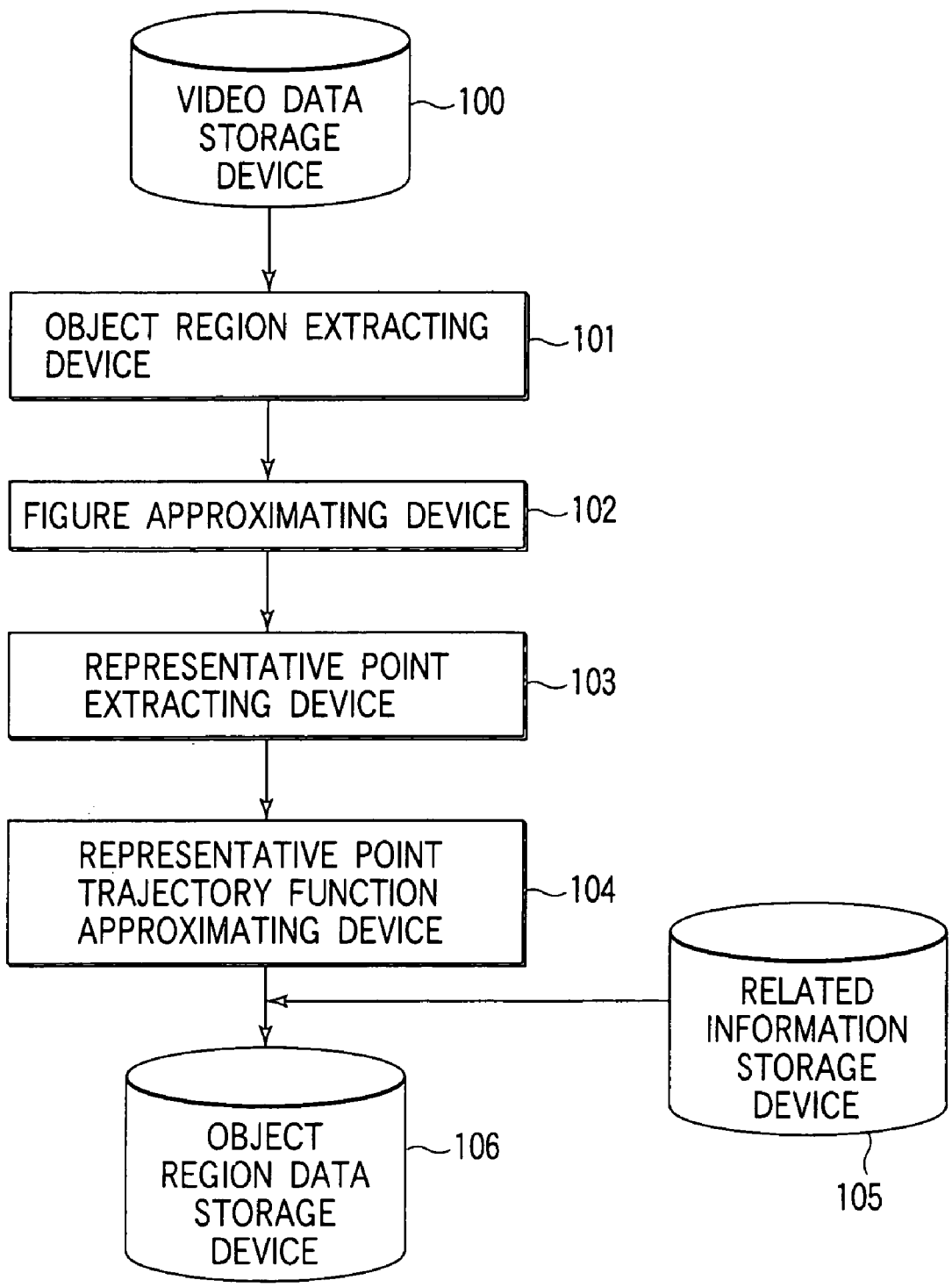
FIG. 1 shows an object region data creating apparatus according to a first embodiment of the present invention.

FIG. 1 shows the configuration of an object region data creating apparatus (or an object region data converting system) according to the first embodiment of the present invention.

As shown in FIG. 1, the object region data creating apparatus comprises a video data storage device 100, a region extracting device 101, a region figure approximating device 102, a figure representative point extracting device 103, a representative point trajectory function approximating device 104, and an object region data storage device 106. It may further comprise a related information storage device 105.

Figure 2:
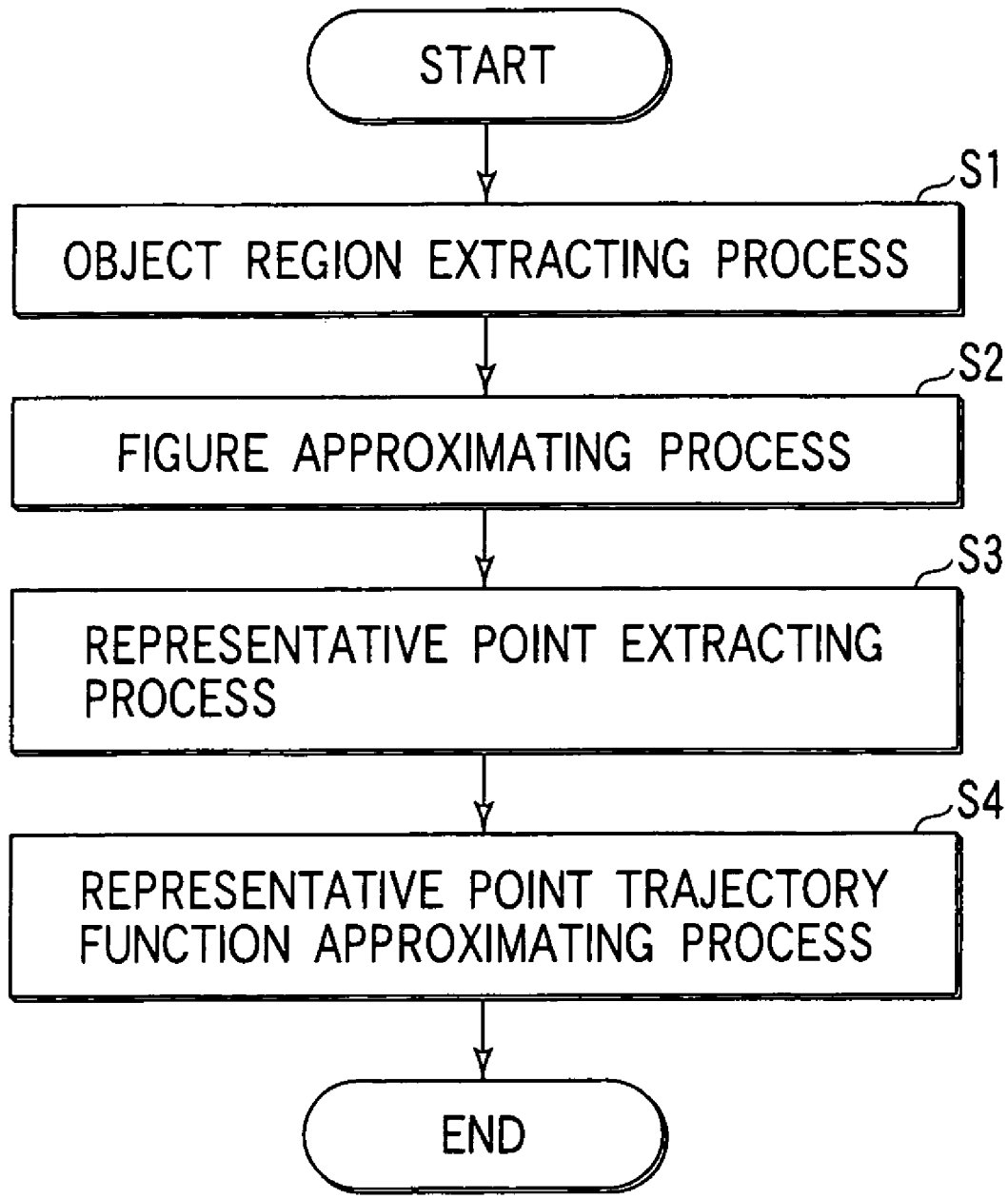
FIG. 2 is a flowchart for processing in the object region data creating apparatus according to the first embodiment.

FIG. 2 is a flowchart for processing in the object region data creating apparatus.

The video data storage device 100, which stores video data, is composed of, for example, a hard disk, an optical disk, or a semiconductor memory.

The region extracting device 101 extracts a partial region of the video data (step S1). The partial region is generally the object region, such as a specific person, plant, animal, car, or building, in the image. Any thing in the video may be used as the object region, as long as it can be treated as an object in the video. The object may be an independent thing, part of a thing (e.g., the head of a person, the hood of a car, or the entrance of a building), a set of things (e.g., a flock of birds or a school of fish). In images, the same object frequently appears on consecutive frames, whereas the region corresponding to the same object often varies from frame to frame mainly because of the movement of the object itself and/or the movement of the camera during shooting.

The region extracting device 101 is for extracting the object region in each frame according to the movement or transformation of the target object. As a concrete extracting method, any one of the following methods can be used: a method of manually specifying the region all over the frames, a method of extracting the contour of an object consecutively using a dynamic contour model called Snakes as described in M. Kass, et al., "Snakes: Active contour models," International Journal of Computer Vision, Vol. 1, No. 4, July, 1988, pp. 321-331, a method of estimating the transformation and movement of the whole of an object from the destination of the movement of the partial region of the object determined by block matching as described in Kaneko, et al., "A fast moving body tracking method for creating hypermedia content using robust estimation," Technical Report by Information Processing Society, CVIM113-1, 1998, and a method of determining the regions having similar colors by the growth and division of the region as described in "Image Analysis Handbook," Sect. 2, Chapter 2, Tokyo University Publishing House, 1991.

The region figure approximating device 102, using a specific figure, approximates the object region extracted by the region extracting device 101 (step S2).

Various types of figure, including a rectangle, a circle, an ellipse, and a polygon, can be used. The type of figure used in approximation may be determined in advance. For example, the type of figure may be specified by the user, using specific units, such as each of the objects to be approximated. Alternatively, the type of figure may be selected automatically according to the shape or the like of each of the objects to be approximated.

There are various methods of approximating the region. They include a method of approximating the region using a circumscribed rectangle of the object region, a method of approximating the region using a circumscribed ellipse or inscribed ellipse for the rectangle found by the preceding method, a method of approximating the region using a circumscribed ellipse for the object region, a method of creating an initial approximate polygon for the object region and then decreasing the number of vertexes of the approximate polygon so that the difference in area between the object region and the approximate polygon may lie within a reference, and a method of approximating the region using a polygon with a predetermined number of vertexes. Still another method is to approximate the region better using inclined figures. There are further methods taking other geometric amounts into account. They include a method of causing the center of gravity of the object region to coincide with the center of gravity of the approximate figure and a method of setting the area of the approximate figure to the value obtained by multiplying the area of the object region by a specific constant.

The region figure approximating device 102 approximates the region frame by frame each time it receives the result of the extraction at the region extracting device 101. Alternatively, the figure may be approximated using the result of extracting the regions in several frames before and after the present frame. When the result of extracting the regions in several frames is used, changes in the size and position of the approximate figure are smoothed between several frames, which make it possible to smooth the movement or transformation of the approximate figure or make errors in region extraction inconspicuous. The size of the approximate figure may differ from frame to frame.

The figure representative point extracting device 103 extracts representative points depicting the approximate figure outputted from the figure approximating device 102 (step S3). What points are set as representative points depends on what approximate figure is used. For example, when the approximate figure is a rectangle, four or three vertexes can be set as representative points. When the approximate figure is a circle, the center and one point on the circumference or the both ends of the diameter can be set as representative points. When the approximate figure is an ellipse, the vertexes of a circumscribed rectangle for the ellipse may be set as representative points (in this case, too, three of the four vertexes are sufficient) or two foci of the ellipse and one point on the ellipse (e.g., one point on the minor axis) may be set as representative points. When any closed polygon is used as the approximate figure, each vertex has only to be set as a representative point.

Representative points are extracted in each frame each time the figure approximating device 102 outputs information about the approximate figure for one frame. Each representative point is represented by the horizontal coordinate axis X and the vertical coordinate axis Y.

The representative point trajectory function approximating device 104 approximates a time series of the positions of the representative points extracted at the figure representative point extracting device 103 (or the amounts that enable the points to be determined) and arranged in the frames advancing direction, using a function (or approximate function) of time t (e.g., a time stamp assigned to an image) or frame number f (step S4). This function is expressed for each representative point and differs in expression, depending on whether X-coordinate or Y-coordinate are used.

When the number of representative points (or the quantity that enables these points to be determined) is n, a total of 2n approximate functions are created because each representative point requires an X-coordinate approximate function and a Y-coordinate approximate function.

A straight line or a spline curve may be used as a function representing a representative point trajectory.

The above series of processes are carried out over the appearing frame to disappearing frame of the target object.

The determined approximate curve (including a straight line) is recorded as object region data according to a specific format in the object region data storage device 106.

The related information storage device 105, which is provided if necessary, is for storing information (related information) about the objects appearing in the video data stored in the video data storage device 100 and pointer information (including addresses in which related information has been recorded, file names, and URLs) used to acquire the related information from an external storage device or a server via a network. The related information may be characters, sound, still pictures, moving pictures, or a suitable combination of them. Furthermore, the related information may be programs or data that describes the operation of the computer (in this case, when the object is specified by the user, the computer carries out a desired operation). The related information storage device 105 is composed of, for example, a hard disk, an optical disk, or a semiconductor memory, as is the video data storage device 100.

The object region data storage device 106 is a storage medium into which object region data including the data that represents a curve equation approximating a time-sequential trajectory of the positions (the quantity that enables the positions to be determined) of the representative points outputted from the representative point trajectory function approximating device 104. With the configuration including the related information storage device 105, when the related information about the object corresponding to the region expressed by the function is stored in the related information storage device 105, the related information itself and the addresses in which the related information has been recorded can also be recorded in the object region data (when information about the addresses in which the related information has been recorded is stored in the related information storage device 105, the address information can also be recorded). The object region data storage device 106 is composed of, for example, a hard disk, an optical disk, or a semiconductor memory, as is the video data storage device 100.

The video data storage device 100, related information storage device 105, and object region data storage device 106 may be composed of separate storage devices. Alternatively, all of them or part of them may be composed of the same storage device.

Such an object region data creating apparatus may also be realized by executing software on the computer.

In the processing on the object region data creating apparatus (particularly, the processing at the region extracting device 101 or at the figure approximating device 102), when the user is allowed to operate the system, a GUI is used to display the video data in, for example, frames and enable the user to input instructions (which part is omitted in FIG. 1).

Using a more concrete example, the operation of the object region data creating apparatus will be explained.

Explanation will be given showing an example of approximating the object region with a polygon (with the vertexes of an approximate polygon as representative points) and using a second order polynomial spline function as an approximate function. In an example of using a polygon as an approximate figure in the following explanation, the vertexes of a polygon generally means representative points.

Figure 3:
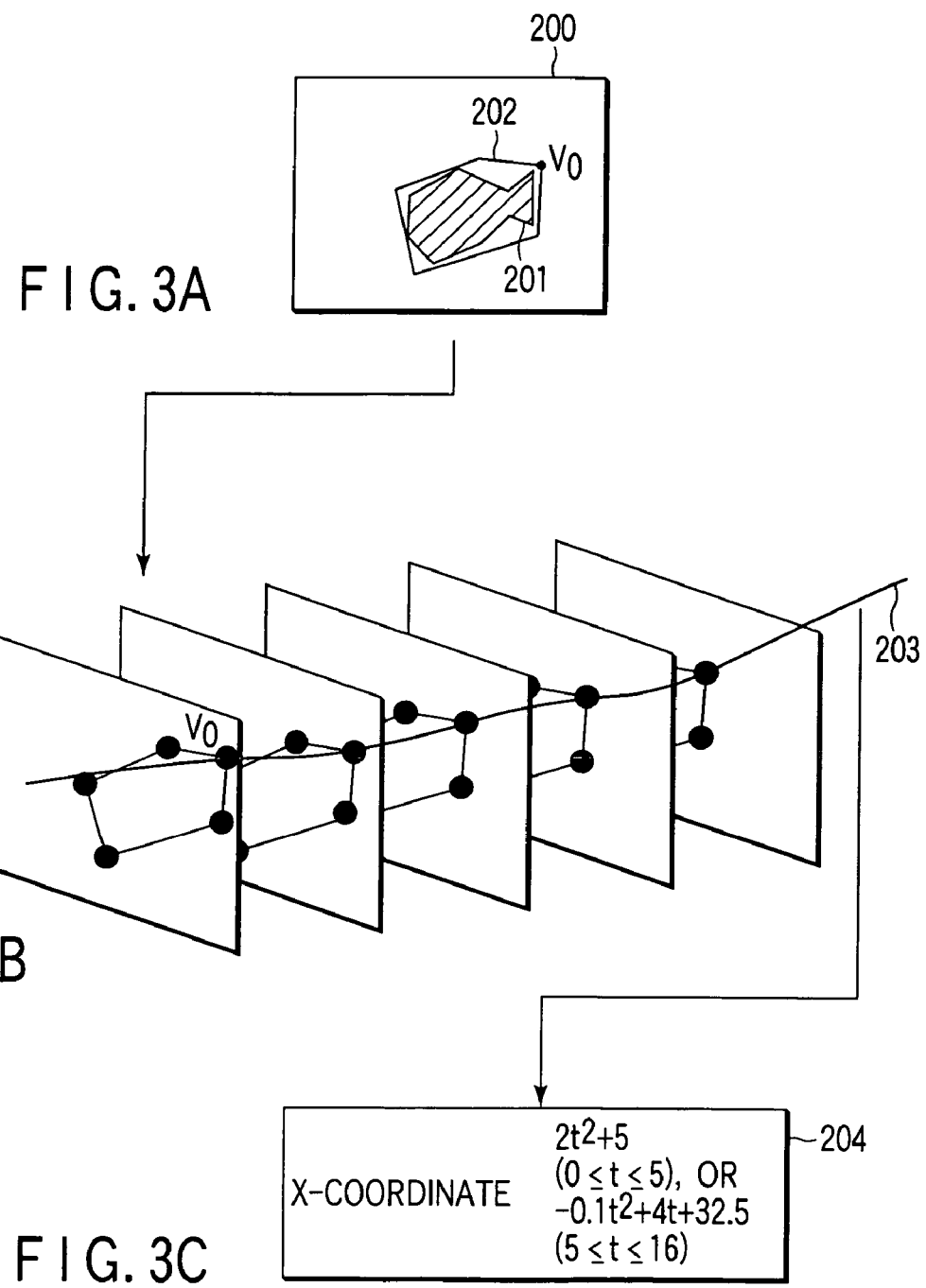
FIGS. 3A, 3B, and 3C are diagrams to help schematically explain the process of describing the object region in an image using object region data.

FIGS. 3A to 3C are diagrams to help give an outline of a series of processes ranging from the process of extracting the object region with the region extracting device 101, the process of approximating the region using figures with the figure approximating device 102, the process of extracting the representative points of the figure with the figure representative point extracting device 103, to the process of approximating the representative point trajectory using a function by means of the representative point trajectory function approximating device 104.

In FIG. 3A, numeral 200 indicates one frame in an image to be processed.

Numeral 201 indicates the object region to be extracted. The process of extracting the region 201 of the object is carried at the region extracting device 101.

Numeral 202 indicates an approximate polygon obtained by approximating the object region using a polygon. The process of finding the approximate polygon 202 from the object region 201 is carried out at the figure approximating device 102.

FIG. 3B illustrates representative points of the approximate figure over a plurality of frames, or the change of the vertexes of the approximate polygon 202 in the example and an approximate curve of those vertexes.

In the first embodiment, a specific representative point selected from a plurality of representative points on the approximate figure is called a reference representative point, which is denoted by $V_0$ (the reference representative point is supposed to be the same all over the frames). In the embodiment, let any one of a plurality of vertexes of the approximate polygon 202 be the reference representative point $V_0$.

There are various selecting methods. They include a method of selecting the point having the largest or smallest X-coordinate or Y-coordinate and a method of selecting the top right point, bottom right point, bottom left point, or top left point.

In the second and later frames, the reference representative point $V_0$ is selected by judging which one of a plurality of representative points in the present frame corresponds to the reference representative point $V_0$ corresponding to the preceding frame.

There are various methods of judging which representative point corresponds to the reference representative point $V_0$ in the preceding frame. For example, they include a method of setting, as the reference representative point $V_0$, the point in the present frame closest to the reference representative point $V_0$ in the preceding frame, a method of setting, as the reference representative point $V_0$, the point in the present frame closest to the reference representative point $V_0$ in the preceding frame when the center of gravity of the approximate figure in the preceding frame is caused to coincide with the center of gravity of the approximate figure in the present frame, a method of finding the reference representative point $V_0$ in the present frame by checking a plurality of representative points of the approximate figure in the preceding figure against a plurality of representative points of the approximate figure in the present figure, and a method of finding the reference representative point $V_0$ in the present frame by checking the video data in the region of the target object in the preceding frame against the video data in the present frame.

Methods of causing representative points other than the reference representative point $V_0$ to correspond to those in adjacent frames include methods similar to those described above and a method of causing other representative points to correspond to those in the adjacent frames, using the reference representative point as the starting point.

These processes are carried out at the representative point extracting device 103.

The representative point trajectory function approximating device 104 finds an approximate function expressing the trajectory 203 from the coordinates of the reference representative point $V_0$ in each frame inputted one after another. In FIG. 3B, numeral 203 indicates the trajectory obtained by connecting moving locations of the reference representative point $V_0$ in individual frames.

The coordinates of the reference representative point $V_0$ include the X-coordinate and Y-coordinate. Each of the coordinates is approximated independently by a function of time t or frame number f.

Numeral 204 in FIG. 3C indicates an example of the function found for the reference representative point $V_0$ (in this case, only X-coordinate axis for the reference representative point $V_0$ is shown). This example shows a case where the approximate section is divided into two, $t=0$ to 5 and $t=5$ to 16.

Figure 4:
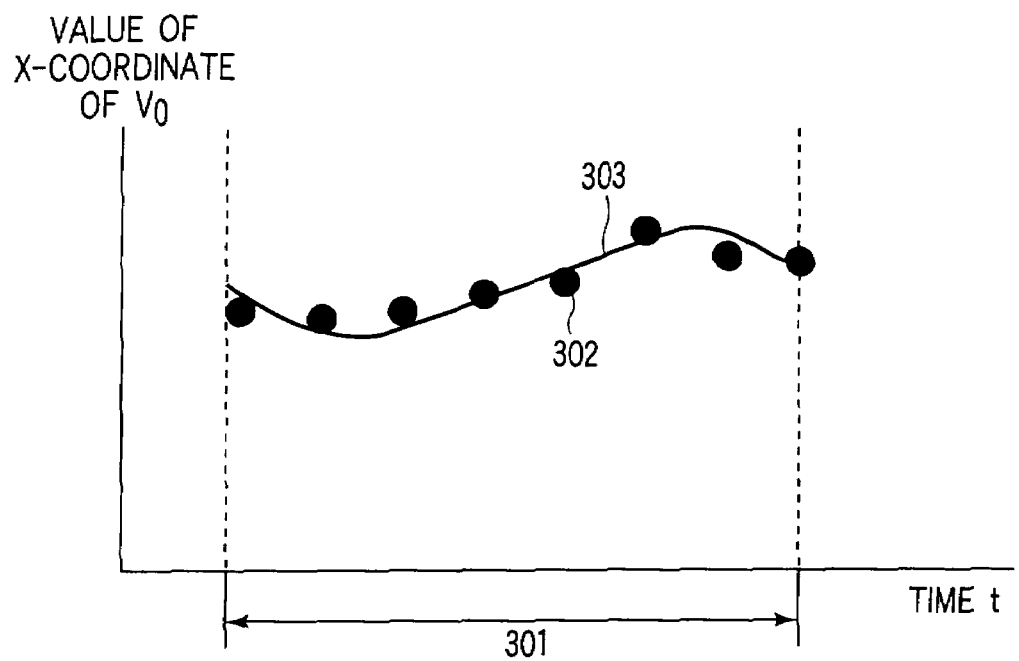
FIG. 4 is a diagram to help explain an example of finding a function that approximates the value of the X-coordinate of a reference representative point.

FIG. 4 shows an example of finding a function for approximating the value of the X-coordinate of the reference representative point $V_0$. In FIG. 4, numeral 301 indicates the time section where the object exists. The black point 302 represents the value of the x-coordinate of the reference representative point $V_0$. Numeral 303 indicates its approximate function. As for the Y-coordinate, an approximate function is found in the same manner. Since polynomial spline functions are used as approximate functions, a polynomial is defined for each of the time sections divided at points called knots. In this case, each of t=0, t=5, and t=16 makes a knot time.

As for representative points other than the reference representative point $V_0$ of the approximate figure, their approximate functions can be found and recorded in the same manner as described above.

Representative points other than the reference representative point $V_0$ may be represented using the relative relationship with other representative points, or using differential vectors. They are described by the trajectory of the vectors.

Hereinafter, explanation will be given showing an example of describing representative points other than the reference representative point $V_0$ using the trajectory of a vector from an adjacent representative point.

Figure 5:
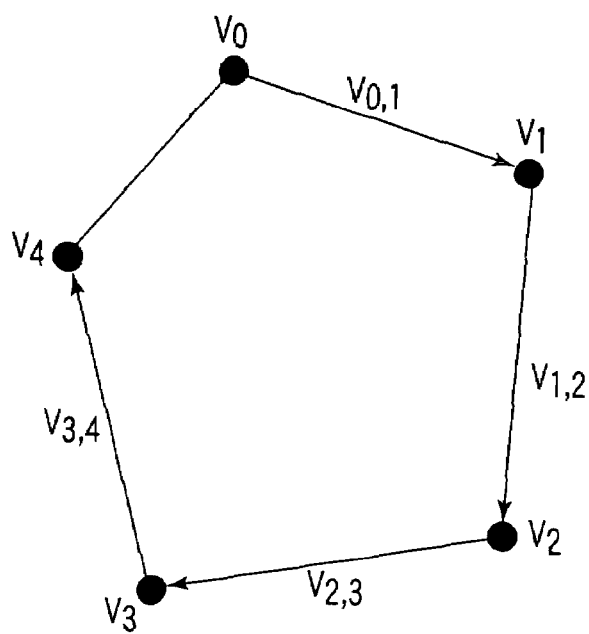
FIG. 5 is a diagram to help explain differential vectors for depicting representative points other than the reference representative point.

FIG. 5 is a diagram to help explain one vertex, the reference representative point $V_0$, and individual differential vectors representing the other vertexes.

The individual vertexes other than the reference representative point $V_0$ are denoted by $V_1, V_2, \ldots, V_{M-1}$, starting from the reference representative point $V_0$ in a predetermined order, for example, clockwise. Here, M is the number of vertexes. Since the figure in FIG. 5 is a pentagon, this gives M=5. The vector from vertex $V_0$ to $V_1$ is denoted by $V_{0,1}$. Vector $V_{1,2}, V_{2,3}, \ldots, V_{M-2,M-1}$ are determined in the same manner. Each vector has the values (relative position data) of the X component and Y component viewed from the starting point of the vector.

Figure 6:
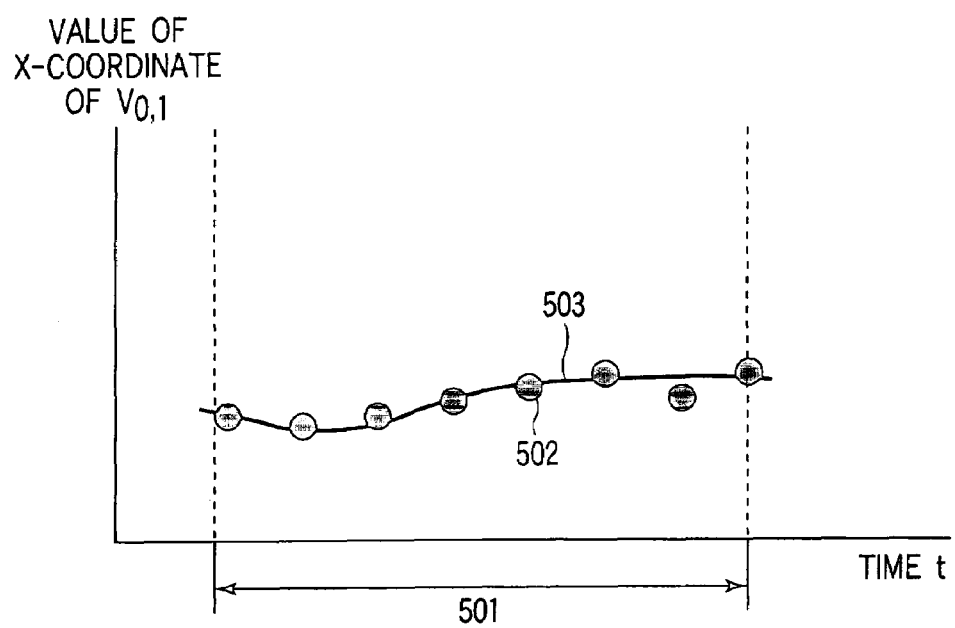
FIG. 6 is a diagram to help explain an example of finding a function that approximates the values of the X components of the differential vectors for depicting representative points other than the reference representative point.

A string of black points 502 in FIG. 6 represents the value of the X-component of vector $V_{0,1}$ at each time.

The process of finding these vectors is carried out at the representative point extracting device 103.

The representative point trajectory function approximating device 104 calculates an approximate function 503 that expresses the values of the X-component and Y-component of each vector.

When the shape of the object hardly changes and the movement of the object is close to parallel translation, the values of vectors $V_{0,1}, V_{1,2}, \ldots, V_{M-2,M-1}$ do not change much. As a result, the difference between the approximate function and the actual values becomes smaller, which makes it possible to expect an improvement in the efficiency in describing the object region. If the shape of the object does not change and the movement of the object is completely parallel translation, the values of vectors $V_{0,1}, V_{1,2}, \ldots, V_{M-2,M-1}$ do not change at all, with the result that all the approximate function makes a straight line and approximation errors are zero.

Figure 7:
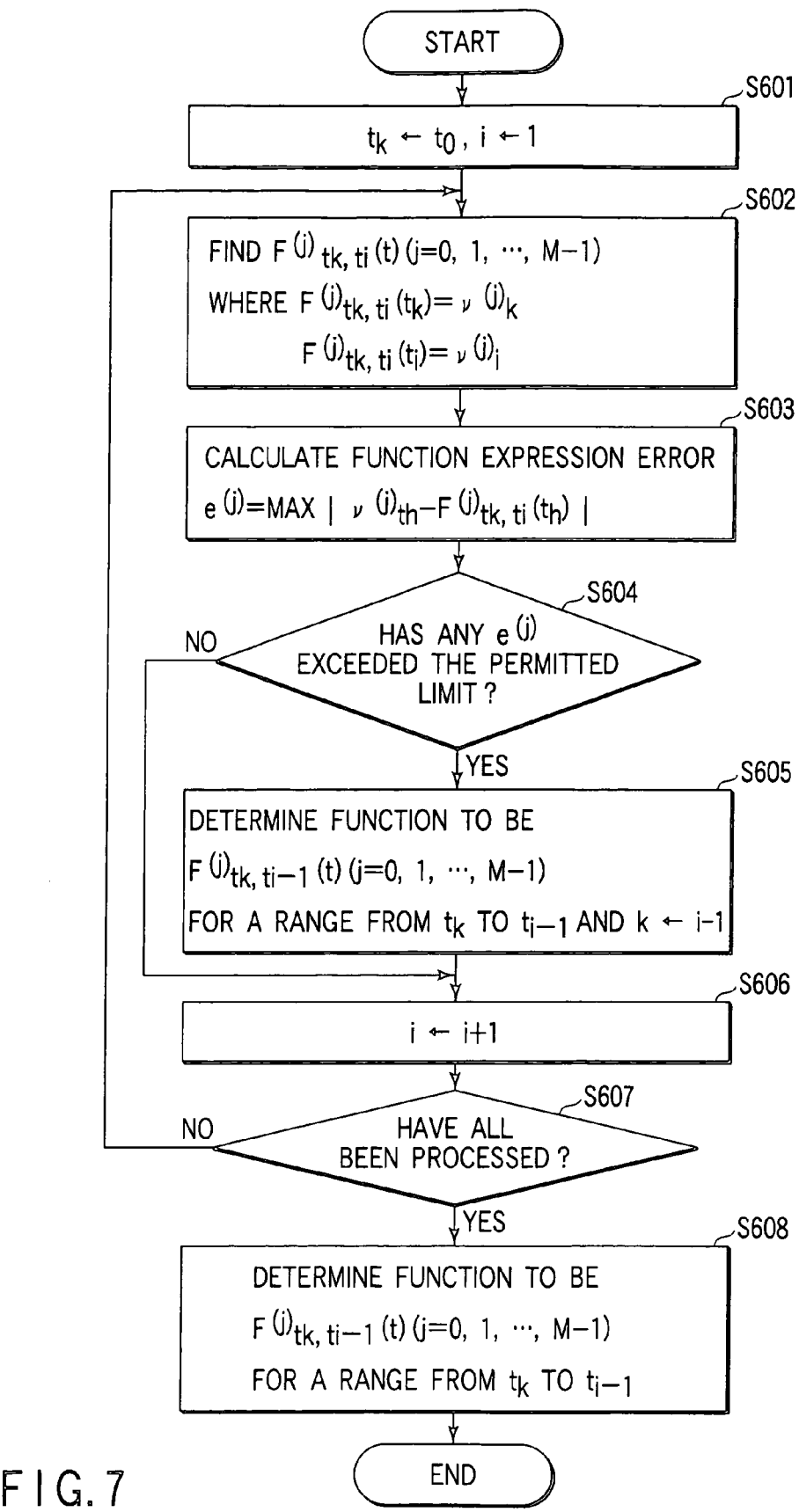
FIG. 7 is a flowchart for the process of finding an approximate function from the coordinates of representative points or differential vectors.

FIG. 7 is a flowchart for an example of the process of finding an approximate function for the coordinates of the representative points or the component values of the differential vectors from the coordinates of the representative points (in this example, the vertexes of the approximate polygon for the object region) inputted one after another to the representative point trajectory function approximating device 104 or from the component values of the differential vectors.

Here, let the time corresponding to the I-th frame be $t_i$ (i=0, 1, . . . ). Moreover, let $v^{(0)}_t$ be the X-coordinate of $V_0$ at time t and let $v^{(j)}_t$ (j=1, 2, . . . , M−1) be the X-component value of $V_{j-1,j}$ at time t. In addition, let the largest of the times t corresponding to the knots of the determined spline function be $t_k$.

First, at step S601, the initial setting of $t_k$ and i is done.

At step S602, an approximate function of $v^{(j)}_t$ (in the first embodiment, a quadratic polynomial) is found over the section ranging from $t_k$ to $t_i$, each corresponding to a knot. A method of finding an approximate function by least squares is most widely used. In this case, however, a condition that the approximate function passes knots must be added. The reason is that, without this condition, a polynomial spline function becomes discontinuous at knots. In FIG. 7, the approximate function $v^{(j)}_t$ found over the section ranging from $t_a$ to $t_b$ is denoted by $F^{(j)}_{ta,tb}(t)$ (j=0, 1, . . . , M−1), the starting point $v^{(j)}_k$ is denoted by $F^{(j)}_{tk,ti}(t_k)$, and the ending point $v^{(j)}_i$ is denoted by $F^{(j)}_{tk,ti}(t_i)$.

Next, at step S603, an approximation error $e^{(j)}$ (j=0, 1, . . . , M−1) of the approximate function is calculated. The approximation error is calculated using the following equation:

$$e^{(j)} = \max |v^{(j)}_{th} - F^{(j)}_{tk,ti}(t_h)|$$

where the range of h taken into account is $k \leq h \leq i$.

At step S604, it is determined whether or not the approximation error is within a permitted limit. The range of the allowed errors may be set to the same value for all the vertexes. Alternatively, each vertex may be permitted in a different range. If any one exceeds the allowed error range, control proceeds to step S605. If all the vertexes are within the allowed error range, control goes to step S606.

At step S605, the approximate function for the section ranging from $t_k$ to $t_{i-1}$ is determined to be $F^{(j)}_{tk,ti-1}(t)$ (j=0, 1, . . . , M−1) and the parameter "k" is set to "i−1".

At step S606, the value of i is incremented by one. Thus, the same approximate function is applied for a section in which the error is within an allowable limit and a new approximate function is found if the error is not within the allowable limit.

At step S607, if the coordinate (or the component value of its difference vector) of a new representative point is not be inputted in an end judging process, the process is completed. If the coordinate (or the component value) of a representative point is inputted, the processes at step S602 and forward are carried out again.

If the end determination is affirmative, at step S608, the approximate function for the section ranging from $t_k$ to $t_{i-1}$ is determined to be $F^{(j)}_{tk,ti-1}(t)$ (j=0, 1, . . . , M−1).

Although only the X-coordinate has been explained in FIG. 7, the same holds true for the Y-coordinate. In judging errors, errors may be evaluated simultaneously for all the X-coordinates and Y-coordinates of the individual vertexes.

The process at the representative point trajectory function approximating device 104 may be carried out each time the coordinates (component values) of the representative points of each frame for the object region are obtained (for example, approximation is made each time the coordinates (component values) of the representative points for each frame are obtained and simultaneously an approximation error is determined. Knots are provided in such a manner that the approximation error lies in a specific range, thereby dividing the approximation section suitably) or after the coordinates (component values) of the representative points of all the frames for the object region have been obtained.

When the representative point trajectory data for the object region is created, the knots may be made the same for the coordinates of all the representative points. For example, when the coordinates (or component values) of the representative points are approximated, if a knot whose error exceeds an allowable value is provided in approximating a representative point, the same knot is forcibly provided for all the other representative points in the approximating process.

The approximate function thus obtained, such as a spline function, is recorded in the object region data storage device 106 according to a predetermined data format.

Hereinafter, the format of the object region data stored in the object region data storage device 106 will be explained. Explanation will be given using a case where representative points are approximated by a spline function. Representative points may be approximated by another suitable function.

Figure 8:
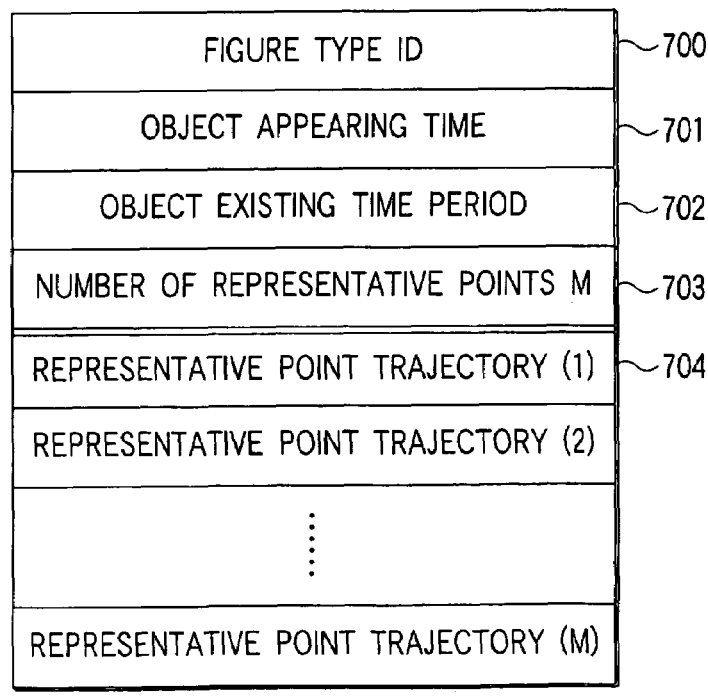
FIG. 8 shows an example of the structure of object region data.

FIG. 8 shows an example of the format of the object region data.

Figure type ID 700 determines the type of the figure used in approximating the object region. For instance, the center of gravity (centroid), rectangle, ellipse, or polygon can be specified.

Number of representative points 703 indicates the number of representative points determined by the figure type.

Representative point trajectory 704 describes the trajectory of a representative point. There are as many trajectory as equal the number of representative points M. When representative points other than the reference representative point $V_0$ are described by the trajectory from an adjacent representative point, the trajectory of the reference representative point $V_0$ is described in the first representative point trajectory (1) 704; the trajectory of $V_{0,1}$ is described in the second representative point trajectory (2) 704; the trajectory of $V_{1,2}$ is described in the third representative point trajectory (3) 704; and the trajectory of $V_{M-2,M-1}$ is described in the M-th representative point trajectory (M) 704.

When approximate functions are found for representative points other than the reference representative point $V_0$ in the same manner as the reference representative point, the trajectory of $V_0$ is described in the first representative point trajectory (1) 704; the trajectory of $V_1$ is described in the second representative point trajectory (2) 704; the trajectory of $V_2$ is described in the third representative point trajectory (3) 704; and the trajectory of $V_{M-1}$ is described in the M-th representative point trajectory (M) 704.

Object appearing time 701 is the time when the desired object appeared. Object existing time period 702 is the length of time during which the object existed. Object disappearing time may be substituted for object existing time period 702. Both object appearing time and object existing time period may be described by frame number and the number of frames instead of time. Since information about object appearing time 701 and object existing time period 702 can also be obtained from the knot time in representative point trajectory 704, they need not necessarily be described.

The object appearing time/object appearing frame, object existing time period/object exiting frame, and object disappearing time/object disappearing frame may be determined by the frames in which the object actually appeared and disappeared in the image. Alternatively, for example, any frame number after the appearance of the object in the image may be set as the start frame number and any frame number after the start frame number and before the one in which the object disappeared in the image may be set as the end frame number.

The object region data item may include an ID number, which is identification number assigned to each object.

A single object may be approximated by a plurality of approximate figures. In this case, the object region data includes, for example, as many figure type IDs, representative points, and representative point trajectories as equal the number of figures used in approximation.

Figure 9:
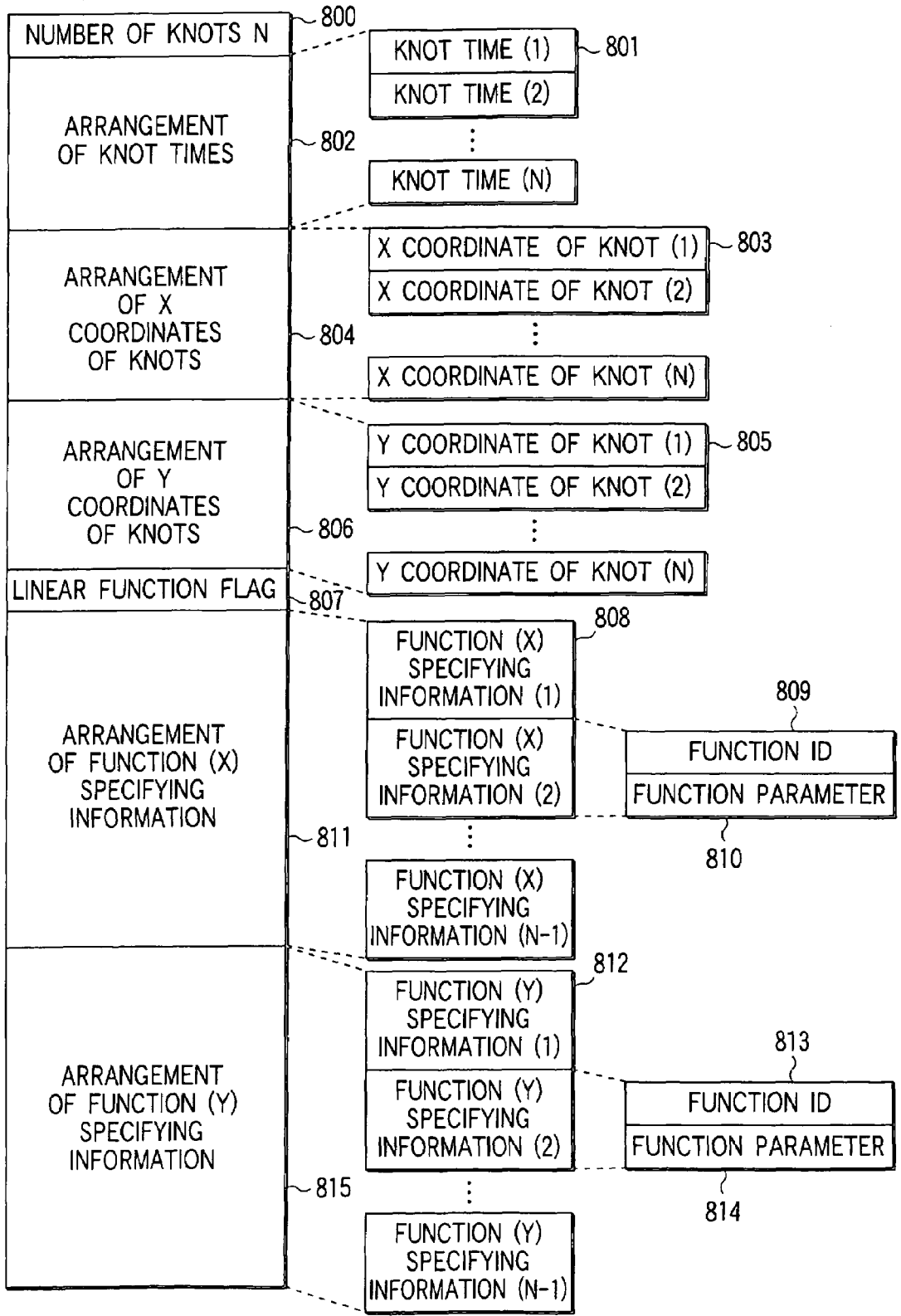
FIG. 9 shows an example of the structure of the representative point trajectory data in the object region data.

FIG. 9 is a concrete example of the data format of the representative point trajectory.

Number of knots 800 indicates the number of knots of a spline function that expresses a representative point trajectory. The frame corresponding to each knot is expressed in time and stored in knot time 801. Since there are as many knot times as equal the number of knots, they are described in an arrangement form 802. Similarly, the value of the X-coordinate of each knot (or the quantity that enables the coordinate, such as the x-component value of its difference vector, to be determined) and the value of the Y-coordinate of each knot (or the quantity that enables the coordinate, such as the y-component value of its difference vector, to be determined) are described in the form of an arrangement 804 of X-coordinate of knots 803 and an arrangement 806 of Y-coordinate of knots 805, respectively.

Linear function flag 807 indicates whether only linear functions are used as spline functions between knots. When a quadratic polynomial is partially used, this flag is set off. Use of the flag 807 makes it unnecessary to describe any piece of function specifying information 808, 812, which will be explained below, when only linear function is used as an approximate function. This helps decrease the amount of data. The flag is not necessarily used.

Function ID 809, 813 and function parameter 810, 814 included in the function specifying information 808, 812 indicate the degree of each polynomial spline function and information for determining its coefficient, respectively. For example, when a linear polynomial is used, 1 is set; and when a quadratic polynomial is used, 2 is set (of course, the highest degree of a polynomial may be set to degree 3 or higher). Since information about only knots is sufficient in using a linear polynomial, function parameters are not described. When a quadratic polynomial is used, a single value for determining a coefficient (for example, a quadratic coefficient or the coordinate of one point other than the knots on the quadratic curve (the component value when differential vectors are used)) is described in a function parameter. There are as many pieces of function specifying information as equal the number of knots minus one. They are described in arrangement form 811, 815.

In the methods explained above, to describe representative points other than the reference representative point $V_0$, the differential vectors from adjacent representative points are found and converted into approximate functions. In addition to this method, there is a method of using differential vectors from the reference representative point $V_0$.

Figure 10:
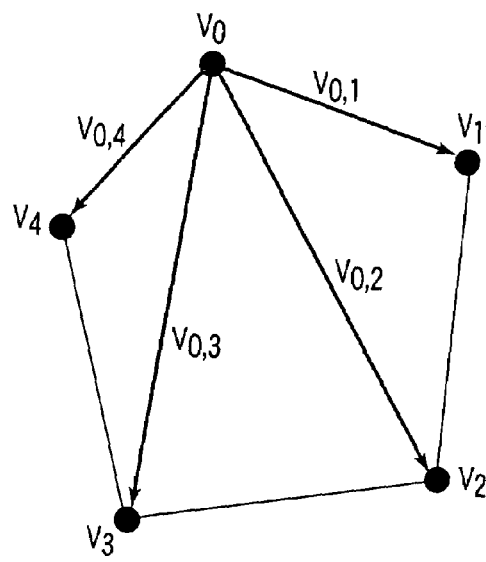
FIG. 10 is a diagram to help explain another example of differential vectors for depicting representative points other than the reference representative point.

For example, as explained in FIG. 10, vector $V_{0,i}$ from $V_0$ to $V_i$ is calculated for a representative point $V_i$ (in this case, each vertex of the approximate polygon) other than the reference representative point $V_0$. Then, in the process of FIG. 7, $v^{(j)}_t$ (j=1, 2, . . . , M-1) is replaced with the component value of $V_{0,i}$ at time t.

This method has the advantage that, since any representative point other than the reference representative point $V_0$ can be described by the reference representative point $V_0$ and a single vector, errors in the values obtained from the descriptive data are not accumulated.

Figure 11A:
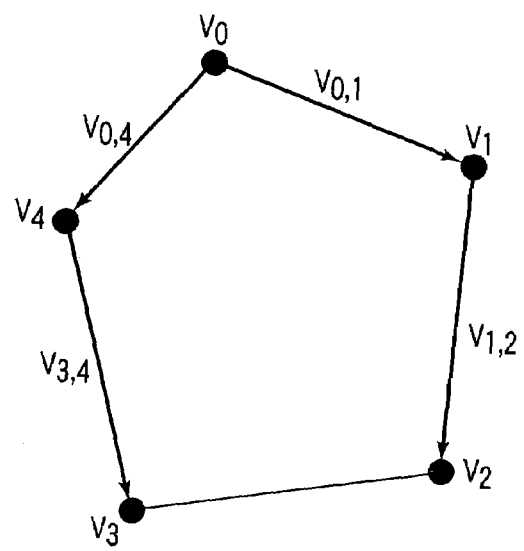
FIGS. 11A and 11B are diagrams to help explain still other examples of differential vectors for depicting representative points other than the reference representative point.
Figure 11B:
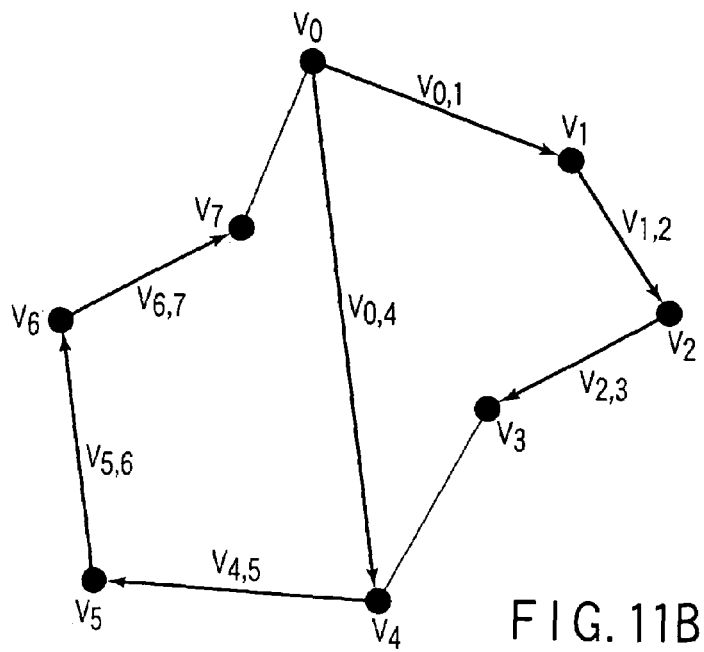

There is another method of finding half of the vectors clockwise, starting from the reference representative point $V_0$, and the remaining half of the vectors counterclockwise as shown in FIG. 11A. Still another method is to provide a plurality of representative points expressed by vectors from the reference representative point $V_0$ and then find vectors between adjacent vectors, as shown in FIG. 11B.

When the number of representative points of an approximate figure is a ($a \geq 3$), each of the representative points equal to 2 or more and (a−1) or less may be set as the reference representative points and the remaining one or more representative points be expressed by differential vectors from the representative points.

In these cases, there are as many representative point trajectory 704 of the object region data in FIG. 8 as equal the number of representative points M.

The method of expressing representative points other than the reference representative point in various ways using the reference representative point in individual frames as the basic point has been explained. Hereinafter, a method of describing the object region by expressing the movement of a representative point by vectors in consecutive frames and converting the trajectory of these vectors into an approximate function will be explained.

Figures 12, 13:
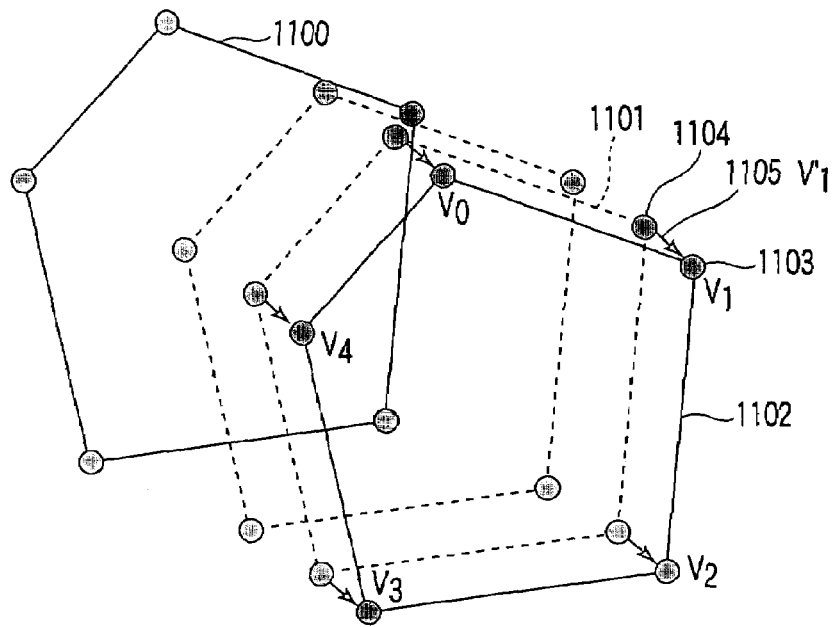
FIG. 12 is a diagram to help explain an example of differential vectors between frames.
FIG. 13 shows another example of the structure of the object region data.

In FIG. 12, numeral 1100 indicates an object approximate figure (polygon) in the initial frame. Numeral 1102 indicates an object approximate figure in the frame at time t. Numeral 1101 indicates an object approximate figure just before 1102. Numeral 1103 indicates one of the representative points of the object region at time t. Numeral 1104 indicates the representative point corresponding to the representative point 1103 in the preceding frame. Numeral 1105 indicates a motion vector from the representative point 1104 to the representative point 1103, representing the movement of a representative point in the frame at time t. Since the motion vector is obtained at each time corresponding to each frame, it is possible to perform approximation using a function of time t as described above.

A method of describing the object region is to execute the flowchart of FIG. 7 using $v^{(j)}_t$ (j=0, 1, . . . , M−1) as the component values of $V'_t$ at time t. Here, let the motion vector of $V_t$ at time t be $V'_t$. In this method, the motion vector of $V_0$ is calculated in the same manner as those of the other representative points and converted into an approximate function.

In a method using such a motion vector, the coordinates of all the representative points of the approximate figure in the frame where an object appeared have to be described. Accordingly, the data format (corresponding to the example of FIG. 8) described in this method is as shown in FIG. 13. The data format of FIG. 13 differs from that of FIG. 8 in that representative point initial position 1200 is added. In the representative point initial position 1200, the coordinates of M representative points in the initial frame are described. In this case, the coordinates of all the representative points have only to be described directly. Another method is to describe only the coordinate of one representative point directly and further describe the coordinates of the other representative points using differential vectors from adjacent representative points as shown in, for example, FIG. 5. Still another method is to describe representative points using differential vectors from one representative point $V_0$ as explained in FIG. 10.

Still another method of describing the object region data is to find directly the motion vector from the position of the initial representative point to the position of a representative point at time t and convert the motion vector into an approximate function.

Next, a method of extracting the object region at given time T from information about the object region described in the object region data will be explained. This process is executed at an information processing system that handles video data and its object region data. Such an information processing system can, of course, be realized by executing software on a computer.

Figure 14:
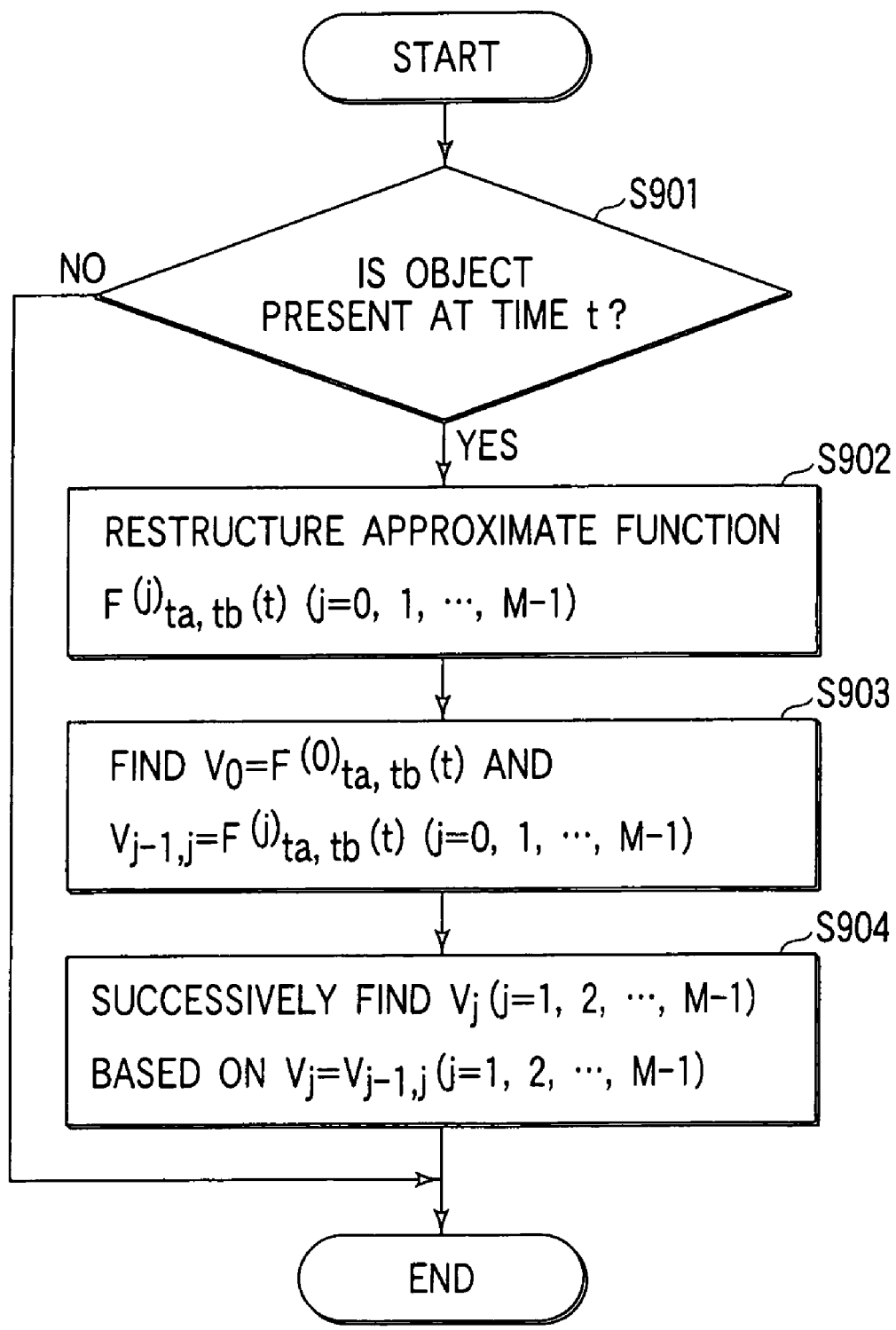
FIG. 14 is a flowchart for the process of extracting the object region at a give time from the object region data.

FIG. 14 is a flowchart for an example of the process in that case.

The following is an explanation of describing representative points other than the reference representative point $V_0$ using the trajectory of a vector from an adjacent representative point.

At step S901, it is determined whether an object exists at a given time T. The determination can be made easily by referring to the object appearing time 701 and object existing time period 702. If no object exists at time T, this means that there is no object region. Thus, the process is ended immediately.

At step S902, the approximate function $F^{(j)}_{ta,tb}(t)$ (j=1, 2, . . . , M−1) at time T is restructured. Here, let the times at both end knots of time T be $t_a$ and $t_b$. The approximate function can be reconstructed using the coordinates (or the component values of its difference vector) at $t_a$ and $t_b$ described at X-coordinate of knot 803 or Y-coordinate of knot 805, function ID 809, 813, and function parameter 810, 814, as shown in FIG. 9. That is, when a linear polynomial is used as the approximate function, it can be obtained as a straight line passing two knots. When a quadratic polynomial is used and a quadratic coefficient is described in the function parameter, the quadratic coefficient is determined from the value of the function parameter and the coefficient of lower than second order is determined in such a manner that the line passes knots.

At step S903, t=T is substituted into the approximate function, thereby finding the coordinate of $V_0$ at time T and the component values of $V_{1,2}, V_{2,3}, \ldots, V_{M-2,M-1}$.

Finally, at step S904, $V_0$ and $V_{1,2}, V_{2,3}, \ldots, V_{M-2,M-1}$ are added one after another, thereby calculating the coordinates of $V_0, V_1, \ldots, V_{M-1}$.

On the basis of the representative points obtained in this way, the information processing system can carry out various processes. They include the process of creating a figure that approximates the object region, the process of showing the user the target object by depicting the region of the approximate figure in the object's video data in a specific representation form, and the process of, when the user specifies an image on the screen with a pointing device, such as a mouse, judging that the target object has been specified, if the approximate figure of the object region at that time (field) exists and the specified position is within the approximate figure.

For example, when related information is attached to the object region data of FIG. 8, or when a database including related information about individual objects exists independently from the object region data, the related information is used for hypermedia or search of objects.

In hypermedia, when the user specifies the object with a mouse, it is determined whether the specified time and place are inside or outside the object region and, if it is determined that they are inside the object region, related information about the object is retrieved or displayed easily. When the related information is the data that describes a program or the operation of the computer or its pointer, the user can specify the object to make the computer carry out a specific operation.

In the first embodiment, any video and object may be used. For instance, when videos are such content as movies, objects are such characters as actors, or properties in a movie, and related information is explanation about the actors, the viewer seeing a movie can read a description of the desired actor by just clicking on the actor's image. Similarly, the related information can be applied to any type of electrical content, such as electronic encyclopedias or electronic catalogs.

For instance, in searching for an object, the passing position of the object, the non-passing position of the object, the size of the object at a certain position, and the stay time at a certain position can be used as search keys to search for an object that satisfies the condition. For any search key, whether the condition is satisfied can be judged by extracting the coordinates of representative points one after another in the time period during which the object exists, judging whether a given point is inside or outside the figure composed of representative points, and calculating the area.

Furthermore, describing a keyword in the related information enables the object to be searched for by the keyword. Moreover, describing the amount of feature, such as shape, texture, activity, or color, extracted from the object in the related information enables the object to be searched for on the basis of the amount of feature.

In addition, for example, on the basis of the quantity of feature, such as the shape, texture, activity, or color of the object obtained by analyzing the object region data, a surveillance system for watching for a dubious character can be realized.

Hereinafter, a method of providing video data and object region data will be explained.

To provide the user with the object region data created by the processes of the first embodiment, the provider needs to offer the object region data to the user by any suitable method. Various modes of the providing method can be considered as described below:

(1) The mode of recording the video data, its object region data, and its related information onto a single recording medium (or plural recording mediums) and offering these data items to the user at the same time.

(2) The mode of recording the video data and its object region data onto a single recording medium (or plural recording mediums) and offering these data items to the user at the same time, but offering the related information separately to the user or not offering the related information to the user (the latter case is that, for example, the user can acquire the related information via the Internet or the like, even if it is not offered to the user).

(3) The mode of offering the video data to the user independently, recording the object region data and related information onto a single recording medium (or plural recording mediums), and offering these data items to the user at the same time.

(4) The mode of offering the video data, object region data, and related data separately to the user.

In these modes, the data items are offered mainly with a recording medium. Alternatively, part or all of the data items may be offered with a communication medium.

As described above, in the first embodiment, the object region in the video can be described by the parameters of the curve that approximates the time-sequential trajectory of the representative points of the approximate figure (the trajectory of the coordinates (or the quantity that enables the values to be determined) of the representative points using the frame numbers or time stamps as variables). Therefore, the amount of data used to determine the object region is decreased effectively and handling is made easier. When the object is a rigid body, the relative position varies less than the absolute position and a function that approximates its trajectory can be described using a smaller amount of information. Moreover, the amount of communication in transmitting the data can be reduced. It is easy to create an approximate figure from the parameters of the approximate curve. When a basic figure (e.g., a closed polygon) is used as a representative of the approximate figure, this makes it possible to determine whether or not any coordinate specified by the user is inside the object region (approximate figure) (whether or not the object region has been specified), using a simple determination equation. Therefore, it becomes easy to specify the moving object in the video so that it is easily search the object based on the passing position of the object, the non-passing position of the object, and the stay time at a certain position. There is provided a hypermedia application with easy handling.

Other embodiments of the object data creating apparatus according to the present invention will be described. The same portions as those of the first embodiment will be indicated in the same reference numerals and their detailed description will be omitted.

Second Embodiment

A second embodiment of the present invention is such that information on the direction of depth, in addition to the two-dimensional information on the screen, is included in the object region data about an object in the image in the first embodiment. Explanation will center on the difference between the second embodiment and the first embodiment.

Figure 15:
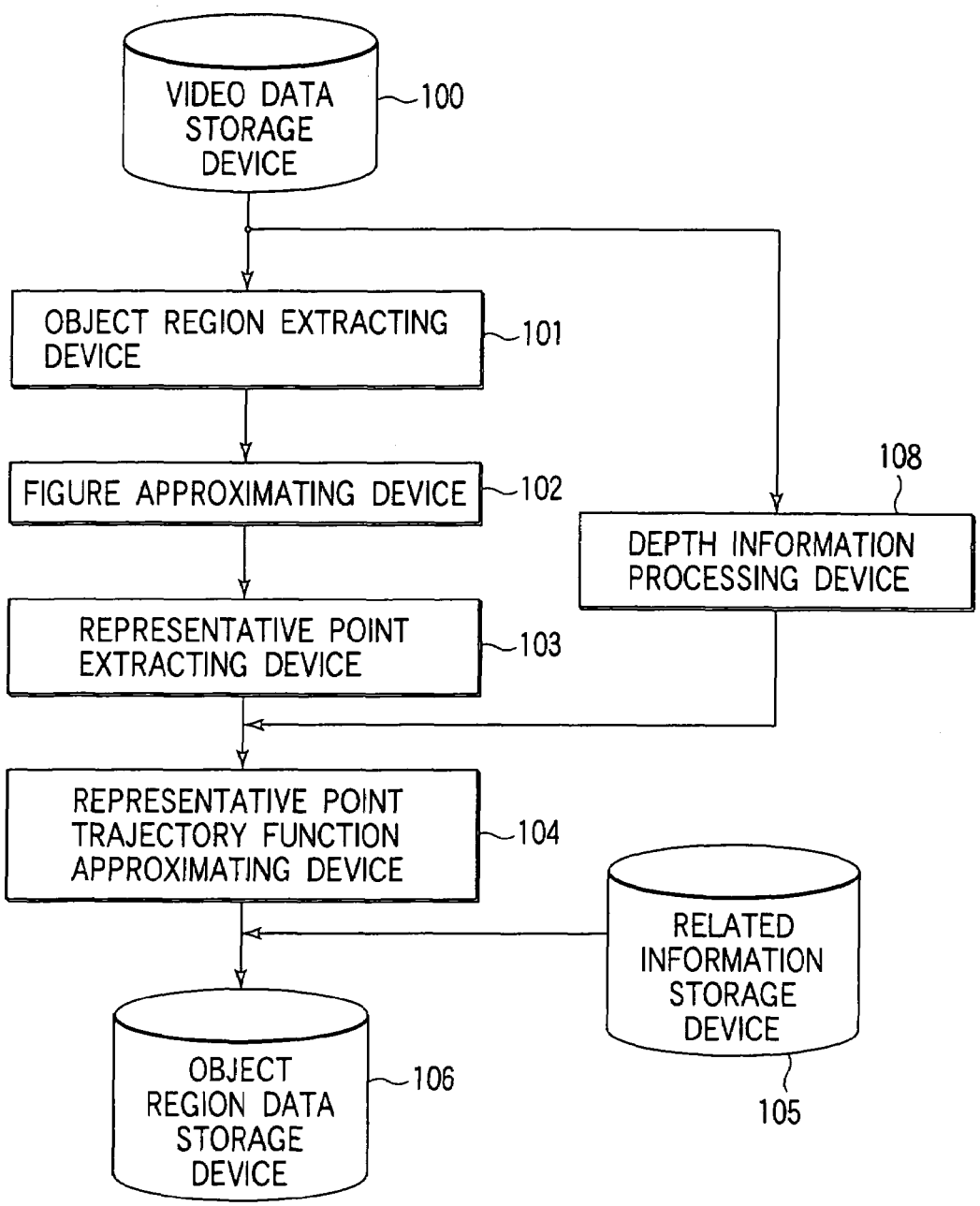
FIG. 15 shows an object region data creating apparatus according to a second embodiment of the present invention.

In the second embodiment, the object region data creating apparatus of the first embodiment has to be further provided with a processing device 108 for obtaining information about the direction of depth (hereinafter, referred to as depth information). The depth information processing device 108 is connected between the video data storage device 100 and the representative point trajectory function approximating device 104, as shown in FIG. 15.

There are two methods of giving depth information: one method of giving depth information in consecutive values (Z-coordinates) and the other method of giving depth information in discrete level values (more preferably integral values in a specific range). When the video data comes from a video camera, each value is based on the data obtained by measuring the object or is specified by the user. When the video data is artificial (as in CG or animation), the video data is based on the value about depth, if this value is given, or is specified by the user.

In each of the above cases, the depth information is given to each target object or to each representative point of an approximate figure of the target object.

In each combination of the above methods, the depth information is given to all of the frames ranging from the object appearing frame to object disappearing frame or to all of the specific sections (e.g., the adjacent knot sections) of the frames ranging from the object appearing frame to object disappearing frame.

When the method of using consecutive values as the depth information, the method of giving the depth information to each representative point, and the method of giving the depth information to all the frames ranging from the object appearing frame to object disappearing frame are used, the Z-coordinate of each representative point is subjected to the same process as are the X-coordinate and Y-coordinate of each representative point of the approximate figure of the target object in the first embodiment (this process is carried out at the representative point trajectory function approximating device 104).

Figure 16:
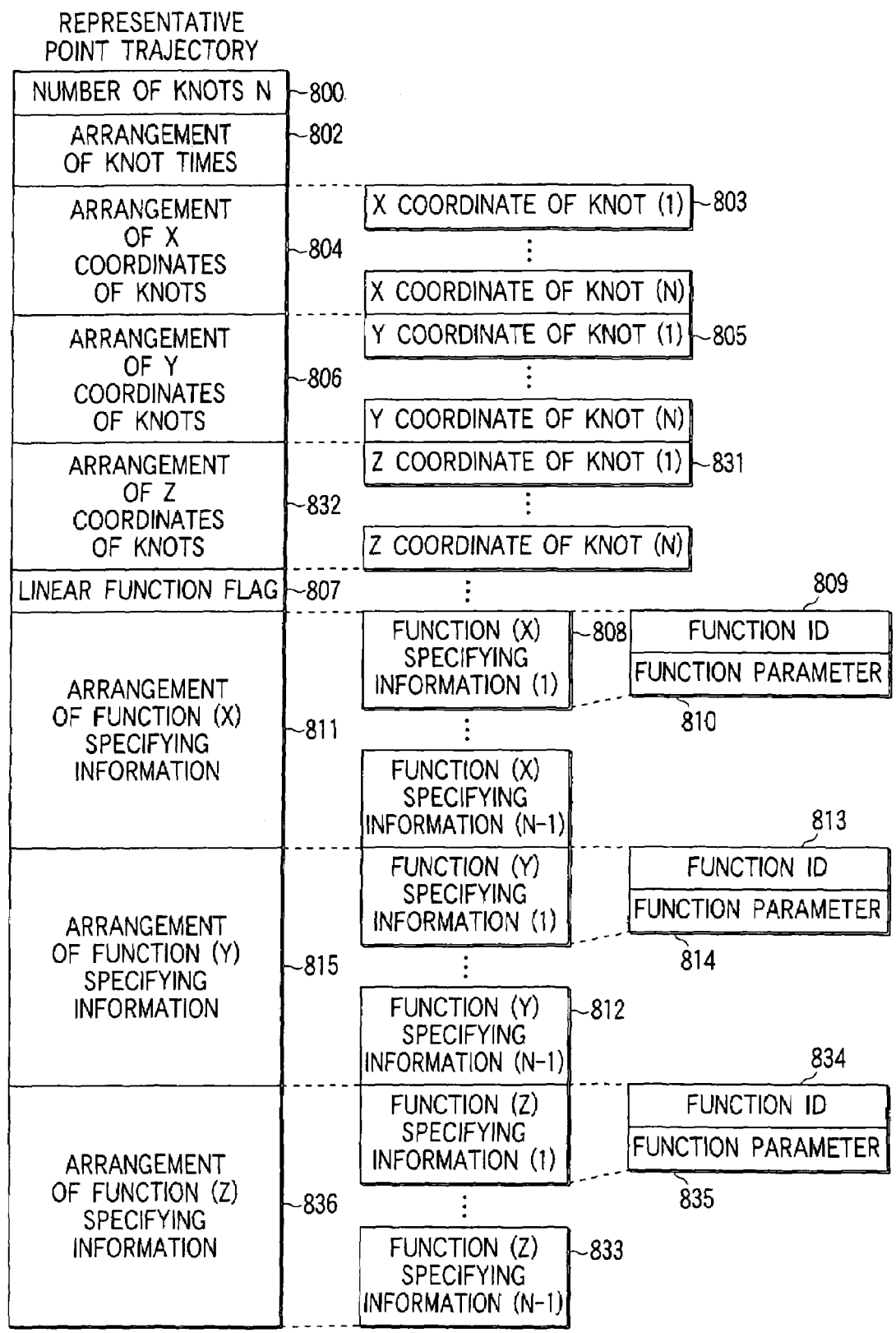
FIG. 16 shows an example of the structure of the representative point trajectory data in the object region data according to a second embodiment.

In this case, an example of the data format of a representative point trajectory of the object region data (e.g., the object region data of FIG. 8 and its variations) is shown in FIG. 16. FIG. 16 differs from FIG. 9 in that an arrangement of Z-coordinates of knot 832 and an arrangement of function (Z) specifying information 836 are added to the X-coordinate and Y-coordinate.

When the method of using consecutive values as the depth information, the method of giving the depth information to each target object, and the method of giving the depth information to all the frames ranging from the object appearing frame to object disappearing frame are used, the Z-coordinate of the target object is subjected to the same process as are the X-coordinate and Y-coordinate of each representative point of the approximate figure of the target object in the first embodiment (this process is carried out at the representative point trajectory function approximating device 104).

Figure 17:
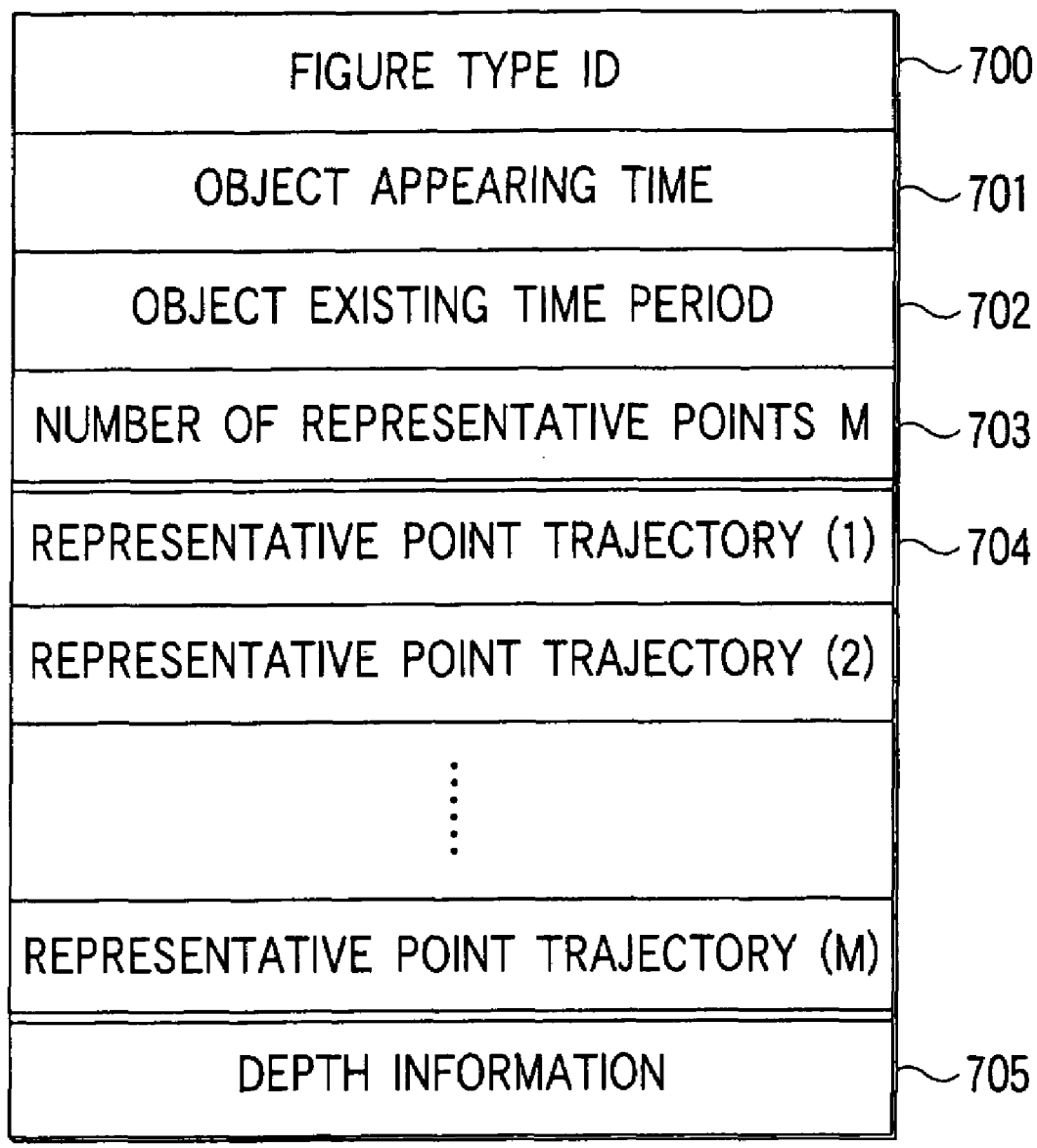
FIG. 17 shows still another example of the structure of the object region data.
Figure 18:
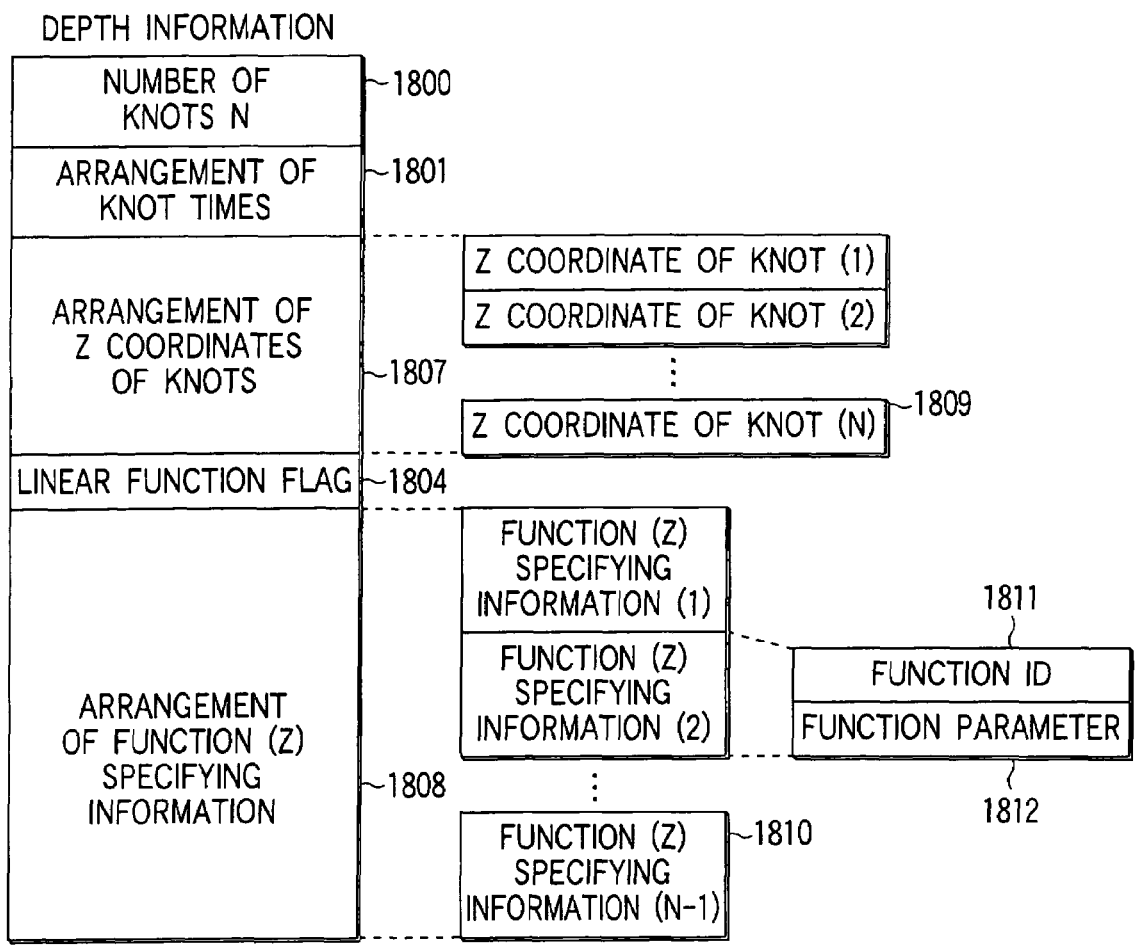
FIG. 18 shows an example of the data structure of depth information.

In this case, for example, as shown in FIG. 17, the depth information 705, or the trajectory of the value of the Z-coordinate of the target value, is added to the object region data (e.g., the object region data of FIG. 8 and its variations). An example of the data format of the depth information is shown in, for example, FIG. 18. FIG. 18 differs from FIG. 9 in that only the value of the Z-coordinate is described.

When the level value (discrete value) is used in the above two methods, it is expected that the same level value will last over a plurality of frames. Therefore, for example, each time the level value changes, the level value after the change and the number of the frame whose level value has changed may be described.

Furthermore, when the depth information is given to the adjacent knot sections, it is expected that the number of adjacent knot sections is not much larger than the number of all the frames ranging from the object appearing frame to disappearing frame. Therefore, the correspondence between all the values and the adjacent knot sections may be described.

The following is an explanation of how the processing device for obtaining the depth information measures the values.

The depth information includes such absolute information as the distance from the camera or a coordinate in a coordinate system set in a three-dimensional space and such relative positional information as the moving distance from the initial object position or the numerical value representing the magnitude of the moving distance.

Since it is generally difficult to find absolute positional information from the image taken by a single camera, the positional information is acquired by making measurements using a special range sensor as described in Iguchi and Sato, "Three-dimensional image measurement," Shokodo, pp. 20-52, or using a plurality of cameras and a stereo method. When a certain imaging condition can be assumed, however, the positional information can be obtained even from the image taken by a single camera. An example of this case will be given below.

Figure 19:
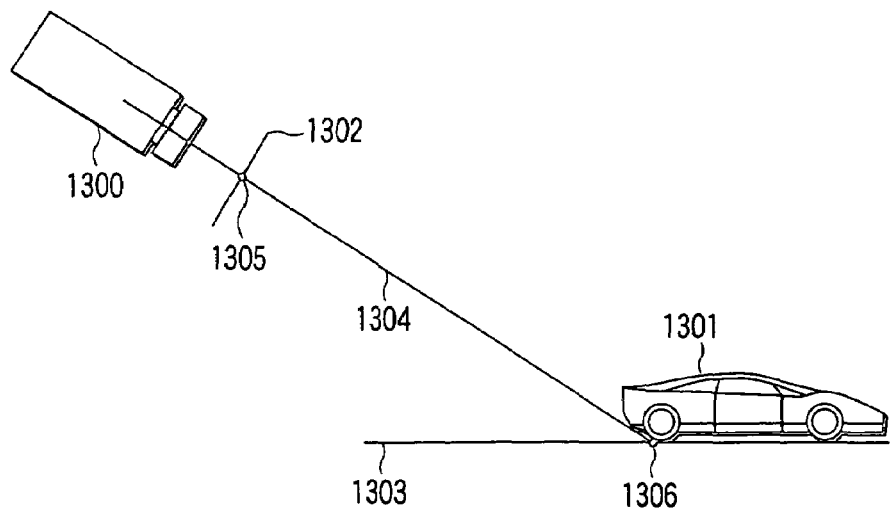
FIG. 19 is an illustration to help explain the measurement of positional information in the direction of depth.

For example, in watching a road, a car 1301 is imaged by a camera 1300 as shown in FIG. 19. Since the camera is generally fixed, the camera 1300 can be calibrated in advance. A plane equation can be calculated in a three-dimensional space in advance, provided that the road surface on which the car runs is a flat surface. Under these preconditions, the position of a point 1306 where the tire section of the car touches the ground 1303 is determined. On an image pickup plane 1302, the point 1306 is assumed to have been sensed at the position of a point 1305. On this assumption, the intersection of the viewing line 1304 of the camera passing the point 1305 and the plane 1303 is determined, thereby finding the position of the point 1306.

The viewing line 1304 of the camera can be calculated from the camera parameter obtained from calibration. Although the road surface is known, the height of the car's bumper may be assumed to be known.

For example, in the information processing system that handles the video data and its object region data, an object close to the specified position can be searched for using these three-dimensional data items.

Figure 20:
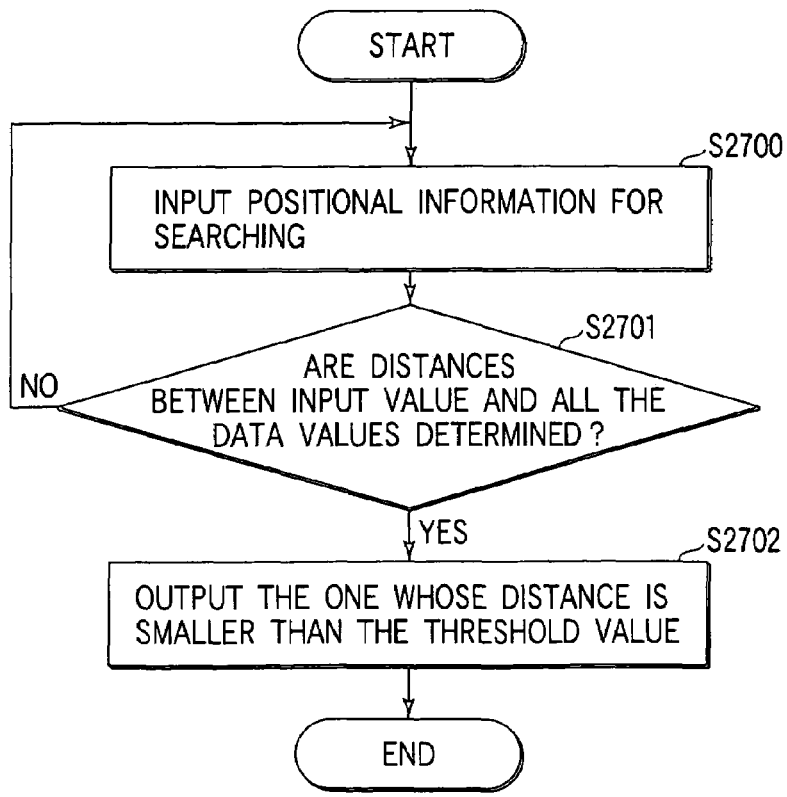
FIG. 20 is a flowchart for the process of searching for an object near the specified position.

FIG. 20 is a flowchart for such a searching process.

First, at step S2700, positional information about the specified object to be searched for is inputted.

At step S2701, the distance between its position and the object's three-dimensional position related to the whole object region data is calculated.

After the three-dimensional distance has been calculated for all the objects, the objects whose distance is smaller than a threshold value are found and outputted. Instead of determining the threshold value, the object whose distance is the smallest may be outputted as the result of the searching.

It is difficult to determine the absolute positional information about the object in the video from only the general video. In the case of the image of a car coming closer from FIG. 21A to FIG. 21B taken by a stationary camera, observing changes in the size of the car on the image screen makes it possible to determine such relative depth information as tells whether the car was coming closer to or going farther away from the camera. An example of this case will be given below.

An ordinary camera optical system can be illustrated using a perspective transformation model based on a pinhole camera as shown in FIG. 22. Numeral 1600 is the lens principal point of a camera and 1601 an imaging plane. It is assumed that an object 1602 is moving closer to the camera. FIG. 23 is a view of the situation taken from above. As shown in FIG. 23, it is assumed that the object moves closer to the camera, while keeping parallel with the Z-axis. The width 1704 of the image of the front side of the object 1704 before movement increases to the width 1705 of the image of the front side of the object 1705 after movement. The smaller the distance between the object and the camera lens principal point 1700, the larger the image. Thus, changes in the relative position can be expressed using the size of the image. For example, let the width of the image at the initial position of the object be 1. On this assumption, the ratio of the initial width to that of a subsequent image is calculated. Since the width of the image can be considered to be proportional to the reciprocal of the distance from the lens principal point 1700, the reciprocal of the value of the ratio is calculated and held as the depth information. In this case, the closer the car gets to the camera, the smaller the value. The farther the car goes away from the camera, the larger the value. Instead of width, the area of the image or the area of a characteristic texture of the object surface may be used.

For example, in the image processing system that handles video data and its object region data, use of information that tells changes in these relative positions makes it possible to find the time when one moving object will be at a specified distance.

Figure 24:
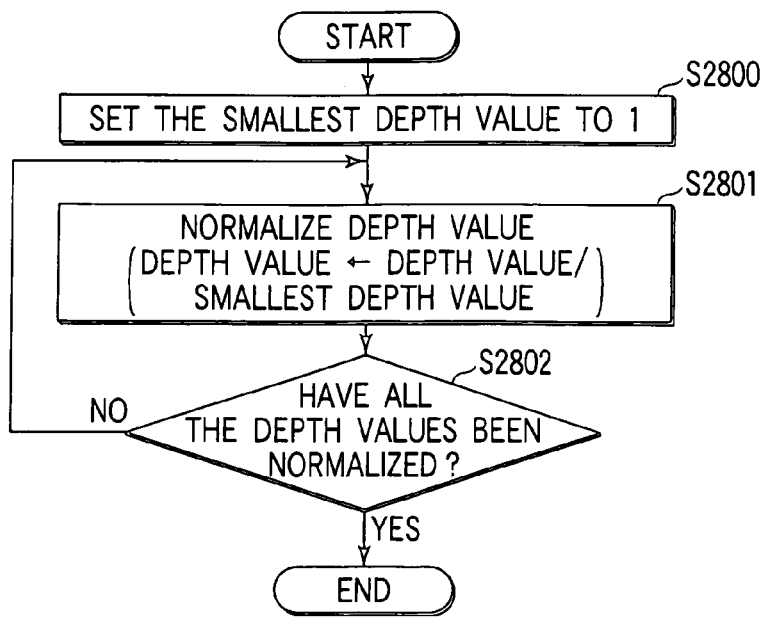
FIG. 24 is a flowchart for the preprocess of determining the time when the moving body exists at the specified distance.

FIGS. 23 and 24 are flowcharts for examples of the process in this case.

FIG. 24 is a flowchart for the preprocess of actually making a search. In FIG. 24, the depth value one moving object holds is normalized. At step S2800, let the smallest value of the depth value be 1. At step S2801, the depth value is normalized by dividing the smallest value. At step S2802, it is determined that all the processes have been completed.

Figure 25:
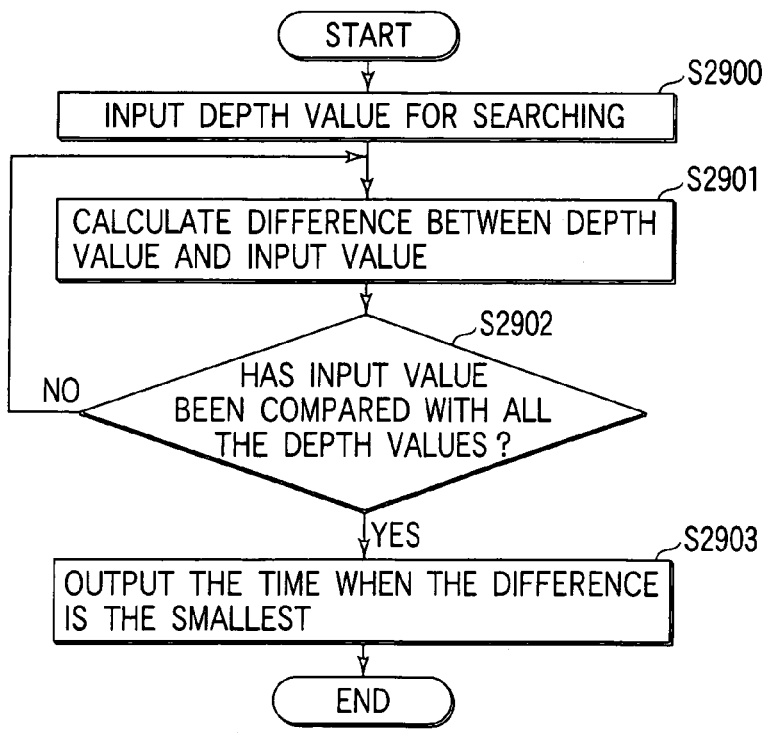
FIG. 25 is a flowchart for the process of determining the time when the moving body exists at the specified distance.

Next, at step S2900 in FIG. 25, the depth value is inputted. At step S2901, the difference between the input value and the depth value is calculated. After the input value has been compared with all the depth values (step S2902), the time at which the difference is the smallest is outputted (step S2903).

With the second embodiment, adding information on depth as well as the two-dimensional positional information, plane information, makes it possible to search for an object, taking into account the direction of depth, for example, the distance information from the camera.

Third Embodiment

A third embodiment of the present invention is such that display flag information is further included in the object region data in the video in the first or second embodiment. The display flag information is related to a display flag that indicates whether an object (or part of the object) is visible or invisible because it hides behind another object. Explanation will center on the difference between the third embodiment and the first or second embodiment.

In the third embodiment, a process related to the display flag is carried out at, for example, the representative point trajectory function approximating device 104.

Figure 26:
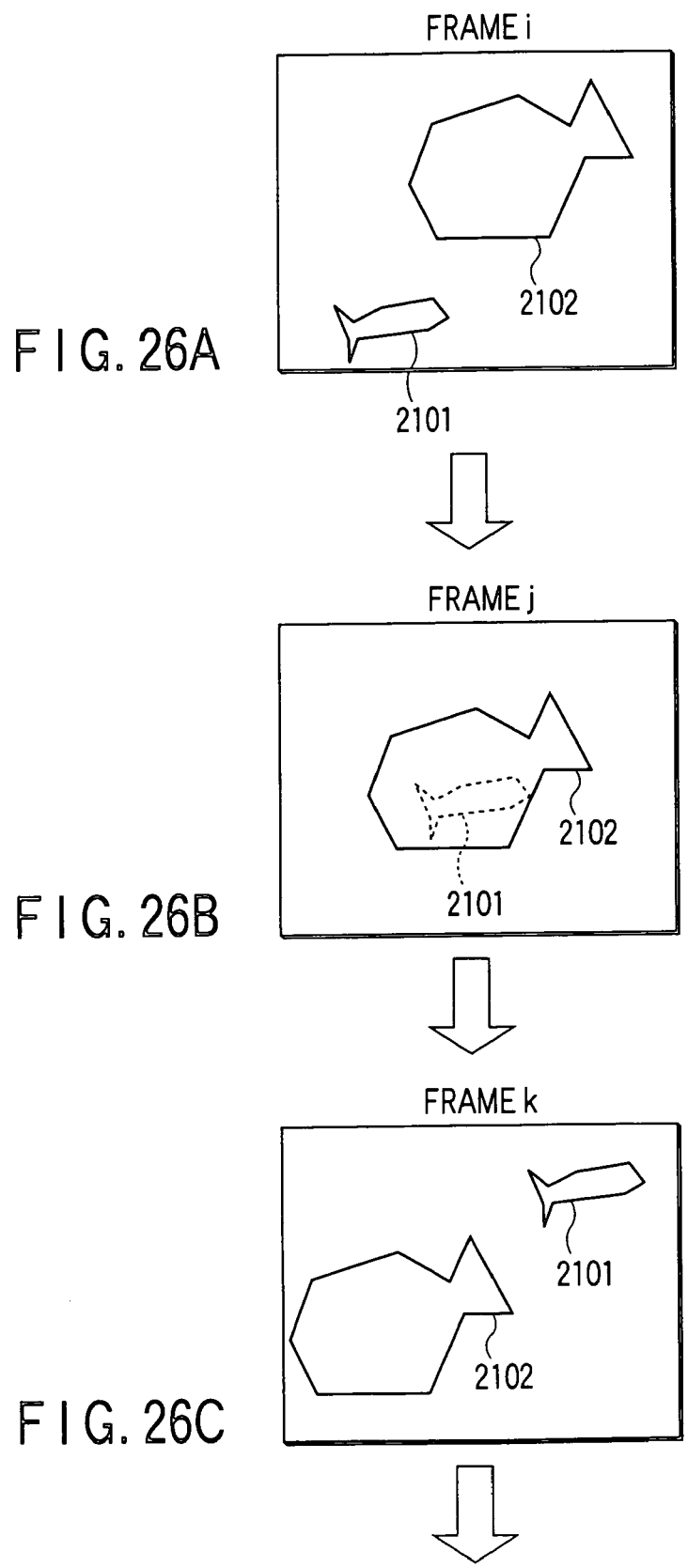
FIGS. 26A, 26B, and 26C are illustrations to help explain display flags according to a third embodiment.

For instance, as shown in FIG. 26A to FIG. 26C, when there are a plurality of objects in the video, an object 2101 may often disappear behind another object 2102 and appear from behind the object 2102. To describe this state, display flag information is added to the object region data.

There are two methods of giving the display flag: one method of giving the display flag to each target object and the other method of giving the display flag to each representative point of an approximate figure for the target object.

When the display flag is given to each object, if the display flag is set, this means that the object does not hide behind another object. In this case, the object is displayed in reproduction. If the display flag is not set, this means that the object hides behind another object. In this case, the object is not displayed in reproduction.

When the display flag is given to each representative point of an approximate figure for the target object, if the display flags for all the representative points of an approximate figure for one target object are in the same state, the object is displayed or not displayed as described above. If the display flags for some representative points are set and those for the remaining ones are not set, the object is displayed, taking the situation into account (for example, only the corresponding part of the object is displayed).

A display flag is given to each interval between key points. It is determined at the same time that representative point trajectory data about the object region is created. Key points may be provided independently of the knots of an approximate function or in such a manner that they never fail to fall on the knots. For instance, when a key point occurs, that point of time may be forcibly made a knot.

When a display flag is given to each target object, a key point is set when the object changes from the visible state to the invisible state or vice versa. In an example in FIG. 27, an object 2201 is visible until frame i and disappears from frame i to frame j. From frame j and forward, when the object appears again, a key point is placed at frame i and frame j. Then, the disappearing state is set to the display flags for frame i to frame j and the disappearing state is set to the display flags for the remaining frames. The same holds true when a display flag is given to each representative point of an approximate figure for the target object.

The representative point trajectory data is created on the assumption that the object is visible over all the frames. When information about the representative points is unknown because the object hides behind another object, the representative point trajectory data is created by supplementing the data with information about the representative points before and after the unknown representative points. After the representative point trajectory data has been created, a flag is set, depending on whether the object is visible or invisible. Therefore, even when an object appears and disappears, it can be expressed by a series of representative point trajectory data items.

Hereinafter, variations of the display flag information will be described.

Although a display flag is normally set to each interval between key points, a start time stamp and an end time stamp may be added to a display flag itself. This has the merit of being able to set a visible range and an invisible range independently of key points.

A display flag may be given to each object. Alternatively, it may be given independently to each representative point trajectory data item. For instance, when an object is represented by a polygon and its individual vertexes are expressed as representative points using trajectory data, giving a display flag to each representative point trajectory data item enables only an invisible part of the object to be represented.

In addition to showing whether the object is visible or invisible, the display flag may take the value of an integer representing priority. When objects overlap with each other, this means that an object with lower priority hides behind an object with higher priority and only the object with higher priority is displayed. It is assumed that, when the priority is 0, the object is invisible, regardless of other objects.

Use of integer values as display flags has the advantage that an object overlapping problem can be solved even when other objects are combined with the object in the image. In using integer values as display flags, a display flag may be given to each object or to each representative point trajectory data item.

Figure 27:
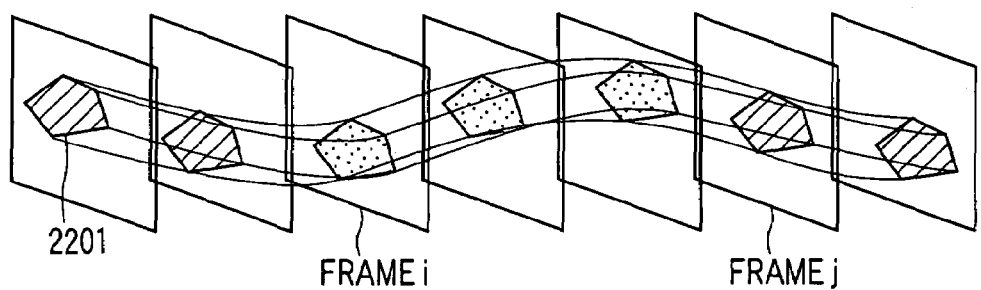
FIG. 27 is a diagram to help explain the creation of representative point trajectory data.
Figure 28:
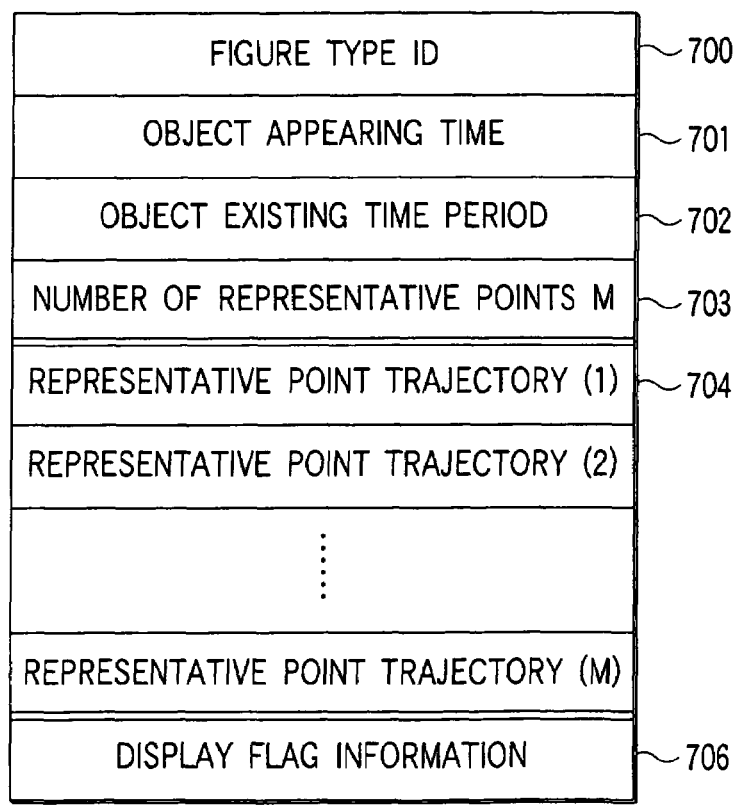
FIG. 28 shows still another example of the structure of the object region data.

FIGS. 27 and 28 show examples of the structure of the object region data including display flags.

FIG. 28 shows an example of adding display flag information 706 to the object region data (for example, that in FIG. 8 or its variations) when a display flag is added to the target object (of course, there is an example of further adding related information to the object region data).

Figure 29:
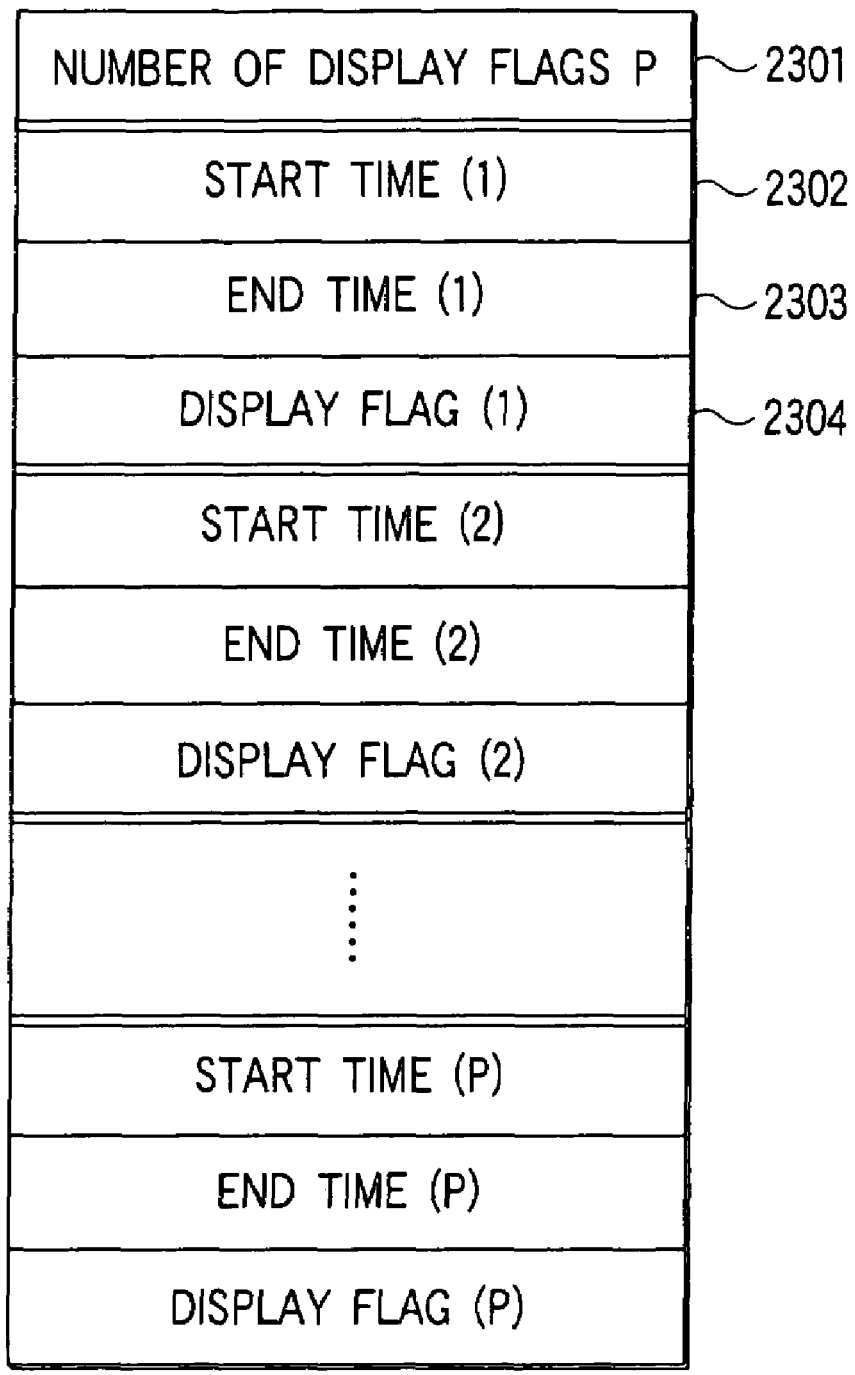
FIG. 29 shows an example of the structure of the display flag information.

FIG. 29 shows an example of the structure of display flag information 705.

In this example, each display flag 2304 has a start time stamp 2302 and an end time stamp 2303. Since the number of display flags P 2301 has as many display flags as equal the number of key points minus 1 when the start time stamp 2302 and end time stamp 2303 are not used in the total number of display flags, the number of display flags P 2301 may be omitted. Display flag 2304 takes the value of 0 or 1 to indicate appearance or disappearance. It may take an integer value to represent priority.

When a display flag is given to each representative point of an approximate figure for the object, display flag information is added to, for example, each representative point trajectory of the object region data (for example, that in FIG. 8 or its variations).

Figure 30:
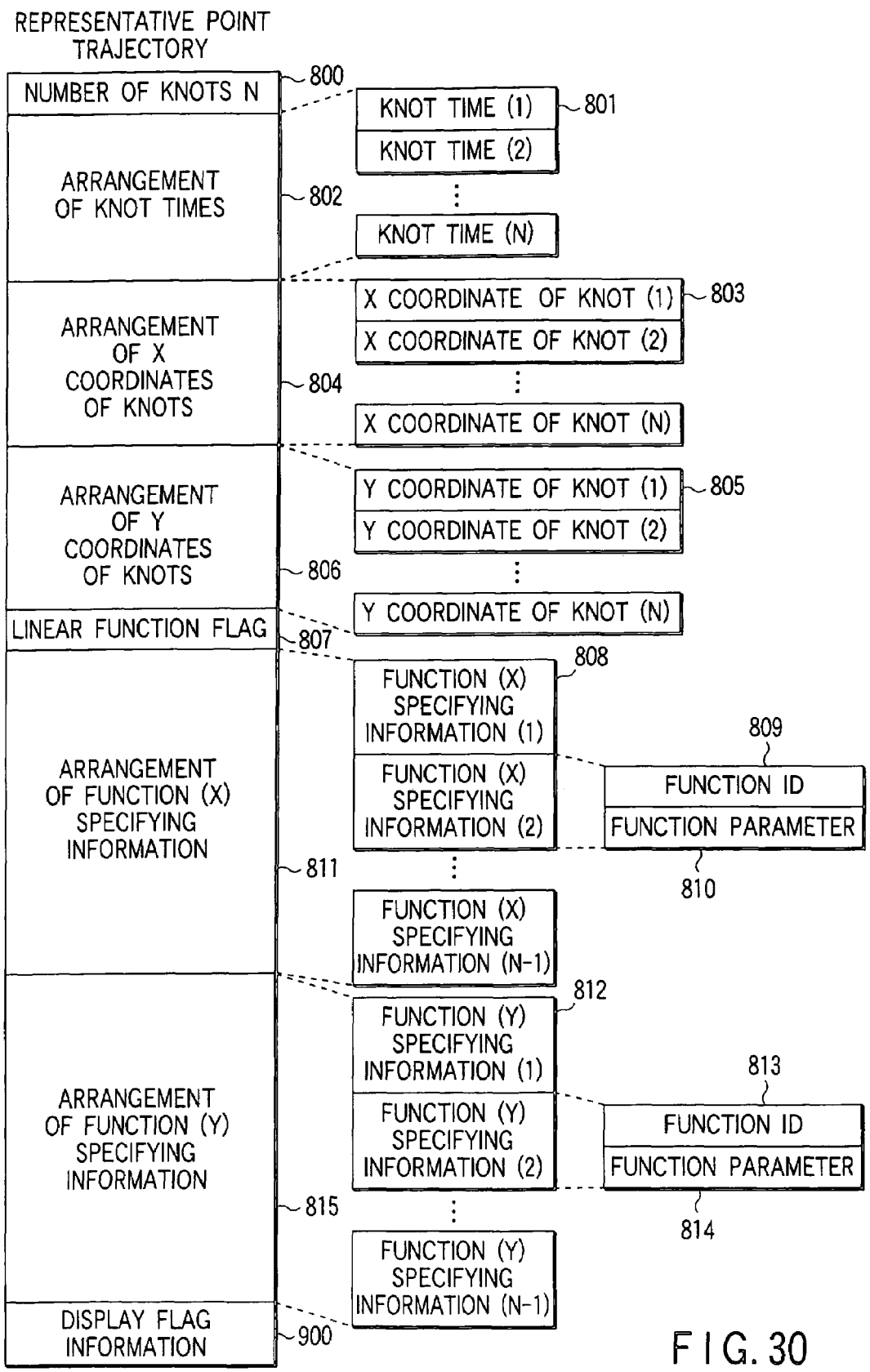
FIG. 30 shows still another example of the structure of the representative point trajectory data in the object region data.

FIG. 30 is an example of the structure of the representative point trajectory data in that case. An example of the structure of display flag 900 in FIG. 30 is as described above.

Figure 31:
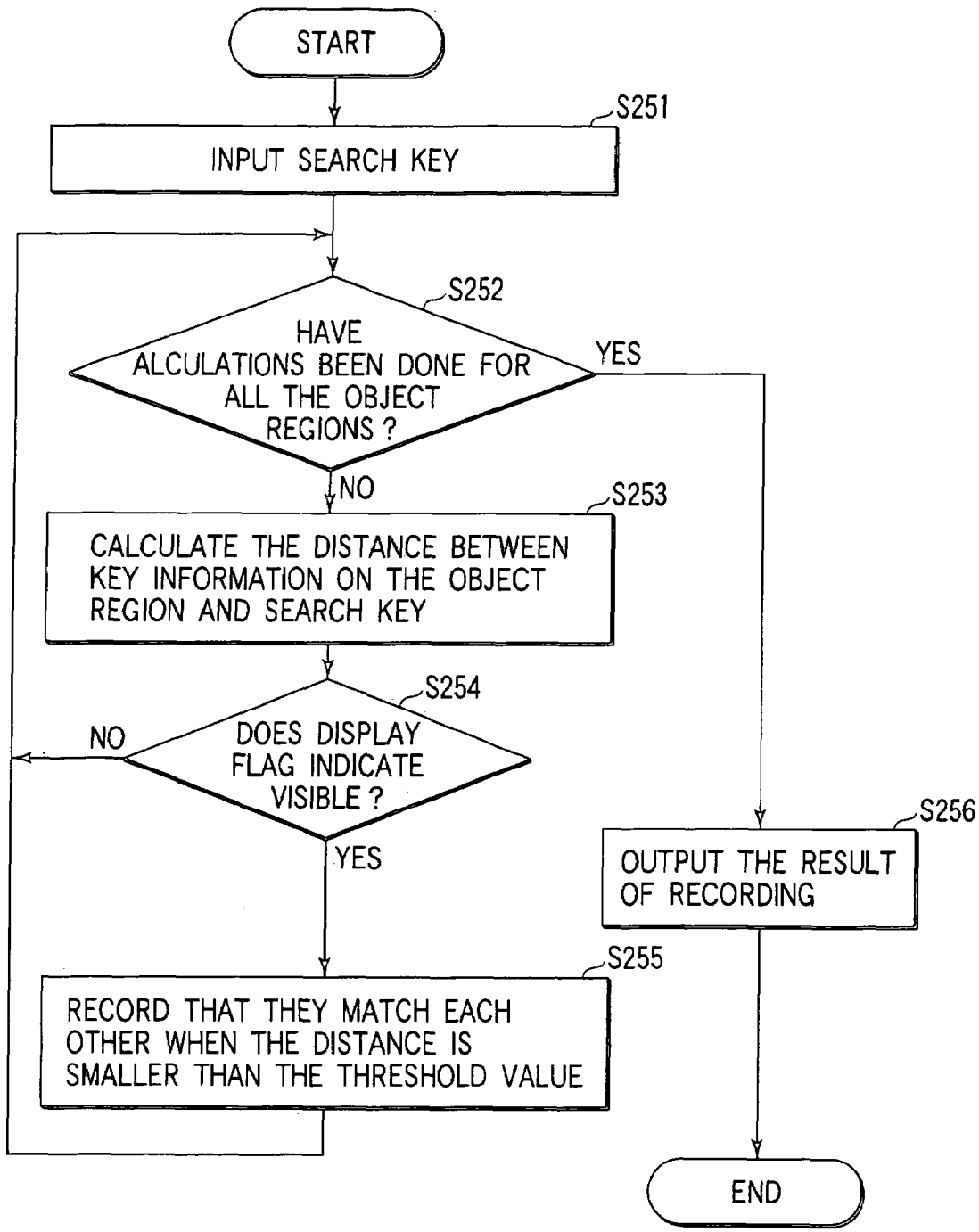
FIG. 31 is a flowchart for the process of searching.

FIG. 31 is a flowchart for an example of the searching process at the information processing system that handles video data and its object region data.

First, at step S251, the user enters a search key. At step S253, the distance between the key information for the object region being searched for and the search key is calculated.

At step S254, it is determined whether or not the display flag for the object region corresponding to the search key is visible. If the display flag is invisible, matching is considered to be unsuccessful.

At step S255, when a display flag is visible and the distance is smaller than a threshold value, matching is considered to be successful and recording is done.

This is carried out for all the objects. When it is determined at step S252 that calculations have been done for all the object regions, then the result of the calculations is outputted at step S256, which completes the process.

As described above, the addition of display flags makes it possible to determine whether or not the object is occlusion (visible or invisible in reproduction), without making calculations from the relationship with other objects. This enables the displayed object to be searched for efficiently.

Fourth Embodiment

A fourth embodiment of the present invention is such that information indicating the range over which an object in the video passed on the screen during the time from when it appeared on the screen until it disappeared (hereinafter, referred to as object passing range data) is also included in the object region data in the first, second, or third embodiment. Explanation will center on the difference between the fourth embodiment and the first, second, or third embodiment.

In the fourth embodiment, there is further provided a processing device for creating object passing range information which is connected between the region extracting device 101 and the region figure approximating device 102.

When an object is represented by the representative point trajectory data about the object region, one object is normally represented using a plurality of trajectory data items. In searching for an object that passed the specified point, it would be convenient for the object passing range to be represented without calculating the object region from a plurality of trajectory data items.

To achieve this, object passing range information about such a minimum rectangle or polygon as encloses the whole trajectory of the object is created. This information is added to the object region data.

When a rectangle is used, it may have or have not an inclination. Use of a rectangle with an inclination has the advantage that the trajectory of the object region can be approximated with smaller errors. Use of a rectangle with no inclination has the advantage that it is easy to calculate parameters for the rectangle.

Figure 32A:
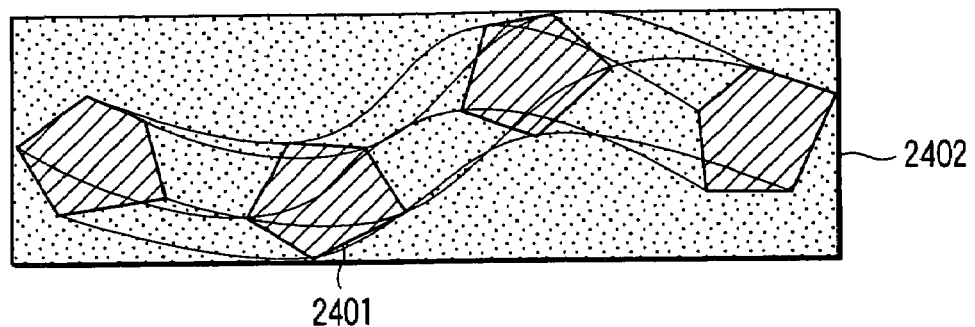
FIGS. 32A, 32B, and 32C are diagrams to help explain information about the object passing range according to a fourth embodiment.

In FIG. 32A, numeral 2402 shows an example of approximating the trajectory region of an object 2401 using a rectangle with no inclination.

Figure 32B:
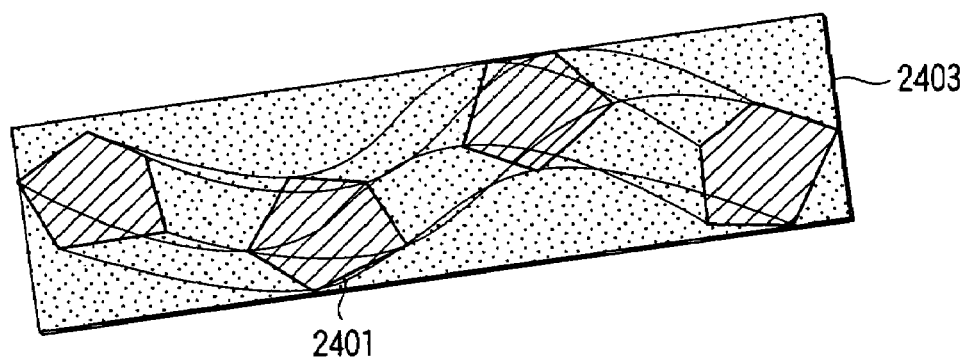

In FIG. 32B, numeral 2403 shows an example of approximating the trajectory region of the object 2401 using a rectangle with an inclination.

Figure 32C:
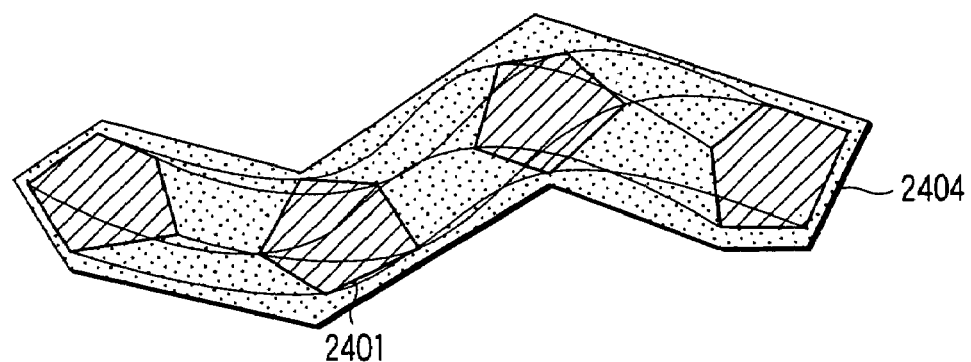

In FIG. 32C, numeral 2404 shows an example of approximating the trajectory region of an object 2401 using a polygon.

To calculate such a minimum rectangle or polygon as encloses the whole trajectory of the object, the region is found in each frame, then the logical sum of the regions over all the frames is calculated, and thereafter the resulting logical sum region is approximated by the smallest rectangle or polygon.

In calculating such a minimum rectangle or polygon as encloses the whole trajectory of the object, the logical sum of the smallest rectangle or polygon that encloses the whole trajectory of the object region related to the already calculated frames and the object region in a newly added frame may be calculated and the resulting logical sum region may be approximated by the smallest rectangle or polygon.

Furthermore, when such a minimum rectangle or polygon as encloses the whole trajectory of the object is calculated, such a minimum rectangle or polygon as encloses the trajectory of each representative point may be calculated and then such a minimum rectangle or polygon as encloses the logical sum of the regions of the rectangles or polygons obtained over all the trajectory be calculated.

Figure 33:
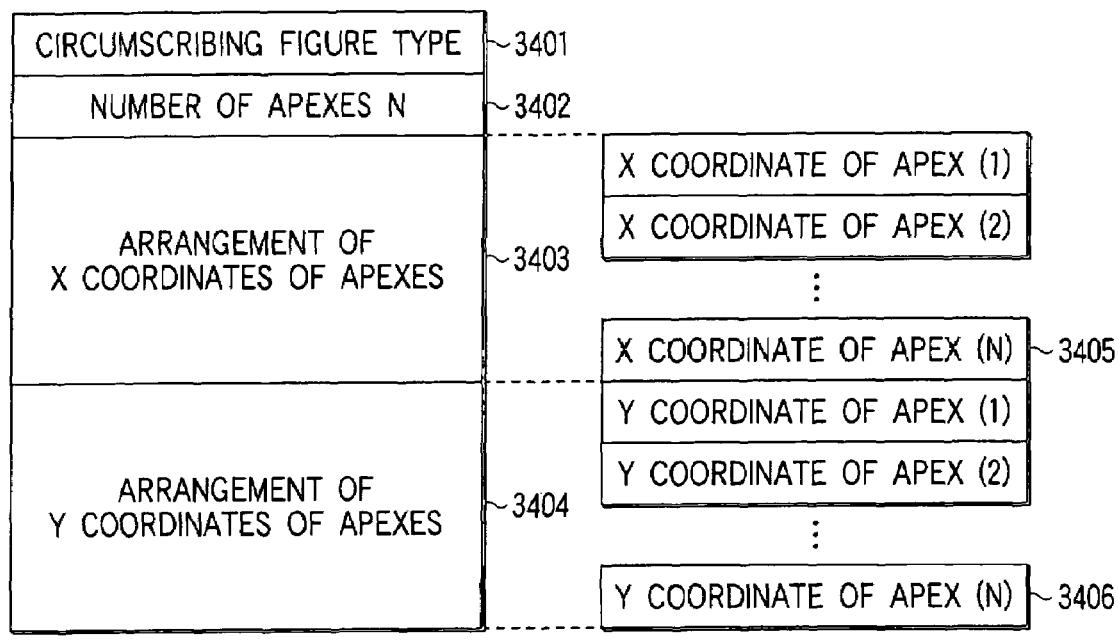
FIG. 33 shows an example of the structure of the information about the object passing range.
Figure 34:
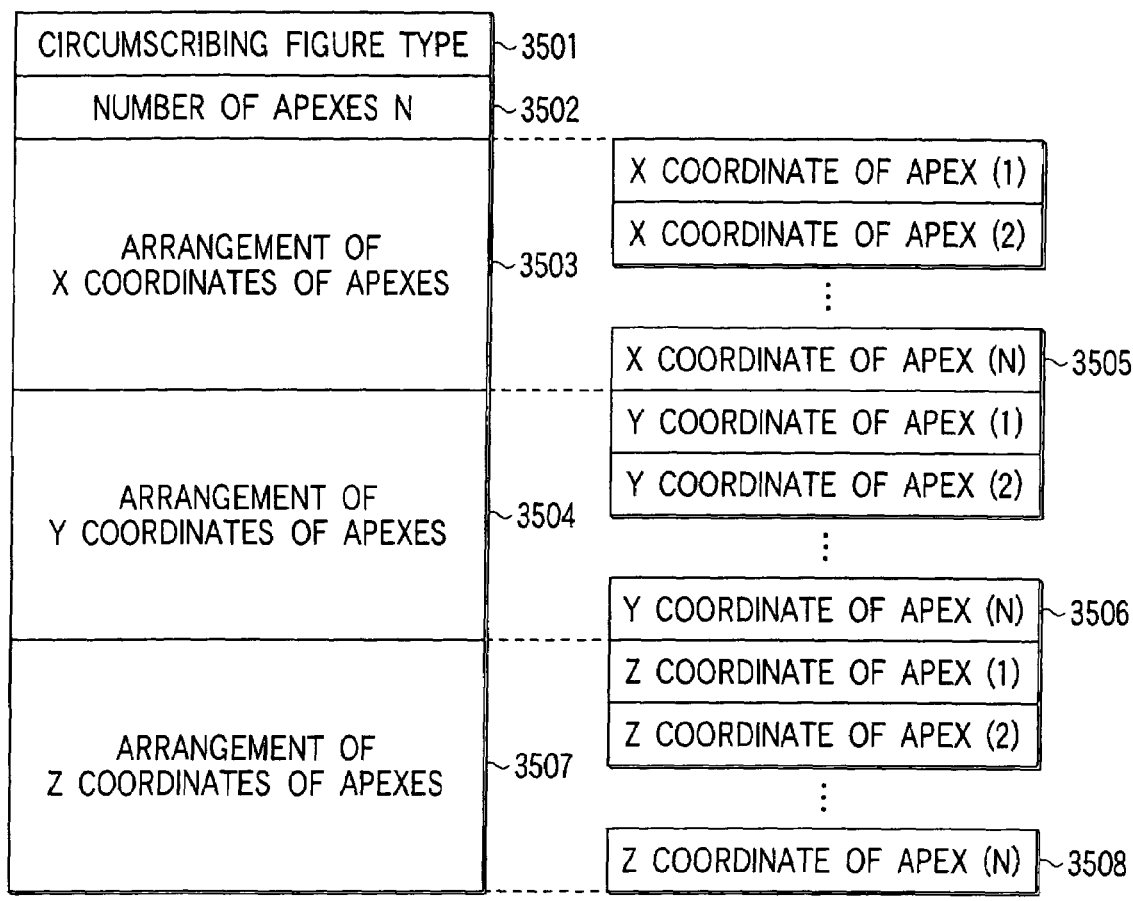
FIG. 34 shows a still another example of the structure of the information about the object passing range.

FIG. 33 shows object passing range information added to the object region data. Circumscribing figure type 3401 indicates the rectangle with no inclination as shown in FIG. 32A if it is 0, the rectangle with an inclination as shown in FIG. 32B if it is 1, and the polygon as shown in FIG. 32C if it is 2. Number of apexes N 3402 is 2 if the circumscribing figure type 3401 is 0, 3 if the circumscribing figure type 3401 is 1, and arbitral number if the circumscribing figure type 3401 is 2. If the object has depth information, a three dimensional circumscribing figure is introduced and the object passing range information is added with the depth information as shown in FIG. 34.

FIG. 35 is a flowchart for an example of the process of, when the user specifies an coordinate, selecting such an object as passes the coordinate at the information processing system that handles, for example, video data and its object region data.

At step S261, the user enters a coordinate to be searched for. At step S262, such a minimum rectangle or polygon as encloses the whole of each object trajectory is compared with the inputted coordinate and only objects included in the smallest rectangle or polygon which encloses the whole trajectory are extracted (the number of extracted objects may be 0, 1, or more). At step S263, it is determined for the extracted objects whether or not the coordinates inputted from the representative point trajectory are in the object region (for example, inside the approximate figure).

Generally, judging the inside or outside of the smallest rectangle or polygon that encloses the whole trajectory requires a smaller amount of calculations than judging the inside or outside of the object based on the representative point trajectory. When the number of objects to be searched for is large, first judging the inside or outside of the smallest rectangle or polygon that encloses the whole trajectory enables an efficient search.

As described above, adding information about the smallest rectangle or polygon that encloses the whole trajectory of the object enables the passing range of the object to be represented efficiently. This makes it easier to determine whether an object passes a certain point.

To increase search efficiency not only expressing the object region in a function but also giving a figure enclosing the position in which an object exists temporally and spatially makes it possible to eliminate objects located in completely different places from the things to be searched for.

Fifth Embodiment

The fifth embodiment of the present invention is such that the invention is applied to mosaicking.

Mosaicking is a method of combining pictures taken in such a manner that they are partially overlapped with each other to form a single wide-range picture. Such a combined picture is called a panorama picture. A plurality of methods of forming a panorama picture from a plurality of pictures have been proposed (as described in, for example, M. Irani and P. Anandan, "Video Indexing Based on Mosaic Representations," Proceedings of the IEEE, Vol. 86, No. 5, May 1998, pp. 905-921.).

The configuration of the fifth embodiment is basically the same as that of each of the first to fourth embodiments. The fifth embodiment differs from the first to fourth embodiments in that the representative points of an approximate figure is represented by a coordinate system of the whole panorama picture not by coordinate systems of the respective pictures.

Hereinafter, explanation will center on the difference between the fifth embodiment and the first to fourth embodiments.

Figure 37A:
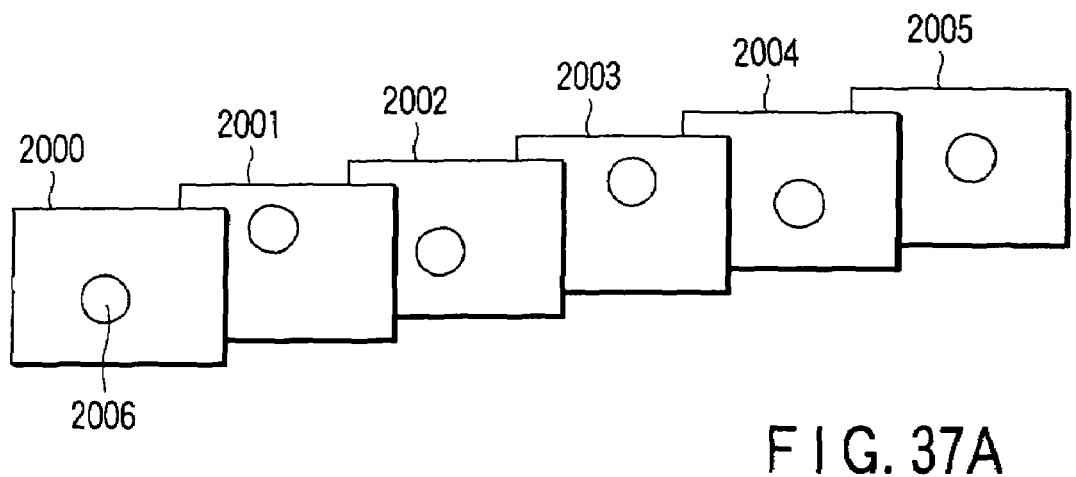
FIGS. 37A and 37B are diagrams to help explain the object region data describing method using mosaicking techniques.
Figure 37B:
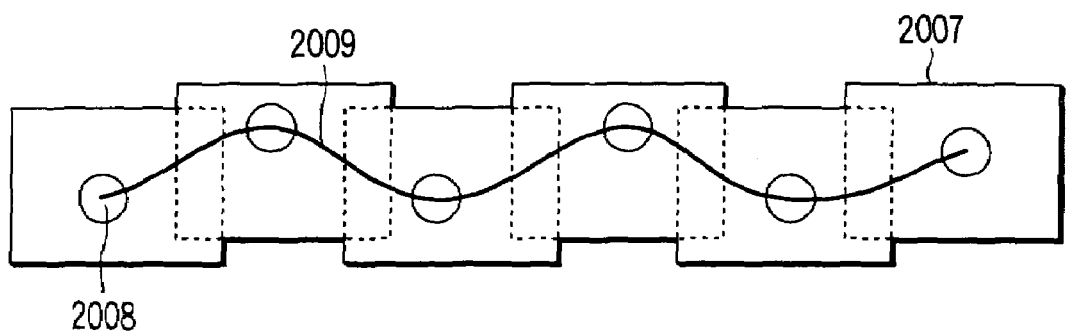

FIG. 36 is a flowchart for an example of processing by an object region data describing method using mosaicking techniques. FIGS. 37A and 37B are diagrams to help explain the method.

A panorama picture itself is a single picture. The coordinates of each pixel of the individual still pictures before combination are converted using a certain reference point (for example, the left bottom point in a frame) in a panorama image as the origin. Therefore, the individual representative points of an approximate figure for the object region in each still picture become a series of X-coordinates or a series of Y-coordinates in a coordinate system for the panorama image. In the fifth embodiment, a series of X-coordinates or Y-coordinates of the individual representative points of an approximate figure for the object region in each still picture is approximated using a function as in the first to fourth embodiments. For example, a difference vector is obtained in a single still picture or between still pictures. A series of the coordinates of the vector is approximated using a function.

At step S1900, a panorama picture is formed from a plurality of still pictures inputted. These input images are shown as 2000 to 2005 in FIG. 35A. They were obtained by photographing a moving body, while moving a camera. Numeral 2006 is an object. Numerals 2000 to 2005 indicate frames in which the same object was photographed. These pictures are often consecutive frames in a moving picture or still pictures photographed in such a manner that the camera was so moved that the photographic ranges may overlap with each other.

In FIG. 35B, numeral 2007 indicates a panorama picture obtained by combining these input pictures.

At step S1901, the individual object regions existing in the resulting panorama picture are approximated using figures. The panorama picture formation at step S1900 and the figure approximation of the object region at step S1901 may be reversed in order. Depending on conversion in forming a panorama picture, the type of approximate figure for the object region may have to be changed. For example, in a case where the object region is approximated using a rectangle, when a panorama picture is formed by affine transformation, the resulting object region is not necessarily a rectangle. In this case, a panorama picture is formed earlier. Alternatively, the formed panorama picture is converted and the converted picture is modified.

At step S1902, the representative points or characteristic points of an approximate figure for the object region obtained at step S1901 are approximated using a function. The trajectory of the object region is obtained by determining a reference object region and finding the amount of change in each object region on the basis of the reference object region. For example, in FIG. 35B, the object region 2008 of a first input image is used as a reference and changes in the object region following the reference one are made a trajectory 2009. In this example, the center of gravity of the object region is used as a representative point. The same holds true when a representative point of another approximate figure, such as a rectangle or an ellipse, is used, or when another characteristic point is used as a representative point.

There are two methods of determining the amount of change from the reference point: one method of using the difference from the reference point and the other method of using the difference from the preceding object region. The amount of change can be approximated using a function. A change from the reference point can be approximated using a motion model, such as a parallel/rotational movement or affine transformation, not using the movement of representative points or characteristic points. Then, the movement of the object is described as the trajectory of its conversion coefficient. In this case, too, the trajectory of the conversion coefficient is approximated using a function.

At step S1903, the parameter of the function that approximates the trajectory found at step S1902 is described according to the format of the aforementioned data structure.

The parameters used in forming a panorama picture from the individual input pictures can be described in the same manner, considering all the input pictures as object regions.

Figure 38:
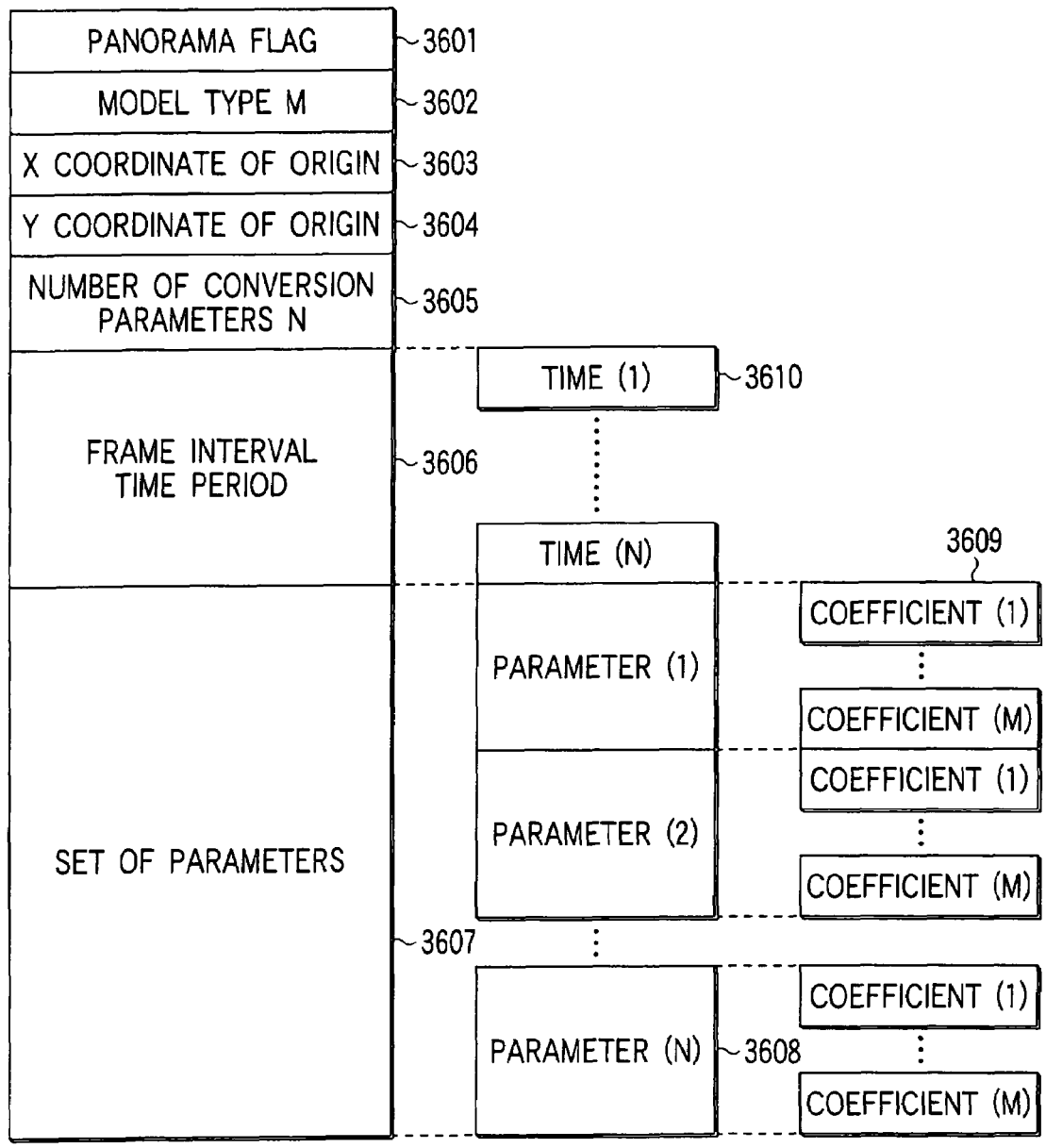
FIG. 38 shows an example of the structure of the information relating to a coordinate conversion.

FIG. 38 shows panorama parameters added to the object region data. The parameters indicate a coordinate system of the panorama picture using the coordinates of the representative points in the respective picture and a conversion coefficient from the coordinate system of the respective frames to the coordinate system of the panorama frame. Though the location of the origin of the coordinate system may freely set, it is assumed in this embodiment that the origin is set to the bottom left corner of the frame. The width and the length of the frames forming the panorama picture are constant and known. Panorama flag 3601 shows whether or not the coordinate system of the panorama picture is applied. If the flag is 0, the coordinate system of the panorama picture is not used (the bottom left corner of each picture is the origin). If the flag is 1, the coordinate system of the panorama picture is used (the coordinate of each picture is converted into that of the panorama picture). Model type M 3602 shows a conversion from the each frame to the panorama picture. The flag indicates no conversion if it is 0, translation if it is 2, rotation/scaling if it is 4, affine conversion if it is 6, perspective conversion if it is 8, and quadratic conversion if it is 12. The number of parameters of each model equals to the number of model types M.

Translational Model:

$$v_x(x, y)=a_1$$

$$v_y(x, y)=a_2$$

Rotation/Scaling Model:

$$v_x(x, y)=a_1+a_3x+a_4y$$

$$v_y(x, y)=a_2-a_4x+a_3y$$

Affine Model:

$$v_x(x, y)=a_1+a_3x+a_4y$$

$$v_y(x, y)=a_2+a_5x+a_6y$$

Perspective Model:

$$v_x(x, y)=(a_1+a_3x+a_4y)/(1+a_7x+a_8y)$$

$$v_y(x, y)=(a_2+a_5x+a_6y)/(1+a_7x+a_8y)$$

Quadratic Model:

$$v_x(x, y)=a_1+a_3x+a_4y+a_7xy+a_9x^2+a_{10}y^2$$

$$v_y(x, y)=a_2+a_5x+a_6y+a_8xy+a_{11}x^2+a_{12}y^2$$

The origin for conversion is defined as X-coordinate 3603 and Y-coordinate 3604 which are represented by the coordinate system of the respective pictures. The provision of origin for conversion makes the conversion error small. Number of conversion parameters N 3605 equals to the number of frames in the panorama picture. Frame interval time period 3606 is counted from the first frame. Set of parameters 3607 describes the M number of parameters depending on the model type. The trajectory of the object of each frame is described using this set of parameters.

When shooting is done, while the camera is following the object region, a panorama picture is formed by mosaicking, whereby consecutive frames are image-transformed and then tied together. Describing the object region information on the formed image makes it possible to describe the object region information uniquely in a coordinate system with a certain point on the mosaicking image as a cardinal point, even when the camera is moving.

The second, third, fourth, and fifth embodiments are described in connection with the first embodiment in which the object region data is described using the differential vector of the representative points of the approximate figure. However, these embodiments for adding the depth information, display flag, passing range information, and panorama conversion parameters for mosaicking can be freely applied to any type of object region data. The following description will be focused on the variation of the object region data. Though the embodiments related to the combination of the depth information and object region data of other types will be described, it will be understood that the display flag, passing range information, and panorama conversion parameters for mosaicking can be applied to the object region data of the other types.

Sixth Embodiment

In the sixth embodiment, the depth information is added to the object region data which is described using the trajectory of the coordinates of the representative points of the approximate figure.

The configuration of the object region data creating apparatus of the sixth embodiment is the same as that of the first embodiment shown in FIG. 1. Though the object region is approximated using the polygon in the first embodiment, the object region is approximated using an ellipse in the sixth embodiment, as shown in FIGS. 39A to 39D. FIGS. 39A to 39D correspond to FIGS. 3A to 3C of the first embodiment. The region is approximated with an ellipse by extracting two focal points v1 and v2 of the ellipse and one point v3 on the ellipse and the representative point trajectory curve is approximated with a spline function.

Figure 40:
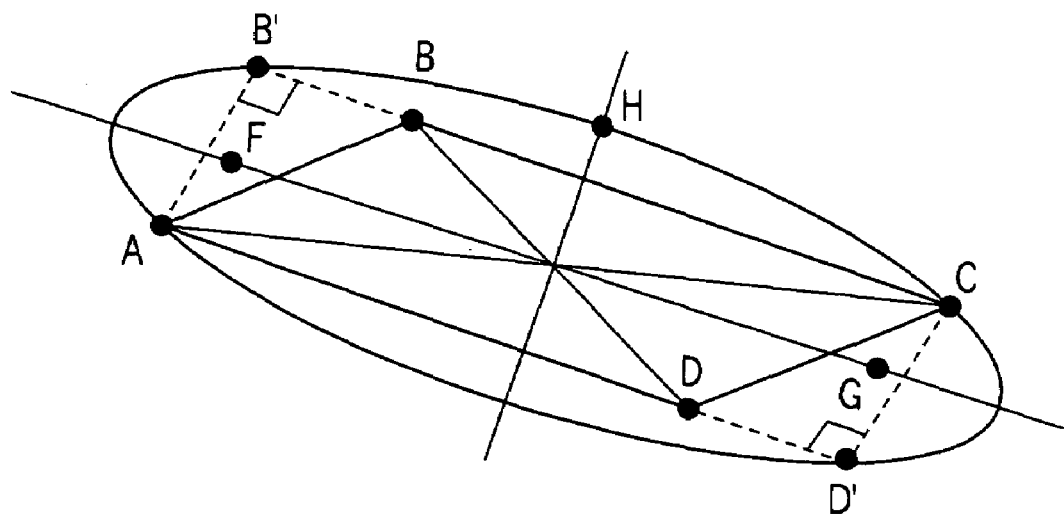
FIG. 40 is a diagram showing an example of a process for approximating an object region with an ellipse.

FIG. 40 shows an example of the method of obtaining an approximate ellipse when the object region is expressed by a parallelogram. Points A, B, C and D shown in FIG. 40 are vertices of the parallelogram which is the object region. Calculations are performed so that which side AB or side BC is a longer side is determined. Then, a smallest rectangle having portions of its sides which are the longer side and its opposite side is determined. In the case shown in FIG. 40, a rectangle having four points A, B', C and D' is the smallest rectangle. The approximate ellipse is a circumscribing ellipse similar to the ellipse inscribing the rectangle and passing the points A, B', C and D'.

Referring to FIG. 39B, reference numerals v1, v2, and v3 represent representative points of a figure expressing an ellipse. Specifically, the representative points v1 and v2 are two focal points of the ellipse and one point v3 on the same (one point on the minor axis in the case shown in FIG. 39B). The focal points of the ellipse can easily be determined from points on the two axes or a circumscribing rectangle of the ellipse. An example will now be described with which focal points F and G are determined from two points $P_0$ and $P_1$ on the major axis and point H on the minor axis shown FIG. 41.

Initially, a and b which are parameters of the major axis and the minor axis, center C of the ellipse and eccentricity e are determined as follows:

$$E(P_0, P_1)=2\times a$$

$$C=(P_0+P_1)/2$$

$$E(C, H)=b$$

$$e=(1/a)\times\sqrt{(a\times a-b\times b)}$$

where E (P, Q) is the Euclidean distance between the point P and the point Q. In accordance with the determined parameters, the focal points F and G can be determined as follows:

$$F=C+e\times(P_0-C)$$

$$G=C-e\times(P_0-C)$$

Thus, the representative points F, G and H of the ellipse are determined. When the foregoing points are made to correspond to the representative points of the ellipse extracted in another frame, ambiguity is involved. That is, two combinations exist which make the two extracted focal points correspond to the two focal points in the previous frame. Since two interdevices exist between the minor axis and the ellipse, the interdevice corresponding to the one point on the ellipse extracted in the previous frame cannot be determined. A method of determining the combination and the interdevice will now be described.

An assumption is made that the two focal points extracted in the previous frame are Fp and Gp. To determine F or G which correspond to Fp, the following comparison is made:

$$E((Gp-Fp)/2, (G-F)/2) \text{ and}$$

$$E((Gp-Fp)/2, (F-G)/2)$$

When the former focal point is smaller, Fp is made to correspond to F, and Gp is made to correspond to G. When the latter focal point is smaller, Fp is made to correspond to G and, Gp is made to correspond to F.

An assumption is made that the interdevices between the minor axis and the ellipse in the previous frame are Hp and the interdevices between the minor axis of the ellipse in the present frame are H and H'. The point H or H' which must be made to correspond to Hp is determined by calculating two distances:

$E(Hp-(Gp+Fp)/2, H-(F+G)/2)$ and $E(Hp-(Gp+Fp)/2, H'-(F+G)/2)$

When the former distance is shorter, H is selected. In a negative case, H' is selected. Note that the interdevice H between the minor axis and the ellipse in the first frame may be either of the two interdevices.

The foregoing process for extracting the representative points from the ellipse is performed by the representative point extracting device 103.

The representative points extracted by the foregoing process are usually varied in the position among the successive frames owing to movement of the object of interest in the video or shaking of the image pick-up camera. Therefore, the corresponding representative points of the ellipses are time-sequentially arranged to perform approximation with a spline function for each of the X and Y axes. In this embodiment, each of the three points F, G and H (see FIG. 41) which are the representative points of the ellipse requires a spline function for the X- and Y-coordinates. Therefore, six spline functions are produced.

The approximation to a curve with spline functions is performed by the representative point trajectory function approximating device 104.

The process which is performed by the representative point trajectory function approximating device 104 may be carried out whenever the coordinates of the representative points of each frame relating to the object region are obtained. For example, the approximation is performed whenever the coordinates of the representative points in each frame are obtained. Moreover, an approximation error is obtained to arbitrarily divide the approximation section in such a manner that the approximation error satisfies a predetermined range. Another method may be employed with which the process is performed after the coordinates of the representative points in all of the frames relating to the object region have been obtained.

Reference numeral 203 shown in FIG. 39C represents the approximated spline function expressed three-dimensionally. Reference numeral 204 shown in FIG. 39D represents an example of the spline function which is the output of the representative point trajectory function approximating device 104 (only one axis of coordinate of one representative point is shown). In this example, the approximation section is divided into two sections (the number of knots is three) which are t=0 to 5 and t=5 to 16.

The thus-obtained spline functions are recorded in the region data storage device 106 in a predetermined data format.

As described above, this embodiment enables the object region in a video to be described as the parameter of a curve approximating a time-sequential trajectory (a trajectory of the coordinates of the representative points having the variable are the frame numbers or the time stamps) of the representative points of the approximate figure of the object region.

The object region in a video can be expressed by only the parameters of the approximate function. Therefore, object region data, the quantity of which is small and which can easily be handled, can be created. Also extraction of representative points from the approximate figure and determination of parameters of the approximate curve can easily be performed. Moreover, reproduction of an approximate figure from the parameters of the approximate curve can easily be performed.

A method may be employed with which a basic figure, for example, one or more ellipses are employed as the approximate figures and each ellipse is represented by two focal points and another point. In the foregoing case, whether or not arbitrary coordinates specified by a user exist in the region (the approximate figure) of the object (whether or not the object region has been specified) can be determined by a simple determinant. Thus, specification of a moving object in a video can furthermore easily be performed by the user.

The data format of object region data which is stored in the region data storage device 106 will now be described. A case will now be described in which the representative points are approximated with a spline function. The representative points are similarly approximated with another function.

FIG. 42 shows an example of the data format of object region data for describing the spline function indicating the object region in a video and information related to the object.

ID number 400B is an identification number which is given to each object. Note that ID number 400B may be omitted.

A leading end frame number 401B and a trailing end frame number 402B are leading and trailing end frame numbers for defining existence of the object having the ID number 400B. Specifically, the numbers 401B and 402B are the frame number at which the object appears in the video and the frame number at which the object disappears. The frame numbers are not required to be the frame numbers at which the object actually appears and disappears in the video. For example, an arbitrary frame number after the appearance of the object in the video may be the leading end frame number. An arbitrary frame number which follows the leading frame number and which precedes the frame of disappearance of the object in the video may be the trailing end frame number. The leading/trailing end time stamp may be substituted for the lading/trailing end frame number. The object existence frame number or object existence time may be substituted for the trailing end frame number 402B.

A pointer (hereinafter called a "related information pointer") 403B for related information is the address or the like of the data region in which data of information related to the object having the foregoing ID number. When the related information pointer 403B is used, retrieval and display of information related to the object can easily be performed. The related information pointer 403B may be pointer for pointing data of description of a program or the operation of a computer. In the foregoing case, when the object has been specified by a user, the computer performs a predetermined operation.

Note that the related information pointer 403B may be omitted when the objects are not required to perform individual operations.

It is not necessary to have the related information pointer 403B. As an alternative to using the pointer 403B, related information itself may be described in the object region data. Further, it is possible to have the related information pointer 403B or the related information itself in the object region data. In this case, a flag is required to indicate whether the related information pointer 403B or related information has been described in object region data.

The number of approximate FIGS. 404B is the number of the figures approximating the object region. In the example shown in FIG. 39A in which the object region is approximated with one ellipse, the number of the figures is 1.

Approximate figure data 405B is data (for example, the parameter of a spline function) of a trajectory of the representative point of the figure for expressing an approximate figure.

Note that approximate figure data 405B exists by the number corresponding to the number of approximate FIGS. 404B (a case where the approximate figure number 404B is two or larger will be described later).

The number of the approximate FIGS. 404B for object region data may always be one (therefore, also approximate figure data 405 is always one) to omit the field for the approximate figure number 404B.

FIG. 43 shows the structure of approximate figure data 405B (see FIG. 42).

A figure type ID 1300B is identification data for indicating the type of the approximate figure, the figure type ID 1300B identifying a circle, an ellipse, a rectangle, and a polygon.

The number of representative points 1301B indicates the number of representative points of the figure specified by the figure type ID 1300B. Note that the number of the representative points is expressed with M.

A set of representative point trajectory data items 1302B, 1303B, and 1304B are data regions relating to the spline function for expressing the trajectory of the representative points of the figure. The representative points of one figure require data of one set of spline functions for the X-, Y-, and Z-coordinates. Therefore, data of the trajectory of the representative points for specifying the spline function exists by representative point number (M)×3.

Z-coordinate of the representative point can be obtained by using methods shown in FIGS. 18 to 22 or any other methods.

Note that the type of the employed approximate figure may previously be limited to one type, for example, an ellipse. In the foregoing case, the field for the figure type ID 1300B shown in FIG. 42 may be omitted.

When the representative point number is defined according to the figure type ID 1300B, the representative point number may be omitted.

FIG. 44 shows an example of the structure of representative point trajectory data 1302B, 1303B, and 1304B.

A knot frame number 1400B indicates the knot of the spline function. Thus, a fact that polynomial data 1403B is effective to the knot is indicated. The number of coefficient data 1402B of the polynomial varies according to the highest order of the spline function (assuming that the highest order is K, the number of coefficient data is K+1). Therefore, reference to a polynomial order 1401B is made. Subsequent to the polynomial order 1401B, polynomial coefficients 1402B by the number corresponding to the polynomial order (K+1) follows.

Since the spline function is expressed in an individual polynomial between the knots, the polynomials are required by the number corresponding to the number of knots. Therefore, data 1403B including the knot frame number 1400B and the coefficient of the polynomial 1402B is described repeatedly. When the knot frame number is the same as the trailing end frame number, it means the last polynomial coefficient data. Therefore, termination of representative point trajectory data can be understood.

FIG. 43 shows that the depth information is described for each of the representative points. However, it is possible to describe the depth information for each of the object region as shown in FIG. 17 in the second embodiment. FIG. 45 shows the object region data having one depth information for one object region data. The approximate figure data includes a depth information 1306B in addition to the figure type ID 1300B, representative point number 1301B, and a pair of representative point trajectory data 1302B and 1303B.

A case will now be described in which a figure except for the ellipse is employed as the approximate figure.

FIG. 46 is diagram showing the representative points in a case where a parallelogram is employed as the approximate figure. Points, A, B, C and D are vertices of the parallelogram. Since three points of the four vertices are determined, the residual one is determined. Therefore, three vertices among the four vertices are required to serve as the representative points. In the foregoing example, three points, which are A, B and C, are employed as the representative points.

Figures 47, 48:
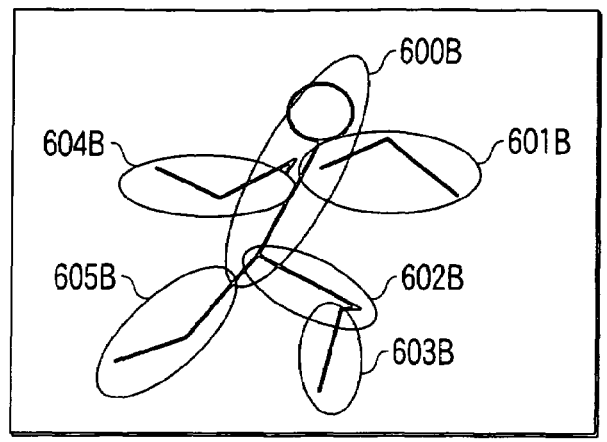
FIG. 47 is a diagram showing an example in which the object region in a video is expressed with a plurality of ellipses.
FIG. 48 is a diagram showing an example of the structure of object region data including data of a plurality of approximate figures.

The examples have been described with which one figure is assigned to one object to roughly approximate the object region. The accuracy of approximation may be improved by approximating one object region with a plurality of figures. FIG. 47 shows an example in which a plurality of figures approximate one object region. In the foregoing case, a region of a person in the image is expressed with 6 ellipses 600B to 605B.

When one object is approximated with plural figures as shown in FIG. 47, a process for dividing the object region into a plurality of regions must be performed. The process may be performed by an arbitrary method. For example, a method with which the object is directly divided with manpower may be employed. In the foregoing case, a pointing device, such as a mouse, is used to, on the image, enclose the region with a rectangle or an ellipse. Alternatively, the region is specified with a trajectory of the pointing device. When an automatic method is employed as a substitute for the manpower, a method may be employed with which clustering of movement of the object is performed to realize the division. The foregoing method is a method with which the movement of each region in the object among the successive frames is determined by a correlation method (refer to, for example, Image Analysis Handbook Chapter-3, Section II, Publish Conference of Tokyo University, 1991) or a method with gradient constraints (refer to, for example, Determining optical flow, B. K. P. Horn and B. G. Schunck, Artificial Intelligence, Vol. 17, pp. 185-203, 1981) to collect similar movements to form a region.

Each of the divided regions is subjected to the above process so that data of the approximate figure is created. In the foregoing case, the spline function, which must be described in object region data of one object increases as the number of the approximate figures increases. Therefore, the structure of data is formed which includes approximate figure data 405B by the number (L in the foregoing case) corresponding to the approximate figure number 404B, as shown in FIG. 48.

As described above, the field for the approximate figure number 404B may be omitted by making the approximate figure number to always be one (therefore, data of the approximate figure is made to always be one) to the object region data. In the foregoing case, one object can be expressed with a plurality of figures when object region data is produced for each figure approximating one object (the same ID number is given).

When one object is approximated with a plurality of figures in this embodiment, the same figure is employed. A mixture of a plurality types of figures may be employed to approximate the object region.

Although the method of approximation using the ellipse has been described, an approximation method using a rectangle will now be described as another approximation method.

Figure 49A:
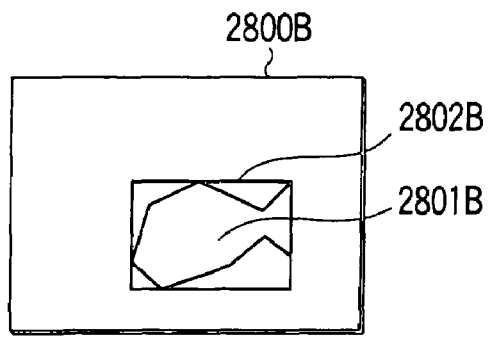
FIGS. 49A, 49B, and 49C are diagrams schematically showing another process for describing an object region in a video with object region data.
Figure 49B:
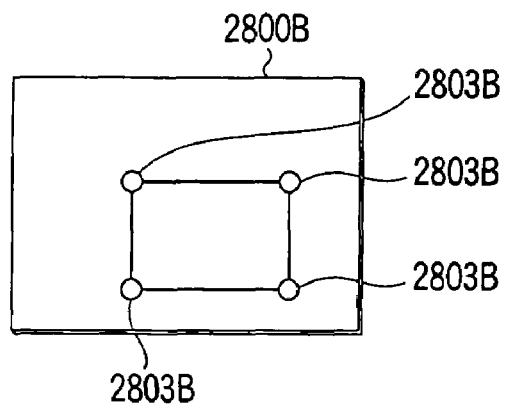
Figure 49C:
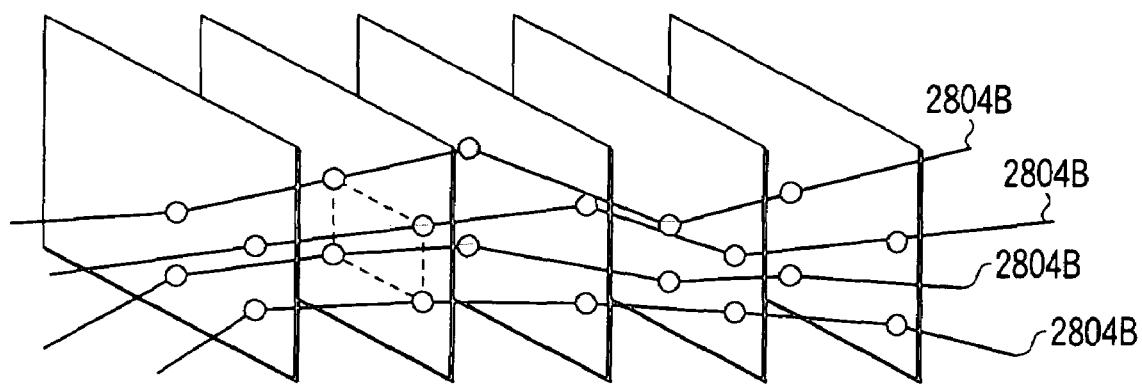

FIGS. 49A, 49B, and 49C are diagrams formed into the same shape as that of FIGS. 39A, 39B, and 39C. In the foregoing case, the region figure approximating device 102 employs a method of approximating a region with a rectangle. The representative point extracting device 103 employs a method of extracting the four vertices of the rectangle. The representative point trajectory function approximating device 104 employs an approximation method using a spline function.

Referring to FIG. 49A, reference numeral 2800B represents video data for one frame which is to be processed.

Reference numeral 2801B represents an object region which is to be extracted. A process for extracting the region 2801B of the object is performed by the region extracting device 101.

Reference numeral 2802B represents a result of approximation of the object region with the rectangle. The process for obtaining the rectangle 2802B from the object region 2801B is performed by the region figure approximating device 102.

Figure 50:
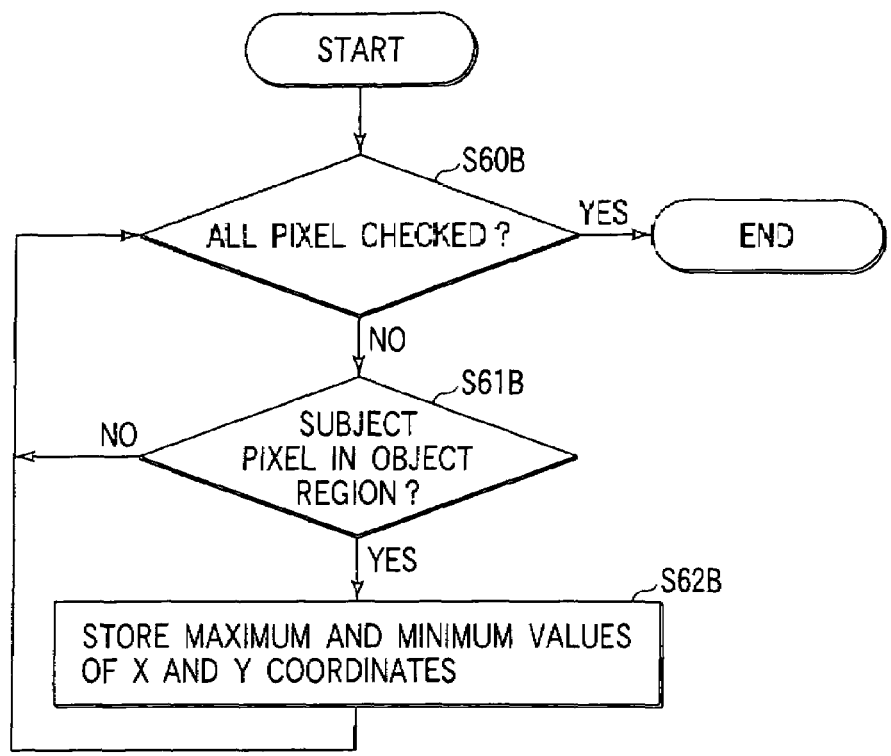
FIG. 50 is a flowchart showing an example of a procedure for obtaining an approximate rectangle.

An example of the process for obtaining the rectangle 2802B shown in FIG. 49A is shown in FIG. 50. That is, a mask image of the frame 2800B is raster-scanned (step S60B). When the subject pixel is included in the object region (step S61), the minimum value is updated if each of the X- and Y-coordinates is smaller than the stored minimum value. If the values are larger than the maximum value, the maximum value is updated (step S62B).

The foregoing process is repeated and checked for all of the pixels so that the minimum and maximum values of the pixel position indicating the object region 2801B for each of the X- and Y-coordinates are obtained. Thus, the coordinates of the four vertices of the rectangle 2802B can be obtained.

Figure 51:
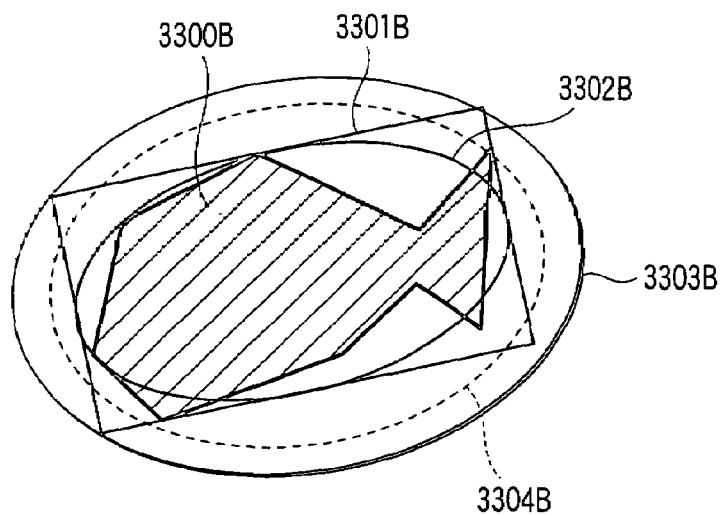
FIG. 51 is a diagram showing a state in which an inclined and elongated object is approximated with a non-inclined rectangle.
Figure 52:
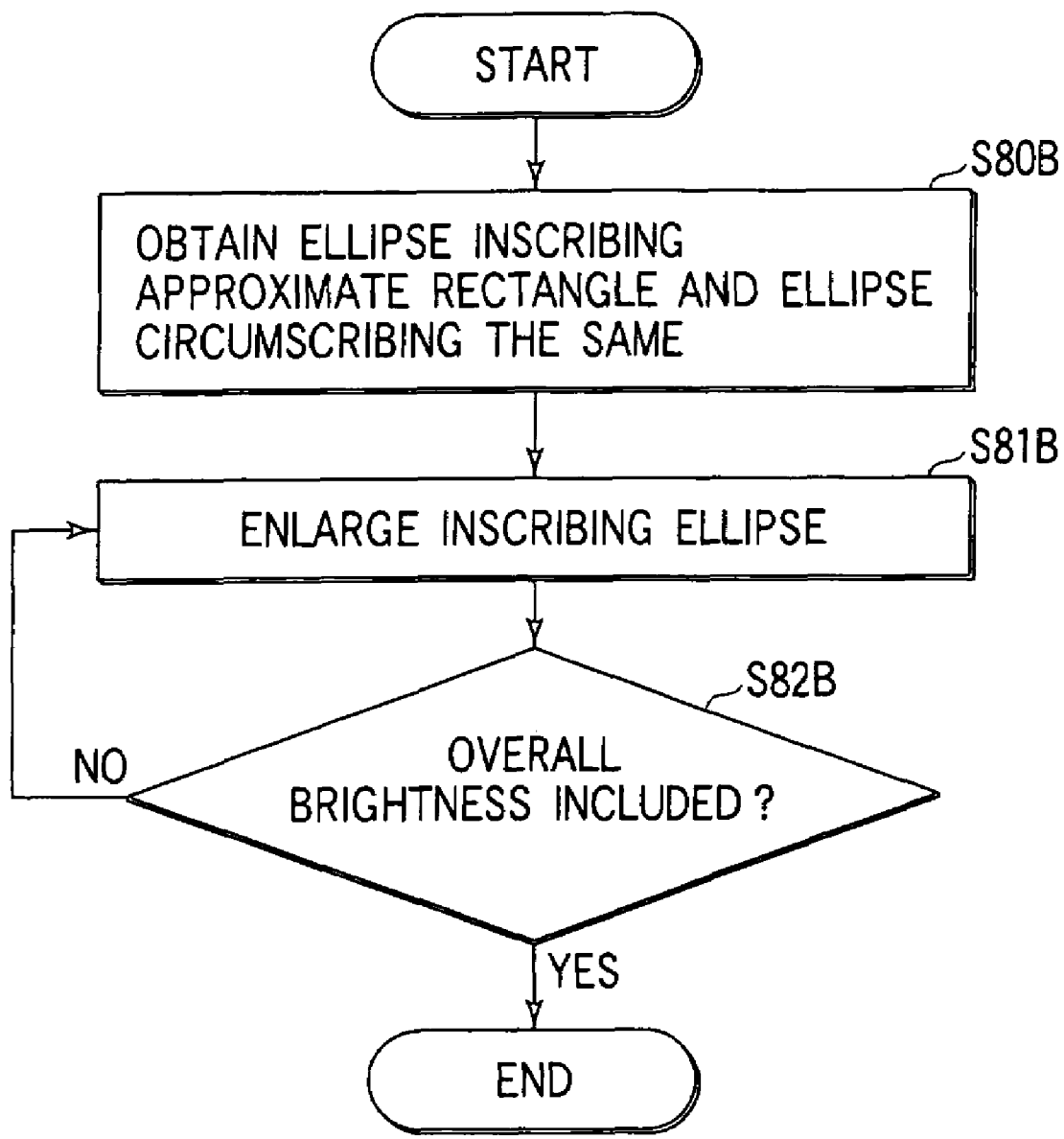
FIG. 52 is a flowchart showing an example of a procedure for obtaining an approximate ellipse from an approximate rectangle.

Although the above-mentioned approximating method using the rectangle is excellent in easiness of the process, it is sometimes desirable to approximate the object region with the ellipse. FIG. 51 shows that an approximate ellipse is obtained from the rectangle representing the object region. FIG. 52 shows the process of obtaining the approximate ellipse.

Referring to FIG. 51, it is assumed that an object region 3300B and a circumscribing rectangle 3301B have been obtained.

Initially, the inscribing ellipse and the circumscribing ellipse of the approximate rectangle 3301B are obtained (step S80B).

Referring to FIG. 51, an ellipse 3302B is an inscribing ellipse of the rectangle 3301B and the ellipse 3303B is a circumscribing ellipse of the rectangle 3301B.

Then, the size of the inscribing ellipse 3302B is gradually brought closer to that of the circumscribing ellipse 3303B (step S81B). Then, an ellipse 3304B for completely including the object region 3300B is obtained (step S82B) to employ the ellipse 3304B as the approximate ellipse. The unit for enlarging the size of the inscribing ellipse 3302B in each process of the repeated process may previously be determined. The unit may be determined in accordance with the difference between the size of the inscribing ellipse 3302B and that of the circumscribing ellipse 3303B.

A reverse method may be employed with which the size of the circumscribing ellipse 3303B is brought closer to the size of the inscribing ellipse 3302B. In the foregoing case, the circumscribing ellipse 3303B includes the object region 3300B from the first. Therefore, the ellipse previous to the ellipse with which the portion which is not included in the object region 3300B has first occurred in the repeated process is required to be the approximate ellipse 3304B.

An example will now be described in which when a trajectory of the object region is described by the method According to embodiments of the present invention, the structure of data which is different from the approximate data structure shown in FIGS. 42 and 43 is employed.

Figure 53:
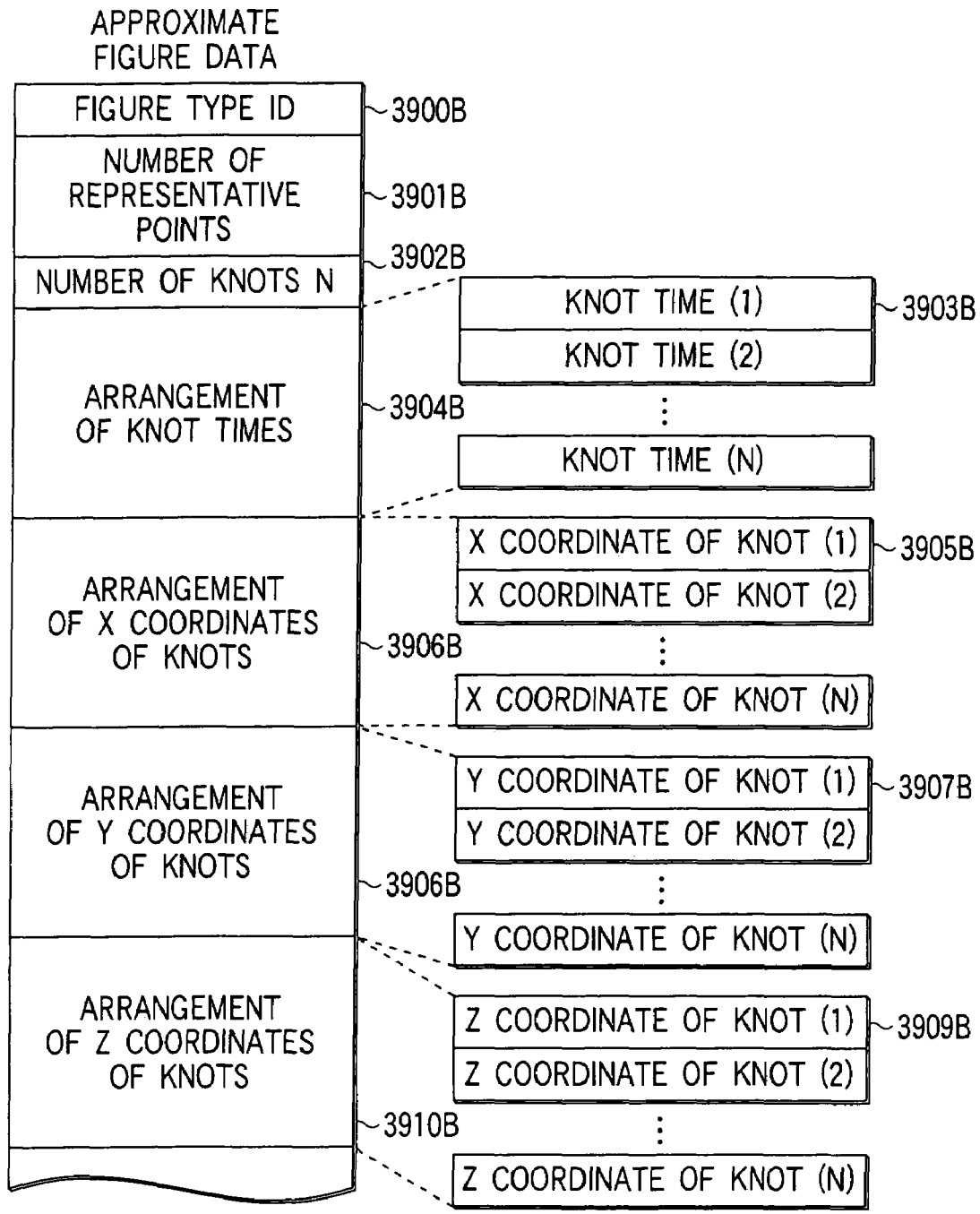
FIG. 53 is a diagram showing the first half of another example of the structure of object region data.

FIGS. 52 and 53 show another example of a description format for data of the approximate figure and data of trajectories of representative points of the object region. Note that FIGS. 52 and 53 shows only one representative point for a section (section from knot number N 3902B to a function specifying information arrangement 3923B) of data of the trajectory of the representative point (in actual, a plurality of representative points are described to correspond to the number of the representative points).

Description will now be made on the assumption that the highest order of the polynomial is the second order.

In the foregoing example (shown in FIGS. 41, 42, and 43), all of the coefficients of the polynomial spline function are described. The description method in this example is arranged to use combination of the coordinate of the knot of the spline function and a value relating to the second-order coefficient of the spline function. The foregoing description method has an advantage that the knot can easily be extracted to cause the trajectory of a large object to easily be detected.

The foregoing description method will now be described.

The figure type ID 3900B shown in FIG. 53 specifies the type of the figure which has been used to approximate the shape of an object. For example, only the centroid, the rectangle, the ellipse or their combination can be specified. The number of representative points 3901B indicates the number of the trajectories of the representative points which are determined in accordance with the type of the figure.

The knot number N 3902B indicates the number of knots of a spline function expressing the trajectory of the representative point. The frame corresponding to each knot is expressed as time so as to be stored in knot time (1) to knot time (N) 3903B. Since a predetermined number of knot times have been provided, the knot times are described as knot time arrangement 3904B.

Also X-, Y-, and Z-coordinates of each knot are described as arrangements 3906B, 3908B, and 3910B of X-coordinates of knots 3905B, Y-coordinates of knots 3907B, and Z-coordinates of knots 3909B.

A linear function flag 3910B indicates whether or not only a linear function is employed as the spline function between knots. If second or higher order polynomial is partially employed, the linear function flag 3910B is turned off. Since the linear function flag 3910B is employed, description of function specifying information 3912B, 3916B, and 3920B to be described later can be omitted when only the linear function is employed as the approximate function. Therefore, an advantage can be realized in that the quantity of data can be reduced. Note that the flag 3910B may be omitted.

Function IDS 3913B, 3917B, and 3921B and function parameters 3914B, 3918B, and 3922B contained in function specifying information 3912B, 3916B, and 3920B indicate the order of the polynomial spline function and information for specifying the coefficient of the polynomial spline function, respectively.

The number of function parameters 3914B, 3918B, and 3922B for X-, Y-, and Z-coordinates are (knot number-1) so that they are described as the arrangements 3915B, 3919B, and 3923B.

Although the description has been made that the highest order of the polynomial is the quadratic order, the highest order of the polynomial may, of course, be a cubic or higher order.

FIGS. 52 and 53 show that the depth information is described for each of the representative points. However, it is possible to describe the depth information for each of the object region as shown in FIG. 17 in the second embodiment. FIGS. 54 and 55 show the object region data having one depth information for one object region data.

Figure 56:
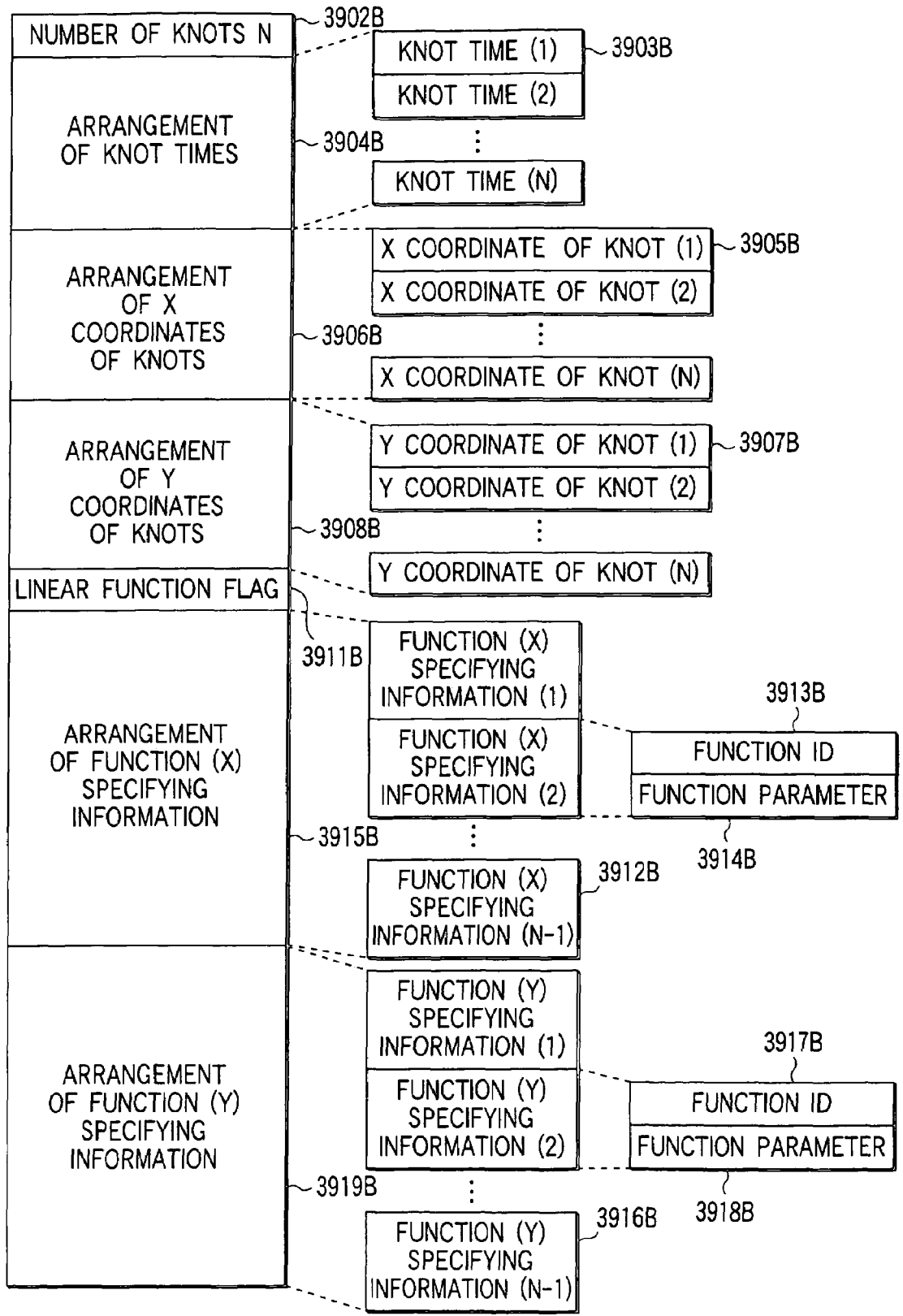
FIG. 56 is a diagram showing a still further example of the structure of object region data.

FIG. 55 shows the object region data having the figure type ID 700B, object appearing time 701B, object existing time period 702B, number of representative points M 703B, representative point trajectory 704B, and depth information 705B, in the same manner as FIG. 8. FIG. 56 shows the representative point trajectory 704B which is obtained by excluding the figure type ID 3900B, representative point number 3901B, arrangement of knot Z 3910B, and arrangement of function specifying information Z 3923B.

Though the sixth embodiment adds the depth information to the object region which is described using the trajectory of the coordinates of the representative points of the approximate figure, it is possible to add the display flag, passing range information, and panorama conversion parameters for mosaicking to the above described object region data.

Seventh Embodiment

In the seventh embodiment, the depth information is added to another object region data. The object region data in an arbitrary frame of the seventh embodiment is described by a reference object region data in a reference frame and a conversion parameter indicating the conversion from the reference object region to an object region in the arbitrary frame.

The configuration of the object region data creating apparatus of the seventh embodiment is shown in FIG. 57. The object region data creating device comprises a video data storage device 2C, object region processing device 4C, conversion parameter calculation device 6C, function approximation device 8C, and object region data storage device 10C.

The video data storage device 2C stores video data. The device 2C is constituted by, for example, a hard disk device, an optical disk device or a semiconductor memory. It is noted that the video data storage device 2C is not necessarily located at the same site as that of the other devices and may be located remotely through the Internet or the like.

The object region processing device 4C executes a processing for obtaining an object region in a frame serving as a reference (reference object region) and an object region in a frame serving as a target (target object region).

The conversion parameter calculation device 6C executes a processing for calculating the conversion parameters of the target object region based on the reference object region.

The function approximation device 8CC executes a processing for approximating a time series trajectory by a temporal function for each conversion parameter of the object region. As will be described later, if the conversion parameters themselves are described, this function approximation device 8C is not necessary.

The object region data storage device 10C stores object region data including data for expressing a functional formula approximating the time series trajectory for each conversion parameter.

Although it is preferable that the reference object region is updated, a device relating to the update processing is not shown in FIG. 57.

The video data storage device 2C and the object region data storage device 10C may be constituted by individual storage devices or media. Alternatively, all of or part of these devices may be constituted by a common storage device or medium.

This object region data creating apparatus can be also realized by executing a software on a computer.

Figure 58:
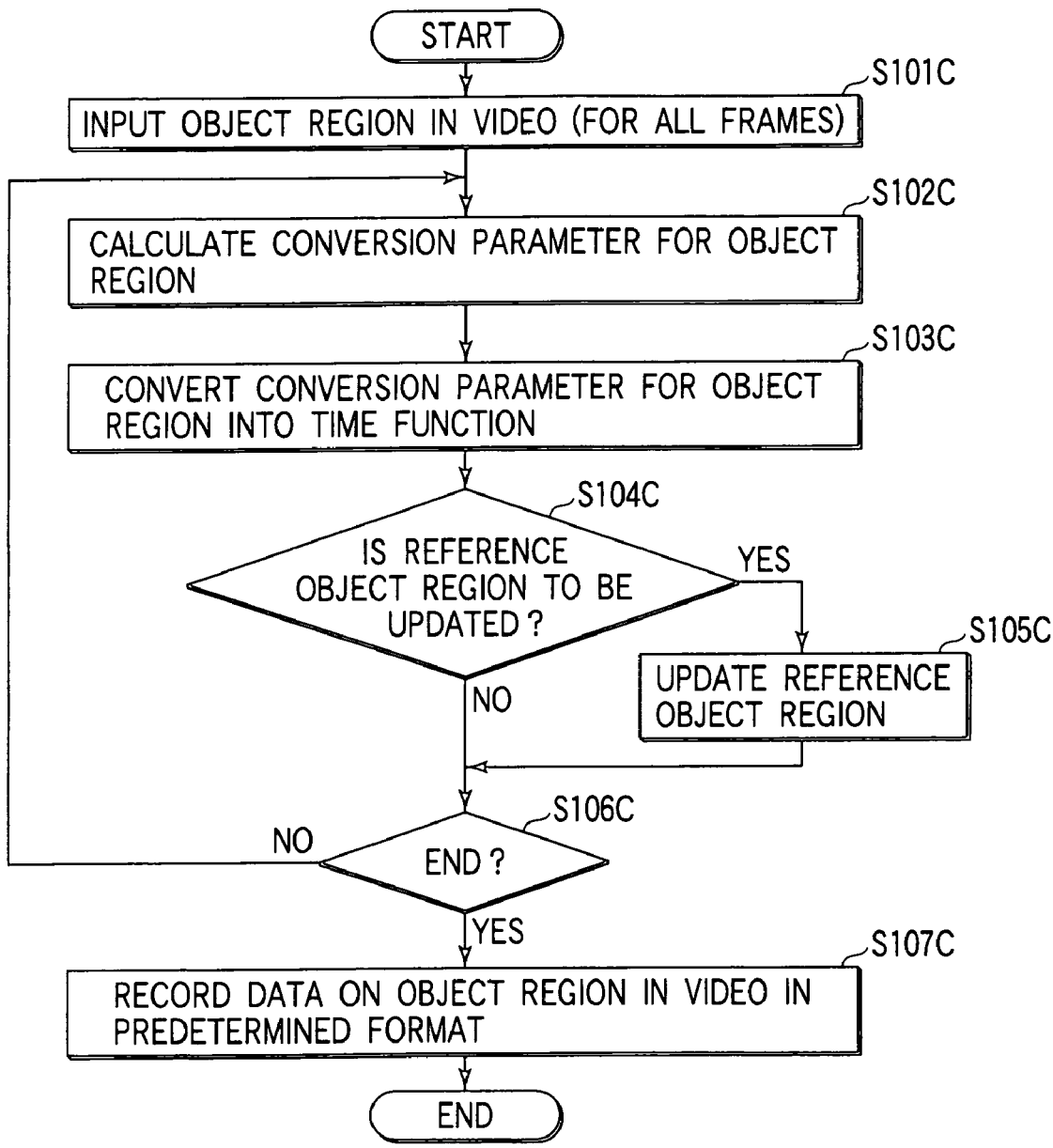
FIG. 58 is a flow chart showing one example of processing procedure in the seventh embodiment.

FIG. 58 shows one example of the processing procedure of the object region data creating apparatus according to this embodiment.

First, in step S101C, object regions in all frame in a video are inputted (while assuming that object regions are known). If the object regions are manually input through GUI, the contour of an object serving as a processing target in the video is specified by a pointing device such as a mouse or a touch panel. The interior of the contour of the object inputted manually may be set as an object region. Alternatively, after fitting an inputted contour to the contour line of the object in an image by means of a technique using a dynamic outline model referred to as Snakes (see, for example, M. Kass, A. Witkin and D. Terzopolus, "Snakes: Active contour models", Processings of the 1st International Conference on Computer Vision, pp. 259-268, 1987), the interior of the contour thus fitted may be set as an object region. Instead of manually inputting the contour, object regions may be obtained automatically by executing an image processing. If data relating to the object regions are already present, it is possible to input such data.

At least one of these object regions is registered as a reference object region. To register the object region, there is proposed a method including generating and storing a binary bit map on which "1" corresponds to the interior of each object region and "0" corresponds to the outside of the region.

Further, a frame including the reference object region is registered as a reference frame.

Next, in step S102C, a conversion parameter for converting the reference object region into an object region in one frame serving as a processing target (to be referred to as "target object region" hereinafter) is calculated.

This processing can be realized by a combination of, for example, a processing for calculating an optical flow in the target object region and a processing for converting the optical flow into the conversion parameter. The processing for calculating an optical flow in the target object region is to calculate the movement (optical flow) of each pixel (or a block formed of a plurality of pixels) in the object region from the reference frame to a present frame.

FIG. 59 shows the schematic of a processing example for obtaining an optical flow in the object region in each frame.

In FIG. 59, reference symbol 201C denotes a reference frame, 202C denotes the next frame to the reference frame, and 203C denotes the next frame to the frame 202C. Reference symbols 204C, 205C and 206C denote object regions in the respective frames. Reference symbol 207C denotes the optical flow of the object region from the frame 201C to the frame 202C. Reference symbol 208C denotes the optical flow of the object region from the frame 201C to the frame 203C.

As can be seen, the optical flow obtaining method can directly associate the reference object region with an object region in an arbitrary frame. This facilitates procedure for calculating an object region in an arbitrary frame and for determining whether a specified coordinates indicate the interior or the exterior of the object.

In the example of FIG. 59, the optical flow of each pixel (or each block formed of a plurality of pixels) in the object region from the reference frame to the current frame is obtained. Alternatively, the optical flow of each pixel (or each block formed of a plurality of pixels) in the object region from one frame before the current frame and the current frame may be obtained. FIG. 60 shows the schematic of a processing example in the latter case.

In FIG. 60, reference symbol 301C denotes a reference frame, 302C denotes the next frame to the reference frame, and 303C denotes the next frame to the frame 302C. Reference symbols 304C, 305C and 306C denote object regions in the respective frames. Reference symbol 307C denotes the optical flow of the object region from the frames 301C to 302C. Reference symbol 308C denotes the optical flow of the object region from the frame 302C to 303C.

If calculating optical flows as shown in FIG. 60, parameter variations becomes smaller than those in the method of FIG. 59. However, the calculation of the object region in an arbitrary frame is more complex than the method of FIG. 59. While either the method shown in FIG. 59 or that shown in FIG. 60 may be employed, description will be continued while assuming that the optical flow is calculated by the method shown in FIG. 59 in this embodiment.

Many methods for obtaining an optical flow have been already proposed (see, for example, J. L. Barron, D. J. Fleet and S. S. Beauchemin, "Performance of optical Flow Techniques", International Journal of Computer Vision, vol. 12, no. 1, pp. 43-77, 1994). It is possible to adopt any method to obtain an optical flow.

It is also possible to select a plurality of characteristic points in the reference object region and to use a moving vector obtained by template matching with blocks centered around the characteristic points used as a template.

Next, a processing for calculating a conversion parameter from an optical flow is executed. It is noted that a conversion parameter to be obtained varies according to conversion models which the parameters are based on.

In this embodiment, the following models can be selected:

"Enlargement/reduction model" and "Rotation model" as models when the number of parameters is 1;

"Parallel translation model" as a model when the number of parameters is 2;

"Composite model of enlargement & reduction/rotation/parallel translation models" (to be referred herein as "4-parameter conversion model") as a model when the number of parameters is 4;

"Affine conversion model" as a model when the number of parameters is 6;

"Projection conversion model" as a model when the number of parameters is 8; and "Parabolic conversion model" as a model when the number of parameters is 12.

The respective models are expressed by the following mathematical formulas (1) to (7):

$$x'=a_0x,$$
$$y'=a_0y \tag{1}$$

$$x'=x \cos a_0 - y \sin a_0,$$
$$y'=x \cos a_0 + y \sin a_0 \tag{2}$$

$$x'=x+a_0,$$
$$y'=y+a_1 \tag{3}$$

$$x'=a_0x+a_1y+a_2,$$
$$y'=a_1x-a_0y+a_3 \tag{4}$$

$$x'=a_0x+a_1y+a_2,$$
$$y'=a_3x+a_4y+a_5 \tag{5}$$

$$x'=(a_0x+a_1y+a_2)/(a_3x+a_4y+1),$$
$$y'=(a_5x+a_6y+a_7)/(a_3x+a_4y+1) \tag{6}$$

$$x'=a_0x^2+a_1xy+a_2y^2+a_3x+a_4y+a_5,$$
$$y'=a_6x^2+a_7xy+a_8y^2+a_9x+a_{10}y+a_{11} \tag{7}$$

The mathematical formula (1) corresponds to the enlargement and reduction model, the mathematical formula (2) corresponds to the rotation model, the mathematical formula (3) corresponds to the parallel translation model, the mathematical formula (4) corresponds to the 4-parameter conversion model, the mathematical formula (5) corresponds to the Affine conversion model, the mathematical formula (6) corresponds to the projection conversion model, and the mathematical formula (7) corresponds to the parabolic conversion model. In the formulas, (x, y) denotes coordinates in the reference object region, and (X', y') denotes the coordinates of the corresponding point of the object in the target object region. In the respective conversion models, it is assumed that the relationship between corresponding points in the two frames can be expressed using parameters $a_0$ to $a_{11}$ as shown in the formulas. Needless to say, a parametric model other than the above-described models may be prepared.

To calculate the conversion parameter, a method of least squares can be employed. This method is to determine the conversion parameter so that the sum of the squares of an error generated when a combination of (x, y) and (x', y') obtained by optical flow are substituted into the conversion model mathematical formula may become a minimum. This is an old, conventional method and can be easily executed by matrix operation.

Next, in step S103C, the calculated conversion parameter of the object region is converted to (approximated by) a temporal function.

Namely, "n" number of conversion parameters $a_i$ ($0 \leq i \leq n-1$) (e.g., n=12) in a certain time interval are expressed by:

$$a_i=f_i(t),$$

where $f_i(t)$ is the function of time t.

The time interval here is one including the frames for which an optical flow is calculated using the same reference object region. $f_i(t)$ may be a polynomial, a Spline function, a constant or the like.

Figure 61:
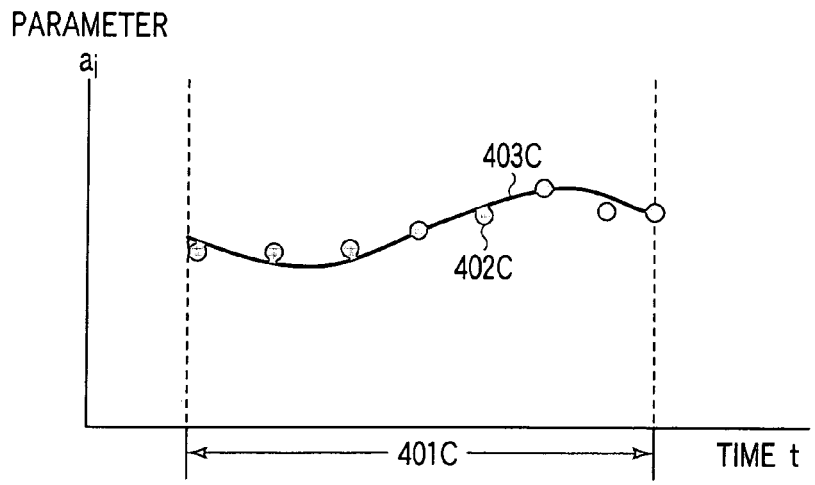
FIG. 61 is an explanatory view for an example of expressing a conversion parameter by an approximate temporal function.

FIG. 61 shows a state in which a certain conversion parameter $a_i$ calculated from the optical flow is expressed by a function. In FIG. 61, reference symbol 401C denotes a time interval in which a function is to be obtained, 402C denotes a value of $a_i$ calculated from the optical flow, and 403C denotes a function $a_i=f_i(t)$ expressing the parameter $a_i$.

The advantage of expressing parameter $a_i$ by a function is that the quantity of data for describing object regions can be reduced. If a polynomial of second degree or lower is used as a function, for example, three real numbers suffice to describe all parameter values in a certain time interval since this function can be expressed by three real numbers.

If a polynomial or a spline function is used as a function expressing the conversion parameter, the conversion parameter $a_i$ is determined so that the error between the values of $a_i$ in the conversion target time interval and the values calculated by the function $f_i(t)$ may become small. By using, for example, the method of least squares, the parameter can be easily calculated.

This processing for obtaining an approximate function may be executed every time parameter values relating to the object region in each frame are obtained (e.g., a method of executing approximation and obtaining an approximate error every time parameter values in each frame are obtained, and appropriately dividing an approximate interval so that the approximate error may fall within a certain range). Alternatively, this processing may be executed simultaneously for all frames after the reference object region is updated and a reference frame interval is decided.

The processing procedure of step S103C will be described in detail later.

Next, in step S104C, it is determined whether or not it is necessary to update the reference object region.

In this embodiment, an object region in an arbitrary frame is expressed by the reference object region in the reference frame and the conversion parameter of the reference object region. However, an object region to be expressed differ too greatly in shape from the reference object region, a shape similar to the object region to be expressed cannot be obtained even by moving/deforming the reference object region by the conversion parameter. In that case, it is effective to change the reference object region to an object region in another frame (to update the reference object region). In this embodiment, therefore, it is determined whether or not such a change is necessary in step S104C.

To make this determination, it is possible to employ a method of determining whether or not the error between an actual object region in a certain frame and a predicted object region exceeds a preset threshold value. The predicted object region means an object region in a certain frame which is calculated from the reference object region by using the conversion parameter. The conversion parameter used for conversion is a value calculated from the temporal function $a_i=f_i(t)$. As the error between the actual object region and the predicted object region, a ratio of the area of a common portion to both regions to the area of a part which is not common can be used.

Next, in step S105C, if it is determined at step S104C that it is necessary to update the reference object region, a reference object region update processing is executed. This processing is basically the same as the processing executed in step S101C. That is to say, in the processing in step S105C, the processing target frame for which the conversion parameter is calculated in step S102C is registered as a reference frame, and a binary bit map expressing the reference object region are generated. Further, an object region in the reference frame is registered as a reference object region.

In step S106C, it is determined whether or not a processing for describing the object regions in the video is ended. This determination is based on, for example, whether or not a current object region is at the final frame of the video, whether or not a current object region is at the final frame of an object region existing time-interval, whether or not a user indicates the end of the description processing or the like. The processings from steps S102C to S104C or S105C are repeatedly executed for each frame until it is determined that the description processing is ended in step S106C.

In step S107C, information on the description of the object region (parameter of the function approximating conversion parameter) calculated by the preceding processings is recorded according to a predetermined description format. The information is recorded by the object region data storage device 10C such as, for example, a semiconductor memory inside or outside of a computer, a magnetic tape, a magnetic disk or an optical disk.

Figure 62:
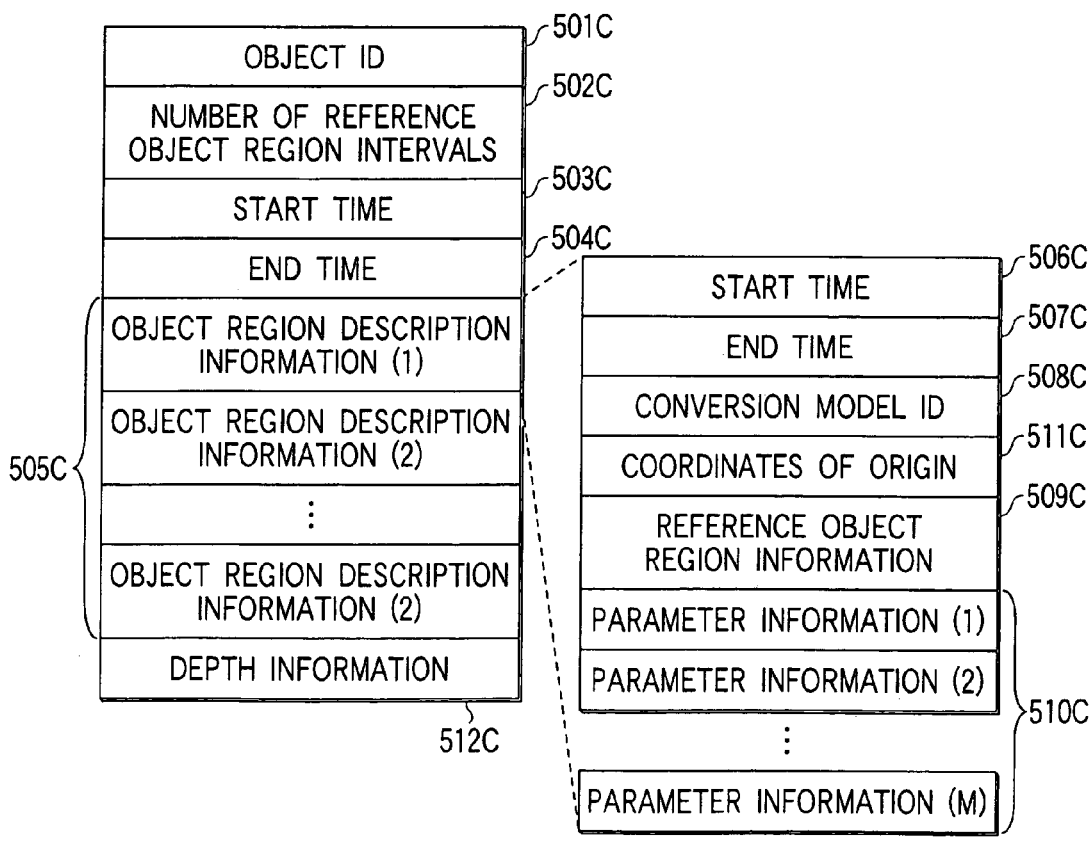
FIG. 62 shows one example of an object region data description format if the reference object region is expressed by a bit map.

FIG. 62 shows one example of an object region description format with respect to one object region in this embodiment.

In FIG. 62, reference symbol 501C denotes an object ID which is identification information (e.g., number or symbol) allotted to and peculiar to an object.

Reference symbol 502C denotes the number of constant reference object region time-intervals which is the number of frame intervals having the same reference object region (N in FIG. 62). This number N is also equal to the number of reference frames.

Reference symbols 503C and 504C denote a start time and an end time of object region existing time-intervals, respectively. Each time is described by time itself or frame number. The length of the object region existing time-interval (a subtraction value of time or frame number) may be used instead of the end time.

Reference symbol 505C denotes object region description information. The object region description information 505C is described for each reference object region interval, i.e., by the number of the constant reference object region time-intervals (N in the example of FIG. 62). Reference symbol 512C denotes a depth information for the object which is the same as FIG. 18.

The concrete contents of each object region data description information 505C are indicated by reference symbols 506C to 510C shown in FIG. 62.

The reference symbols 506C and 507C denote a start time and an end time of the reference object region interval, respectively. Each time is described by a time itself or a frame number. The length of the reference object region interval can be used instead of the end time.

The reference symbol 508C denotes a conversion model ID. This is intended to specify which model, such as the enlargement and reduction model, the affine conversion model and the parabolic conversion model, is used to describe the object region.

Reference symbol 511C denotes the coordinates of an origin to determine where the coordinates of the origin of the conversion model is positioned in an image. The origin coordinate data can be omitted if such a rule as to set the position of the center of gravity of the reference object regions to be constantly at an origin, is predetermined.

The reference symbol 509C denotes reference object region data to specify a reference object region. To be specific, the reference object region data include the time of the reference frame (or frame number), bit map data representing the reference object regions (or a pointer to the bit map data). It is preferable that the bit map data is compressed and then stored since the data size is large unless compressed.

The reference symbol 510C denotes conversion parameter information. The conversion parameter information are described by the number of parameters (M parameters in the example of FIG. 62) set by a conversion model (conversion model ID). To be specific, the conversion parameters include an arrangement of parameter values in each frame, information for specifying an approximate function of the parameters (coefficient values) and the like. The conversion parameter information will be described later in detail.

By executing the above-described processings, the object regions changing spatially and/or temporally in the video can be recorded, as simple description data.

In the above description, the object region is expressed by the bit map, and the conversion parameter for converting the reference object region into an object region in the processing target frame (target object region) is calculated. However, it is possible to approximate an object region with an approximate figure and calculate a conversion parameter for converting the respective representative points of the approximate figure of the reference object region into the corresponding representative points of an approximate figure of an object region in a processing target frame (target object region).

FIG. 63 shows an example of the constitution of an object region data creating apparatus. The object region data creating apparatus comprises the video data storage device 2C, object region processing device 4C, a figure approximation device 5C, the conversion parameter processing device 7C, function approximation device 8C, and object region data storage device 10C. If processings executed by the creating apparatus are intervened by the operation of a user, a GUI for displaying video (moving image) data in, for example, units of frames and for receiving the input of a user's command and the like is employed (GUI is not shown in FIG. 63).

The figure approximation device 5C executes a processing for approximating an object region by an approximate figure and obtaining the representative points of the approximate figure.

The conversion parameter calculation device 6C calculates conversion parameters for converting the representative points of the approximate figure of a reference object region in a reference frame serving as a reference into the representative points of the approximate figure of a target object region in a target frame.

The function approximation device 8C approximates the time series trajectory of each of the conversion parameters for the representative points of the approximate figure of the object region to a temporal function. The function approximation device 8C is not necessary if the conversion parameters themselves are described.

Needless to say, this object region data creating apparatus can be realized by executing a software on a computer.

Figure 64:
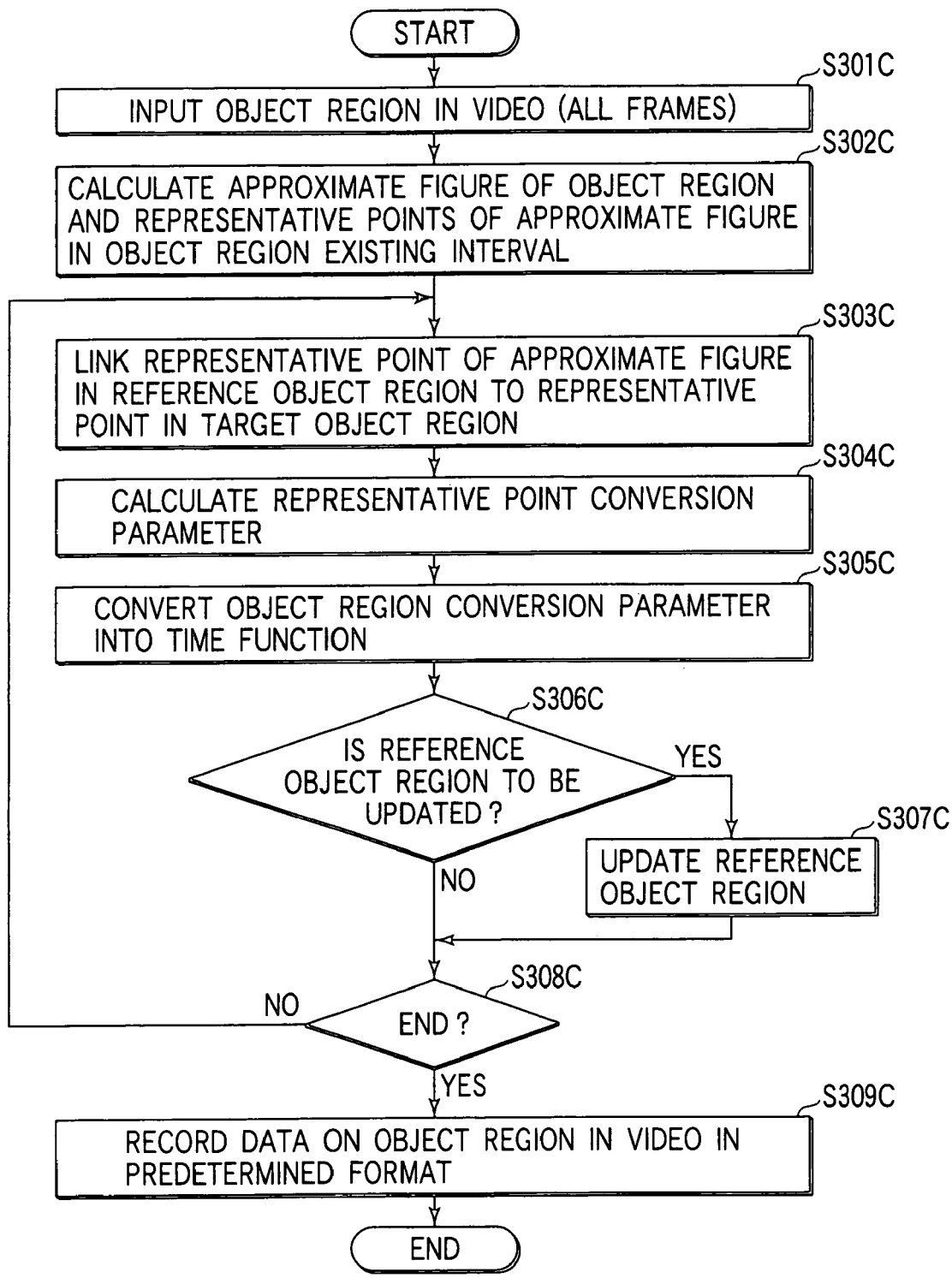
FIG. 64 is a flow chart showing another example of processing procedure in the seventh embodiment.

FIG. 64 shows one example of processing procedure for the object region data creating apparatus in this embodiment.

A step S301C is the same as step S101C in FIG. 58.

In step S302C, object regions are approximated by preset figures throughout the interval in which object regions exist.

In the processing for approximating the object region by a figure, an approximate region as small as possible to surround the object region is found. As figure used for approximation, various figures such as a rectangle (a square, a rectangle), a parallelogram with or without gradient, an ellipse (including a circle) and a polygon with or without gradient, can be employed. In addition, as the region approximation method, various methods such as a method of approximating a region by a circumscribed figure of the region, a method of approximating a region by an inscribed figure of the region, a method of setting the center of gravity of the region to the center of gravity of an approximate figure, a method of making the areas of the region and the approximate figure equal and a method of minimizing the area of a portion on which the region and an approximate figure do not overlap each other, may be employed.

Instead of approximating the object region to a preset figure, the type of a figure can be specified by a user for each target object. Alternatively, the type of a figure can be automatically selected according to the shape or the like of the object for each target object.

Furthermore, the processing for obtaining the approximate figure of the object region may be executed for each frame or executed by object regions in several frames before and after the target frame. In the latter case, the changes of the size and position of the approximate figure are smoothed among several frames, thereby making it possible to smooth the movement or deformation of the approximate figure or to make the extraction error of the object region inconspicuous. It is noted that the size of the approximate figure may vary according to the frame.

If the approximate figure of the object region is obtained, a processing for extracting representative points expressing this approximate figure is executed. Which points are used as representative points depends on which type of an approximate figure is used. If the approximate figure is, for example, a rectangle, four or three vertexes may be set at representative points. If the approximate figure is a circle, the center and one circumferential point or both end points of the diameter may be used as representative points. Further, if the approximate figure is an ellipse, the vertexes of the circumscribed rectangle of the ellipse, or two focuses and one point on the ellipse (e.g., one point on the short axis of the ellipse) may be used as representative points. If the approximate figure is an arbitrary closed polygon, it is necessary to use the respective vertexes of the polygon as representative points.

The representative points are extracted in units of frames every time an approximate figure for one frame is obtained. The respective representative points are expressed by a horizontal coordinate x and a vertical coordinate y.

A method of obtaining an approximate ellipse if the object region is expressed by a parallelogram is the same as that shown in FIG. 40.

Figure 41:
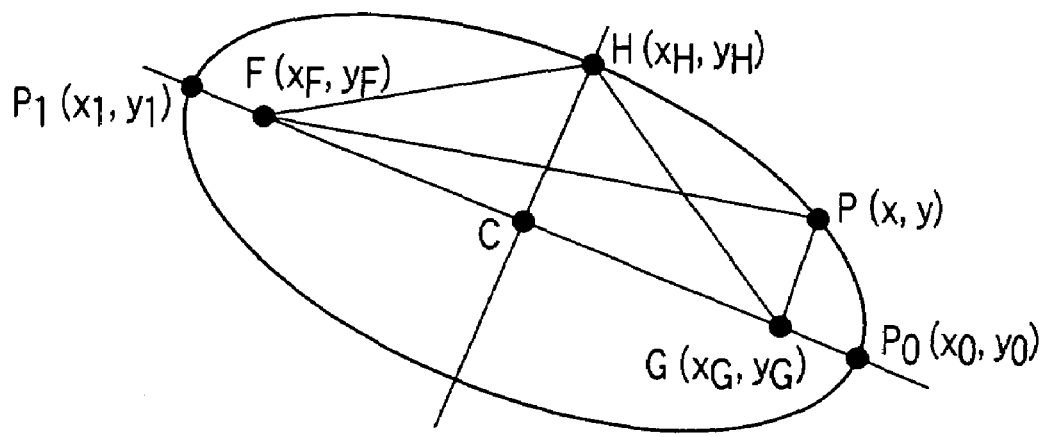
FIG. 41 is a diagram showing an example of a process for detecting a representative point of an approximate ellipse of an object region.

A method of obtaining representative points from the ellipse is the same as that shown in FIG. 41.

The approximate figure is not limited to the ellipse but may be a parallelogram or a polygon.

Next, in step S302C, a reference object region and a reference frame are set. The reference object region is the approximate figure of an object region in the first frame (reference frame) in an object region existing time-interval. The positions of the representative points of the reference region approximate figure are stored, as well.

Next, in step S303C, the representative points of approximate figure of the object region in a processing target frame are made to correspond to those of the approximate figure of the reference object region.

Figures 65, 66:
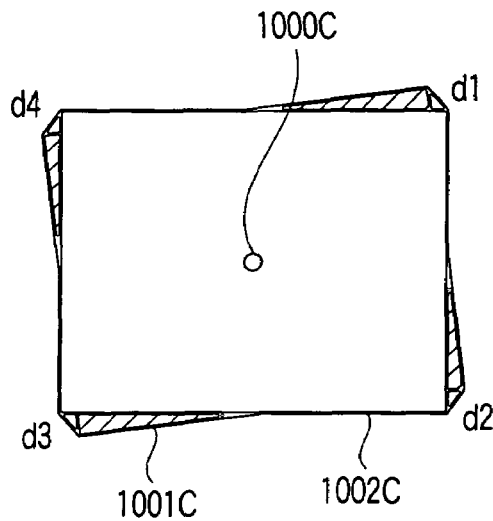
FIG. 65 is an explanatory view for a method of making the representative points of an approximate figures of object regions correspond to each other.
FIG. 66 shows the relationship between the types of approximate figures and conversion models for which conversion parameters can be obtained.

FIG. 65 shows one example of how to make the former representative points correspond to the latter representative points. In FIG. 65, reference symbol 1000C denotes the centers of gravity of approximate rectangles. In FIG. 65, the approximate figure 1001C of the reference object region and the approximate FIG. 1002C of the target object region are obtained.

First, either the approximate FIG. 1001C or 1002C is moved in parallel, to thereby make the positions of the centers of gravity of the both FIGS. 1001C and 1002C coincident with each other (FIG. 65 shows a state in which the positions of the centers of gravity are coincident with each other).

Thereafter, distances d1 to d4 between the four vertexes of the FIG. 1001C and those of the FIG. 1002C are calculated, respectively and the sums of the distances are obtained from all combinations of the vertexes.

Among them, a combination having the smallest sum of distances is obtained and the representative points of the combination are made to correspond to one another.

It is noted that there are cases where it is difficult to make the representative points of the approximate figure of the object region correspond to those of the approximate figure of the reference object region in this method. For example, if an approximate rectangle is close to a square and rotates by 45 degrees, it is difficult to make the representative points of the approximate figure of the object region correspond to those of the approximate figure of the reference object region (since the sum of distances is almost equal between the two combinations). In that case, therefore, a method including obtaining the exclusive OR of the object regions in the approximate figures, and adopting a combination having the smallest area of the figures, or a method including obtaining the absolute difference in texture between object regions and obtaining a combination having a smallest difference value.

In step S304C, conversion parameters are calculated from the moving vectors of the representative points of the approximate figure of the object region.

In this processing, the movements of the representative points are used instead of an optical flow and conversion parameters are thereby calculated by the same processing as that of step S102C shown in FIG. 58. In this case, however, due to the small number of representative points, the conversion parameters cannot be always obtained. In case of, for example, a rectangle, an ellipse and a parallelogram, each of them has three representative points but eight parameters for a projection conversion model cannot be obtained from the moving vectors of these three representative points. FIG. 66 shows the relationship between the types of figures used for approximation and conversion models for which conversion parameters can be obtained. In FIG. 66, symbol ○ denotes a combination capable of calculating parameters and symbol × denotes a combination incapable of calculating parameters.

In step S305C, the conversion parameters obtained in step S304C are approximated by a temporal function, which processing is the same as that in step S103C shown in FIG. 58.

In step S306C, it is determined whether or not it is necessary to update the reference object region. In this processing, the reference object region is first converted by the conversion parameters and a predicted object region in a current frame is calculated. Needless to say, it is possible to calculate the same predicted object region by converting only the representative points of the reference object region using the conversion parameters and constituting a figure specified by the converted representative points. Next, the error between the predicted object region and the approximate figure of the target object region in the current frame is calculated and it is determined whether or not the reference object region needs to be updated by a threshold value.

In step S307C, the reference object region is actually updated after it is determined at step S306C that the reference object region needs to be updated. While setting the processing target frame as a reference frame, the approximate figure of the object region in the frame is stored as a new reference object region and the coordinates of the representative points of the reference object region are stored, as well.

In step S308C, it is determined whether or not the description of the object region in the video is ended as in the case of step S106C shown in FIG. 58.

In step S309C, information on the object region (function parameters approximating the conversion parameters) calculated as in the same manner as that of step S107C shown in FIG. 58 is recorded in a predetermined description format.

FIG. 67 shows one example of a description format for the object region data. This description format is the same as that shown in FIG. 62 except for figure information 1109C. The figure information 1109C used instead of the reference object region information 509C shown in FIG. 62 comprises an ID specifying a figure type and the coordinates of the representative points of the approximate figure of the reference object region. Symbol M denotes the number of representative points necessary for a figure specified by the ID.

Next, variations relating to the data structure of object region data will be described hereinafter.

In the above-described examples, conversion parameters are obtained for all frames with respect to a certain object region. Frames for which conversion parameters are obtained may be sampled. For example, one frame out of three frames may be sampled and a reference object region in frame 1 as well as reference object regions in frames, 4, 7, ... may be used.

If conversion parameters are expressed by a temporal function and information for specifying the function are described in object region data, then the object region data may be approximated by a function by the sampled parameter values as in the case of the above-described examples. In addition, it is not necessary to include information on sampling in the object region data.

Figure 68:
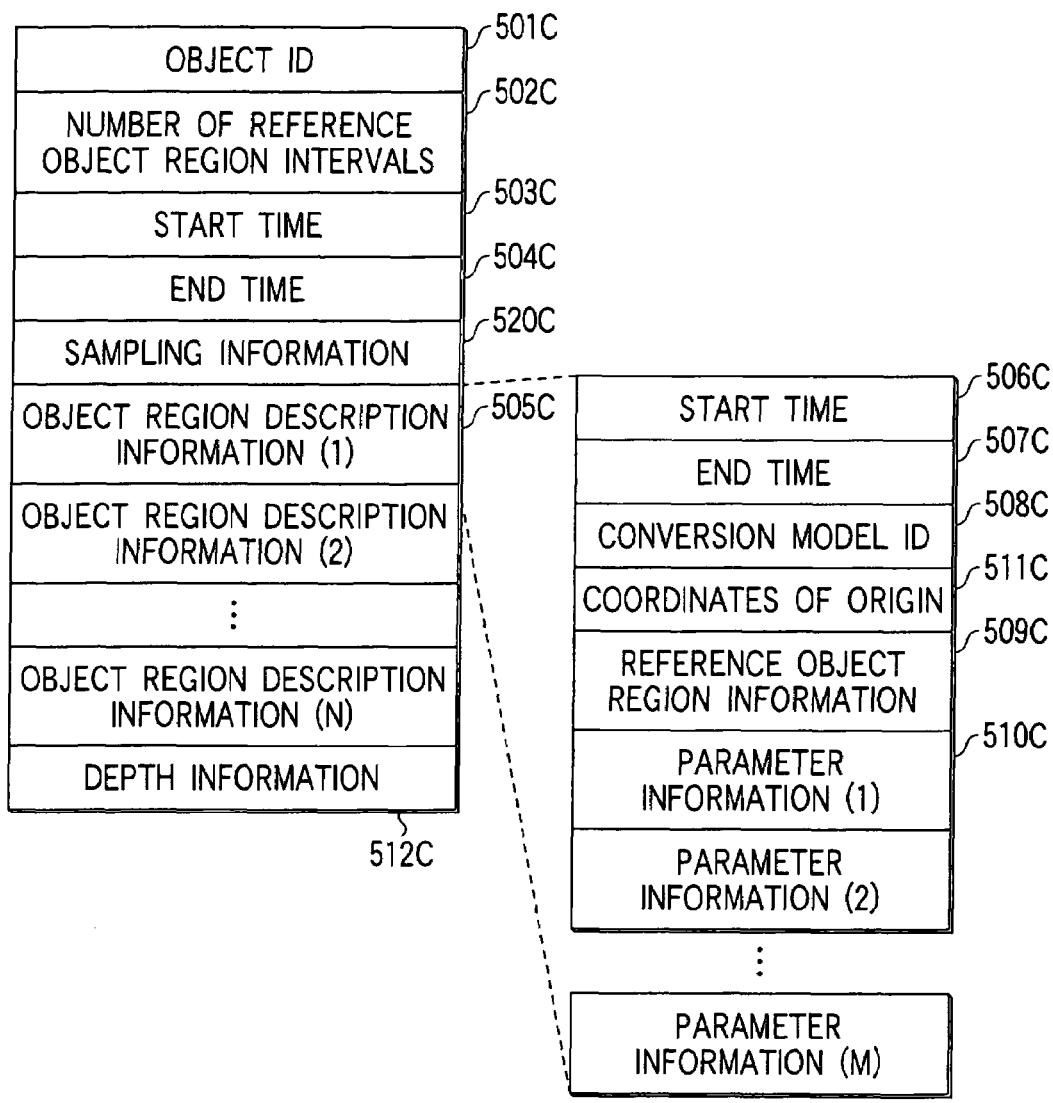
FIG. 68 shows one example of the description format of object region data including sampling information.

Meanwhile, if conversion parameter values are directly described in the object region data, then (1) parameter values in the frames which are not sampled are appropriately interpolated (e.g., the same values as those in the frame which has been sampled just before the frame which is not sampled are described in the object region data) and the same object region data as that in FIG. 62 is prepared, or (2) sampling information 520C as shown in FIG. 68 is added to the object region data, only the parameter values in the sampled frames and information for allowing specifying a sampling method (e.g., numeric value "n" as information indicating that n frames are sampled once (note, however, that in case of n=1, for example, it is assumed that all frames are sampled)) may be described in the sampling information 520C in the first embodiment. In the method of (2), if using the object region data, parameter values in the frames which have not been sampled can be interpolated, if necessary, by referring to the sampling information 520C.

Next, description will be given to a method of generating object region data by dividing one object into a plurality of regions in the above described embodiments.

Conventionally, one conversion parameter is obtained for one object. In case of an object which apparent shape has great change, however, it is sometimes preferable to divide an object into a plurality of regions and use conversion parameters for the respective regions. For example, a walking person heavily moves his or her hands and legs although less moves his or hear head and body. In that case, it is possible to obtain conversion parameters for the respective parts in a stable manner by dividing the object into separate regions of head/body/hands/legs rather than dealing with the person as one object.

If one object is expressed by a plurality of figures, it is required to execute a processing for dividing the object into a plurality of regions. This processing may be executed by any method such as a processing method of directly inputting figures manually. In that case, this processing can be realized by operations including using a pointing device such as a mouse, and allowing regions to be surrounded by rectangles or ellipses on an image or designating regions by the trajectory of the pointing mouse. Further, if input operation is carried out not manually but automatically, there is proposed a method of realizing the processing by, for example, clustering the movement of an object. According to this method, the movements of the respective regions of the object between continuous frames are calculated by a correlation method (see, for example, Gazo Kaiseki Handbook (Image Analysis Handbook), Section II, Chapter 3, Tokyo University Publication, 1991) or a gradient method (see, for example, B. K. P. Horn and B. G. Schunck, "Determining optical flow", Artificial Intelligence, vol. 17, pp. 185-203, 1981), and only the similar movements among them are gathered to thereby form regions.

Figure 69:
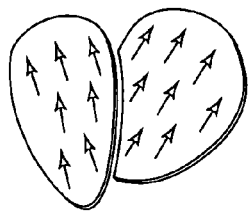
FIG. 69 is an explanatory view for a state in which one object is divided into regions having similar movement by an optical flow.

FIG. 69 shows a state in which regions having a similar optical flow are gathered together and an object is thereby divided into a plurality of regions.

Figure 70:
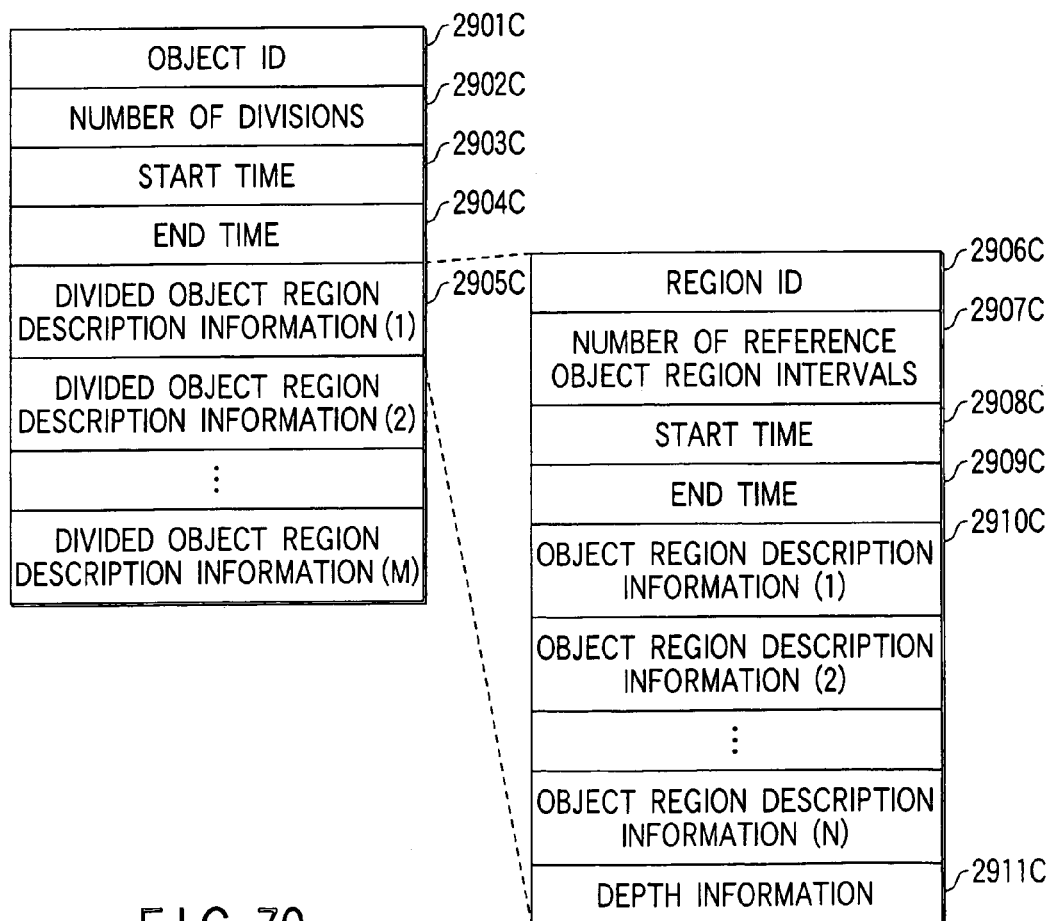
FIG. 70 shows one example of an object region data description format for describing one object in a plurality of regions.

FIG. 70 shows one example of data structure for describing an object in a plurality of regions. The example of FIG. 70 is to expand the data structure (FIG. 67) for describing the object in a single region and data following region ID data 2906C are the same as those in FIG. 67. The number of divided regions is stored in 2902C and data on the respective divided regions are held in 2905C and the following.

Though the seventh embodiment adds the depth information to the object region of an arbitrary frame which is described using a reference object region data in a reference frame and a conversion parameter indicating the conversion from the reference object region to the object region in the arbitrary frame, it is possible to add the display flag, passing range information, and panorama conversion parameters for mosaicking to the above described object region data.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. While in each of the above embodiments, information that determines the approximate figure is used as the representative points of a figure approximating the object region, a plurality of characteristic points extracted from the object region in the image may be used as the representative points of the figure. Various things can be considered as characteristic points. For instance, the angles of an object (for example, as described in L. Kitchen and A. Rosenfeld, "Gray-level corner detection," Pattern Recognition Letters, No. 1, 1982, pp. 95-102) and the center of gravity of an object may be considered. In this method, there is not enough information to determine an approximate figure. Consequently, it is impossible to determine an approximate figure itself from the object region data, but the processing at the upper-layer processing unit becomes simpler.

The data format of the object region data is similar to that in the case of the representative points. Only the approximate figure data is changed to characteristic point data, the number of the representative points to the number of the characteristic points, and the representative point trajectory to the characteristic point trajectory. The number of the approximate figures and the figure type IS are omitted.

The methods and apparatus of the present invention apply to a computer-readable recording medium in which a program is recorded that causes a computer to execute a procedure equivalent to the present invention (or to function as means equivalent to the present invention or to realize a function equivalent to the present invention).

According to embodiments of the present invention, the region of the target object in the video is described as the parameters of the function that approximates the trajectory obtained by arranging, in the direction of frame advance, the quantity indicating the position of the representative points of an approximate figure for the object region. This makes it possible to describe the region of the desired object in the image using a smaller amount of data and facilitates the creation and handling of the data.

Furthermore, According to embodiments of the present invention, it is possible to search for an object in the image efficiently and effectively.

What is claimed is:

1. A computer readable medium storing a computer program code, comprising:
    a first computer program code configured to generate a signal for use in a video decoding apparatus and for describing information of a moving object region in a video sequence, the signal comprising:
    type data identifying a type of approximate figure of the moving object region, the type data also identifying a number of representative points of the approximate figure;
    trajectory data describing a trajectory of one of the representative points of the approximate figure, the trajectory data comprising:
        first linear function flag data indicating whether only linear functions are used for describing a trajectory of the representative points in a first dimension,
        a first type identifier specifying an order of a first function of time for describing a trajectory of the representative points in the first dimension, and therefore also the trajectory of the object region;
        second linear function flag data indicating whether only linear functions are used for describing a second trajectory of the representative points in a second dimension, and
        a second type identifier specifying an order of a second function of time for describing a trajectory of the representative points in the second dimension, and therefore also the trajectory of the object region;
    depth data specifying a distance between a camera and the moving object region, the depth data comprising:
        third linear function flag data indicating whether only linear functions are used for describing a trajectory of the distance in a third dimension, and
        a third type identifier specifying an order of a function of time for describing the trajectory of the distance in the third dimension.

2. A computer readable medium of claim 1, wherein the representative points of the approximate figure are vertices of the approximate figure.

3. A computer readable medium of claim 1, wherein the type of approximate figure is one of a rectangle, ellipse, or polygon.

4. A computer readable medium of claim 1, further comprising:
   time data specifying a start time and duration length of time of the moving object region, the order of the function being a first order or a second order.

5. A computer readable medium of claim 1, wherein the order of the function is a second order and the depth data further comprises parameter data identifying a coefficient of the second order of the function.

6. A computer readable medium storing a computer program code, comprising:
   a first computer program code configured to generate a signal for use in a video decoding apparatus and for describing information of a moving object region in a video sequence, the signal comprising:
   time data including a start time and a duration time of the object region in the video sequence;
   type data being an integer, the integer specifying a type of figure, corresponding to the object region, to be an ellipse, the integer also specifying a number of representative points of the figure;
   figure data specifying a trajectory of at least one of the representative points, including:
      time arrangement data including times of points, used to determine the trajectory,
      key value data representing values of the points used to determine the trajectory, and
      function data for indicating the trajectory of at least one of the representative points using a function identifier, and therefore also the trajectory of the object region, the function identifier indicating an order of a function used to determine the trajectory or that no function is defined;
   panorama flag data indicating whether or not plural pictures are combined as a panorama picture;
   model type data indicating a type of conversion model from each of the plural pictures to the panorama picture;
   origin coordinate data indicating a coordinate of origin for conversion which is represented by coordinate systems of the each of the plural pictures;
   number data indicating a number of pictures in the panorama picture;
   interval data indicating a frame time counted from a start frame; and
   parameter data indicating a parameter of the conversion model.

7. The computer readable medium of to claim 6, wherein the model type data indicates one of translation, rotation/scaling, affine conversion, perspective conversion, and quadratic conversion.

8. A computer readable medium of claim 6, wherein:
   the function data is used to indicate the trajectory using a formula:

$$f(t) = f_a + v_a(t - t_a),$$

where $v_a = (f_b - f_a)/(t_b - t_a)$, when an order of a function used to indicate the trajectory is first order, where $t_a$ represents a time of a first point of the points used to determine the trajectory, $t_b$ represents a time of a second point of the points used to determine the trajectory, $f_a$ is a coordinate of the first point, $f_b$ is a coordinate of the second point, and t is a time of a point to be determined.

9. A computer readable medium of claim 6, wherein the function data further comprises:
   parameter data specifying a second order coefficient for the trajectory when an order of a function indicating the trajectory is second order.

10. A computer readable medium of claim 9, wherein the function data is used to indicate the trajectory using a formula:

$$f(t) = f_a + v_a(t - t_a) + \tfrac{1}{2} a_a (t - t_a)^2,$$

where $v_a = (f_b - f_a)/(t_b - t_a) - \tfrac{1}{2} a_a (t_b - t_a)$ when an order of a function used to indicate the trajectory is second order, where $t_a$ represents a time of a first point, $t_b$ represents a time of a second point, $f_a$ is a coordinate of the first point, $f_b$ is a coordinate of the second point, and t is a time of a point to be determined.

11. A computer readable medium of claim 6, further comprising hypermedia information.

12. A computer readable medium according to claim 6, wherein:
    the representative points of the figure are ordered clockwise.

13. A computer readable medium according to claim 12, wherein:
    the representative points of the figure are continuously ordered.

14. A computer readable medium according to claim 13, wherein:
    the integer represents all of the representative points of the figure without omitting any representative points.

15. A computer readable medium according to claim 6, wherein:
    the time arrangement data are sorted in increasing order.

16. A computer readable medium according to claim 6, wherein:
    the figure data specifies the trajectory of at least three successive frames.

* * * * *